(12) United States Patent
Bishop et al.

(10) Patent No.: US 9,031,880 B2
(45) Date of Patent: May 12, 2015

(54) SYSTEMS AND METHODS FOR NON-TRADITIONAL PAYMENT USING BIOMETRIC DATA

(75) Inventors: Fred Bishop, Glendale, AZ (US); Peter D Saunders, Salt Lake City, UT (US)

(73) Assignee: III Holdings 1, LLC, Wilmington, DE (US)

( * ) Notice: Subject to any disclaimer, the term of this patent is extended or adjusted under 35 U.S.C. 154(b) by 1402 days.

(21) Appl. No.: 11/552,886

(22) Filed: Oct. 25, 2006

(65) Prior Publication Data

US 2007/0052517 A1    Mar. 8, 2007

Related U.S. Application Data

(63) Continuation-in-part of application No. 11/164,352, filed on Nov. 18, 2005, which is a continuation-in-part of application No. 10/711,720, filed on Sep. 30, 2004, which is a continuation-in-part of application No.

(Continued)

(51) Int. Cl.
*G06Q 20/00* (2012.01)
*G06Q 30/06* (2012.01)
(Continued)

(52) U.S. Cl.
CPC .............. *G06Q 30/06* (2013.01); *G06Q 20/10* (2013.01); *G06Q 20/32* (2013.01); *G06Q 20/327* (2013.01); *G06Q 20/3572* (2013.01);
(Continued)

(58) Field of Classification Search
USPC ................................. 705/44, 50–79
See application file for complete search history.

(56) References Cited

U.S. PATENT DOCUMENTS

D61,466 S    9/1922  Foltz
2,767,756 A  10/1956 Niles
(Continued)

FOREIGN PATENT DOCUMENTS

CA    2300241    9/2000
CH     689070    8/1997
(Continued)

OTHER PUBLICATIONS

Derfler, "How Networks Work", Bestseller Edition, 1996, Ziff-Davis Press, Emeryville, CA, all pages.*

(Continued)

*Primary Examiner* — Jacob C. Coppola
(74) *Attorney, Agent, or Firm* — Meyertons, Hood, Kivlin, Kowert & Goetzel, P.C.

(57) ABSTRACT

Facilitating transactions using non-traditional devices and biometric data to activate a transaction device is disclosed. A transaction request is formed at a non-traditional device, and communicated to a reader, wherein the non-traditional device may be configured with an RFID device. The RFID device is not operable until a biometric voice analysis has been executed to verify that the carrier of the RFID equipped non-traditional device is the true owner of account information stored thereon. The non-traditional device provides a conduit between a user and a verification system to perform biometric voice analysis of the user. When the verification system has determined that the user is the true owner of one or more accounts stored at the verification system, a purchase transaction is facilitated between the verification system. Transactions may further be carried out through a non-RF device such as a cellular telephone in direct communication with an acquirer/issuer or payment processor.

16 Claims, 21 Drawing Sheets

Related U.S. Application Data

10/340,352, filed on Jan. 10, 2003, said application No. 10/711,720 is a continuation-in-part of application No. 10/192,488, filed on Jul. 9, 2002, now Pat. No. 7,239,226.

(60) Provisional application No. 60/507,803, filed on Sep. 30, 2003, provisional application No. 60/396,577, filed on Jul. 16, 2002, provisional application No. 60/304,216, filed on Jul. 10, 2001.

(51) Int. Cl.
*G06Q 20/10* (2012.01)
*G06Q 20/32* (2012.01)
*G06Q 20/34* (2012.01)
*G06Q 20/38* (2012.01)
*G06Q 20/40* (2012.01)

(52) U.S. Cl.
CPC ......... *G06Q 20/385* (2013.01); *G06Q 20/4012* (2013.01); *G06Q 20/4014* (2013.01)

(56) References Cited

U.S. PATENT DOCUMENTS

| | | | |
|---|---|---|---|
| 3,376,661 | A | 4/1968 | Hulett |
| 3,446,260 | A | 5/1969 | Osher |
| 3,536,894 | A | 10/1970 | Travioli |
| 3,573,731 | A | 4/1971 | Schwend |
| 3,725,647 | A | 4/1973 | Retzky |
| 3,763,356 | A | 10/1973 | Berler |
| 3,829,662 | A | 8/1974 | Furahashi |
| 3,838,252 | A | 9/1974 | Hynes et al. |
| 3,873,813 | A | 3/1975 | Lahr et al. |
| 3,894,756 | A | 7/1975 | Ward |
| 3,914,762 | A | 10/1975 | Klensch |
| 3,929,177 | A | 12/1975 | Reis |
| 3,955,295 | A | 5/1976 | Mayer |
| 4,044,231 | A | 8/1977 | Beck et al. |
| 4,048,737 | A | 9/1977 | McDermott |
| 4,056,139 | A | 11/1977 | Murt |
| 4,058,839 | A | 11/1977 | Darjany |
| 4,066,873 | A | 1/1978 | Schatz |
| 4,119,361 | A | 10/1978 | Greenaway |
| 4,202,491 | A | 5/1980 | Suzuki |
| 4,206,965 | A | 6/1980 | McGrew |
| 4,222,516 | A | 9/1980 | Badet et al. |
| 4,277,863 | A | 7/1981 | Faneuf |
| 4,303,904 | A | 12/1981 | Chasek |
| 4,318,554 | A | 3/1982 | Anderson et al. |
| 4,356,646 | A | 11/1982 | Johnson, Jr. |
| 4,361,757 | A | 11/1982 | Ehrat |
| D270,303 | S | 8/1983 | Zautner |
| D270,546 | S | 9/1983 | Malmberg |
| 4,421,380 | A | 12/1983 | McGrew |
| 4,423,287 | A * | 12/1983 | Zeidler ............ 705/71 |
| 4,436,991 | A | 3/1984 | Albert et al. |
| 4,443,027 | A | 4/1984 | McNelly et al. |
| 4,450,535 | A | 5/1984 | dePommery et al. |
| 4,453,074 | A | 6/1984 | Weinstein |
| 4,475,308 | A | 10/1984 | Heise et al. |
| 4,504,084 | A | 3/1985 | Jauch |
| 4,507,652 | A | 3/1985 | Vogt et al. |
| D280,214 | S | 8/1985 | Opel |
| 4,538,059 | A | 8/1985 | Rudland |
| 4,547,002 | A | 10/1985 | Colgate, Jr. |
| 4,558,211 | A | 12/1985 | Berstein |
| 4,563,024 | A | 1/1986 | Blyth |
| 4,581,523 | A | 4/1986 | Okuno |
| 4,582,985 | A | 4/1986 | Lofberg |
| 4,583,766 | A | 4/1986 | Wessel |
| 4,589,686 | A | 5/1986 | McGrew |
| 4,593,936 | A | 6/1986 | Opel |
| 4,597,814 | A | 7/1986 | Colgate, Jr. |
| 4,639,765 | A | 1/1987 | d'Hont |
| 4,641,017 | A | 2/1987 | Lopata |
| 4,643,452 | A | 2/1987 | Chang |
| 4,656,463 | A | 4/1987 | Anders et al. |
| 4,663,518 | A | 5/1987 | Borror et al. |
| 4,672,021 | A | 6/1987 | Blumel et al. |
| 4,684,795 | A | 8/1987 | Colgate, Jr. |
| 4,692,394 | A | 9/1987 | Drexler |
| 4,694,148 | A | 9/1987 | Diekemper et al. |
| 4,697,073 | A | 9/1987 | Hara |
| 4,697,363 | A | 10/1987 | Gamm |
| 4,700,055 | A | 10/1987 | Kashkashian, Jr. |
| 4,711,690 | A | 12/1987 | Haghiri-Tehrani |
| 4,717,221 | A | 1/1988 | McGrew |
| 4,725,719 | A | 2/1988 | Oncken et al. |
| 4,736,094 | A | 4/1988 | Yoshida |
| 4,739,328 | A | 4/1988 | Koelle et al. |
| 4,744,497 | A | 5/1988 | O'Neal |
| 4,747,147 | A | 5/1988 | Sparrow |
| 4,768,811 | A | 9/1988 | Oshikoshi et al. |
| 4,779,898 | A | 10/1988 | Berning et al. |
| 4,794,142 | A | 12/1988 | Alberts et al. |
| 4,795,894 | A | 1/1989 | Sugimoto et al. |
| 4,801,790 | A | 1/1989 | Solo |
| 4,816,653 | A | 3/1989 | Anderl et al. |
| 4,829,690 | A | 5/1989 | Andros |
| 4,837,422 | A | 6/1989 | Dethloff et al. |
| 4,839,504 | A | 6/1989 | Nakano |
| 4,841,570 | A | 6/1989 | Cooper |
| 4,849,617 | A | 7/1989 | Ueda |
| 4,852,911 | A | 8/1989 | Hoppe |
| 4,853,525 | A | 8/1989 | Vogt et al. |
| 4,863,819 | A | 9/1989 | Drexler et al. |
| 4,868,849 | A | 9/1989 | Tamaoki |
| 4,884,507 | A | 12/1989 | Levy |
| 4,889,366 | A | 12/1989 | Fabbiani |
| 4,897,533 | A | 1/1990 | Lyszczarz |
| 4,897,947 | A | 2/1990 | Kass-Pious |
| 4,910,521 | A | 3/1990 | Mellon |
| 4,917,292 | A | 4/1990 | Drexler |
| 4,918,432 | A | 4/1990 | Pauley et al. |
| D307,979 | S | 5/1990 | Purvis |
| 4,937,963 | A | 7/1990 | Barnes |
| D310,386 | S | 9/1990 | Michels et al. |
| 4,961,142 | A | 10/1990 | Elliott et al. |
| 4,984,270 | A | 1/1991 | LaBounty |
| 4,993,068 | A | 2/1991 | Piosenka et al. |
| 4,998,753 | A | 3/1991 | Wichael |
| 5,004,899 | A | 4/1991 | Ueda |
| 5,010,243 | A | 4/1991 | Fukushima et al. |
| 5,015,830 | A | 5/1991 | Masuzawa et al. |
| 5,016,274 | A | 5/1991 | Micali et al. |
| 5,023,782 | A | 6/1991 | Lutz et al. |
| 5,023,908 | A | 6/1991 | Weiss |
| 5,025,372 | A | 6/1991 | Burton et al. |
| 5,052,328 | A | 10/1991 | Eppenbach |
| 5,053,774 | A | 10/1991 | Schuermann et al. |
| 5,096,228 | A | 3/1992 | Rinderknecht |
| 5,099,226 | A | 3/1992 | Andrews |
| 5,101,200 | A | 3/1992 | Swett |
| 5,106,125 | A | 4/1992 | Antes |
| 5,111,033 | A | 5/1992 | Fujita et al. |
| 5,125,356 | A | 6/1992 | Galante |
| 5,142,383 | A | 8/1992 | Mallik |
| 5,171,039 | A | 12/1992 | Dusek |
| 5,175,416 | A | 12/1992 | Mansvelt et al. |
| 5,180,902 | A | 1/1993 | Schick et al. |
| 5,192,947 | A | 3/1993 | Neustein |
| 5,193,114 | A | 3/1993 | Moseley |
| 5,197,140 | A | 3/1993 | Balmer |
| 5,198,647 | A | 3/1993 | Mizuta |
| 5,202,826 | A | 4/1993 | McCarthy |
| 5,206,488 | A | 4/1993 | Teicher |
| 5,208,110 | A | 5/1993 | Smith et al. |
| 5,212,777 | A | 5/1993 | Gove et al. |
| 5,217,844 | A | 6/1993 | Fukushima et al. |
| 5,221,838 | A | 6/1993 | Gutman et al. |
| 5,222,282 | A | 6/1993 | Sukonnik et al. |
| 5,226,989 | A | 7/1993 | Sukonnik |
| 5,234,624 | A | 8/1993 | Bauer et al. |

(56) References Cited

U.S. PATENT DOCUMENTS

| | | |
|---|---|---|
| 5,239,654 A | 8/1993 | Ing-Simmons et al. |
| 5,245,329 A | 9/1993 | Gokcebay |
| 5,247,304 A | 9/1993 | d'Hont |
| 5,251,937 A | 10/1993 | Ojster |
| 5,256,473 A | 10/1993 | Kotani et al. |
| 5,257,656 A | 11/1993 | McLeroy |
| 5,259,649 A | 11/1993 | Shomron |
| 5,272,326 A | 12/1993 | Fujita et al. |
| 5,274,392 A | 12/1993 | D'Hont et al. |
| 5,276,311 A | 1/1994 | Hennige |
| 5,279,019 A | 1/1994 | Knickle |
| 5,285,100 A | 2/1994 | Byatt |
| 5,300,764 A | 4/1994 | Hoshino et al. |
| 5,304,789 A | 4/1994 | Lob et al. |
| 5,305,002 A | 4/1994 | Holodak et al. |
| 5,308,121 A | 5/1994 | Gunn |
| 5,311,679 A | 5/1994 | Birch, Sr. |
| 5,321,751 A | 6/1994 | Ray et al. |
| 5,326,964 A | 7/1994 | Risser |
| 5,329,617 A | 7/1994 | Asal |
| 5,331,138 A | 7/1994 | Saroya |
| 5,339,447 A | 8/1994 | Balmer |
| 5,349,357 A | 9/1994 | Schurmann et al. |
| 5,350,906 A | 9/1994 | Brody et al. |
| 5,351,052 A | 9/1994 | d'Hont et al. |
| 5,351,142 A | 9/1994 | Cueli |
| 5,355,411 A | 10/1994 | MacDonald |
| 5,359,522 A | 10/1994 | Ryan |
| 5,365,551 A | 11/1994 | Snodgrass et al. |
| 5,371,896 A | 12/1994 | Gove et al. |
| 5,373,303 A | 12/1994 | d'Hont |
| 5,383,687 A | 1/1995 | Suess et al. |
| 5,397,881 A | 3/1995 | Mannik |
| 5,407,893 A | 4/1995 | Koshizuka et al. |
| 5,408,243 A | 4/1995 | d'Hont |
| 5,410,142 A | 4/1995 | Tsuboi et al. |
| 5,410,649 A | 4/1995 | Gove |
| 5,412,192 A | 5/1995 | Hoss |
| 5,428,363 A | 6/1995 | d'Hont |
| 5,438,184 A | 8/1995 | Roberts et al. |
| 5,453,601 A | 9/1995 | Rosen |
| 5,453,747 A | 9/1995 | d'Hont et al. |
| 5,461,217 A | 10/1995 | Claus |
| 5,461,219 A | 10/1995 | Cronvall |
| 5,471,592 A | 11/1995 | Gove et al. |
| 5,477,038 A | 12/1995 | Levine et al. |
| 5,477,040 A | 12/1995 | Lalonde |
| 5,478,629 A | 12/1995 | Norman |
| 5,479,530 A | 12/1995 | Nair et al. |
| 5,481,265 A * | 1/1996 | Russell ............................ 341/22 |
| 5,485,510 A | 1/1996 | Colbert |
| 5,488,376 A | 1/1996 | Hurta et al. |
| 5,489,411 A | 2/1996 | Jha et al. |
| 5,489,908 A | 2/1996 | Orthmann et al. |
| 5,490,079 A | 2/1996 | Sharpe et al. |
| 5,491,483 A | 2/1996 | d'Hont |
| 5,491,484 A | 2/1996 | Schuermann |
| 5,491,715 A | 2/1996 | Flaxl |
| 5,493,312 A | 2/1996 | Knebelkamp |
| 5,497,121 A | 3/1996 | d'Hont |
| 5,500,513 A | 3/1996 | Langhans et al. |
| 5,500,651 A | 3/1996 | Schuermann |
| 5,503,434 A | 4/1996 | Gunn |
| 5,504,808 A | 4/1996 | Hamrick, Jr. |
| 5,506,395 A | 4/1996 | Eppley |
| 5,513,272 A | 4/1996 | Bogosian, Jr. |
| 5,513,525 A | 5/1996 | Schurmann |
| 5,514,860 A | 5/1996 | Berson |
| 5,516,153 A | 5/1996 | Kaule |
| 5,518,810 A | 5/1996 | Nishihara et al. |
| 5,519,381 A | 5/1996 | Marsh et al. |
| 5,520,230 A | 5/1996 | Sumner, III |
| 5,521,966 A | 5/1996 | Friedes et al. |
| 5,522,083 A | 5/1996 | Gove et al. |
| 5,525,992 A | 6/1996 | Froschermeier |
| 5,525,994 A | 6/1996 | Hurta et al. |
| 5,528,222 A | 6/1996 | Moskowitz et al. |
| 5,530,232 A | 6/1996 | Taylor |
| 5,533,656 A | 7/1996 | Bonaldi |
| 5,534,857 A | 7/1996 | Laing et al. |
| 5,537,314 A | 7/1996 | Kanter |
| 5,539,825 A | 7/1996 | Akiyama |
| 5,541,582 A | 7/1996 | Wagner et al. |
| 5,541,604 A | 7/1996 | Meier |
| 5,543,798 A | 8/1996 | Schuermann |
| 5,544,246 A | 8/1996 | Mandelbaum et al. |
| 5,548,291 A | 8/1996 | Meier et al. |
| 5,550,536 A | 8/1996 | Flaxl |
| 5,550,548 A | 8/1996 | Schuermann |
| 5,552,789 A | 9/1996 | Schuermann |
| 5,555,877 A | 9/1996 | Lockwood et al. |
| 5,557,279 A | 9/1996 | d'Hont |
| 5,557,516 A | 9/1996 | Hogan |
| 5,559,504 A | 9/1996 | Itsumi et al. |
| 5,559,887 A | 9/1996 | Davis et al. |
| 5,561,430 A | 10/1996 | Knebelkamp |
| 5,563,582 A | 10/1996 | d'Hont |
| 5,569,187 A | 10/1996 | Kaiser |
| 5,569,897 A | 10/1996 | Masuda |
| 5,572,226 A | 11/1996 | Tuttle |
| 5,572,815 A | 11/1996 | Kovner |
| 5,575,094 A | 11/1996 | Leake et al. |
| 5,577,109 A | 11/1996 | Stimson et al. |
| 5,577,120 A | 11/1996 | Penzias |
| 5,577,121 A | 11/1996 | Davis et al. |
| 5,577,609 A | 11/1996 | Hexter |
| 5,578,808 A | 11/1996 | Taylor |
| 5,581,630 A | 12/1996 | Bonneau, Jr. |
| 5,585,787 A | 12/1996 | Wallerstein |
| 5,590,038 A * | 12/1996 | Pitroda ............................ 705/41 |
| 5,590,197 A | 12/1996 | Chen et al. |
| 5,592,150 A | 1/1997 | d'Hont |
| 5,592,405 A | 1/1997 | Gove et al. |
| 5,592,767 A | 1/1997 | Treske |
| 5,594,227 A | 1/1997 | Deo |
| 5,594,233 A | 1/1997 | Kenneth et al. |
| 5,594,448 A | 1/1997 | d'Hont |
| 5,597,534 A | 1/1997 | Kaiser |
| 5,600,175 A | 2/1997 | Orthmann |
| 5,602,538 A | 2/1997 | Orthmann et al. |
| 5,602,918 A | 2/1997 | Chen et al. |
| 5,602,919 A | 2/1997 | Hurta et al. |
| 5,604,342 A | 2/1997 | Fujioka |
| 5,604,801 A | 2/1997 | Dolan et al. |
| 5,606,520 A | 2/1997 | Gove et al. |
| 5,606,594 A | 2/1997 | Register et al. |
| 5,607,522 A | 3/1997 | McDonnell |
| 5,608,203 A | 3/1997 | Finkelstein et al. |
| 5,608,406 A | 3/1997 | Eberth et al. |
| 5,608,778 A | 3/1997 | Partridge, III |
| 5,611,965 A | 3/1997 | Shouji et al. |
| 5,613,001 A | 3/1997 | Bakhoum |
| 5,613,131 A | 3/1997 | Moss et al. |
| 5,613,146 A | 3/1997 | Gove et al. |
| 5,614,703 A | 3/1997 | Martin et al. |
| 5,619,207 A | 4/1997 | d'Hont |
| 5,621,199 A | 4/1997 | Calari et al. |
| 5,621,396 A | 4/1997 | Flaxl |
| 5,621,411 A | 4/1997 | Hagl et al. |
| 5,621,412 A | 4/1997 | Sharpe et al. |
| 5,625,366 A | 4/1997 | d'Hont |
| 5,625,370 A | 4/1997 | d'Hont |
| 5,625,695 A | 4/1997 | M'Raihi et al. |
| 5,629,981 A | 5/1997 | Nerlikar |
| 5,638,080 A | 6/1997 | Orthmann et al. |
| 5,640,002 A | 6/1997 | Ruppert et al. |
| 5,641,050 A | 6/1997 | Smith et al. |
| 5,646,607 A | 7/1997 | Schurmann et al. |
| 5,649,118 A | 7/1997 | Carlisle et al. |
| 5,657,388 A | 8/1997 | Weiss |
| 5,660,319 A | 8/1997 | Falcone et al. |
| 5,665,439 A | 9/1997 | Andersen et al. |
| 5,668,876 A | 9/1997 | Falk et al. |
| 5,673,106 A | 9/1997 | Thompson |

(56) References Cited

U.S. PATENT DOCUMENTS

| | | |
|---|---|---|
| D384,971 S | 10/1997 | Kawan |
| 5,675,342 A | 10/1997 | Sharpe |
| 5,677,953 A | 10/1997 | Dolphin |
| 5,686,920 A | 11/1997 | Hurta et al. |
| 5,689,100 A | 11/1997 | Carrithers |
| 5,691,731 A | 11/1997 | van Erven |
| 5,692,132 A | 11/1997 | Hogan |
| 5,694,596 A | 12/1997 | Campbell |
| 5,696,913 A | 12/1997 | Gove et al. |
| 5,697,649 A | 12/1997 | Dames et al. |
| 5,698,837 A | 12/1997 | Furuta |
| 5,699,528 A | 12/1997 | Hogan |
| 5,700,037 A | 12/1997 | Keller |
| 5,701,127 A | 12/1997 | Sharpe |
| 5,704,046 A | 12/1997 | Hogan |
| 5,705,101 A | 1/1998 | Oi et al. |
| 5,705,798 A | 1/1998 | Tarbox |
| 5,705,852 A | 1/1998 | Orihara et al. |
| 5,710,421 A | 1/1998 | Kokubu |
| 5,715,314 A | 2/1998 | Payne et al. |
| 5,715,399 A | 2/1998 | Bezos |
| 5,720,500 A | 2/1998 | Okazaki et al. |
| 5,721,781 A | 2/1998 | Deo et al. |
| 5,724,424 A | 3/1998 | Gifford |
| 5,725,098 A | 3/1998 | Seifert et al. |
| 5,727,140 A | 3/1998 | Ohtomo et al. |
| 5,727,696 A | 3/1998 | Valiulis |
| 5,729,053 A | 3/1998 | Orthmann |
| 5,729,220 A * | 3/1998 | Russell ............................ 341/22 |
| 5,729,236 A | 3/1998 | Flaxl |
| 5,731,957 A | 3/1998 | Brennan |
| 5,732,579 A | 3/1998 | d'Hont et al. |
| 5,734,838 A | 3/1998 | Robinson et al. |
| 5,737,439 A | 4/1998 | Lapsley et al. |
| 5,739,512 A | 4/1998 | Toganazzini |
| 5,742,756 A | 4/1998 | Dillaway et al. |
| 5,742,845 A | 4/1998 | Wagner |
| 5,748,137 A | 5/1998 | d'Hont |
| 5,748,737 A | 5/1998 | Daggar |
| 5,757,917 A | 5/1998 | Rose et al. |
| 5,758,195 A | 5/1998 | Balmer |
| 5,761,306 A | 6/1998 | Lewis |
| 5,761,493 A | 6/1998 | Blakeley et al. |
| 5,764,789 A | 6/1998 | Pare, Jr. et al. |
| 5,768,385 A | 6/1998 | Simon |
| 5,768,609 A | 6/1998 | Gove et al. |
| 5,769,457 A | 6/1998 | Warther |
| 5,770,843 A | 6/1998 | Rose et al. |
| 5,773,812 A | 6/1998 | Kreft |
| 5,774,882 A | 6/1998 | Keen et al. |
| 5,777,903 A | 7/1998 | Piosenka |
| 5,778,067 A | 7/1998 | Jones et al. |
| 5,778,069 A | 7/1998 | Thomlinson |
| 5,778,173 A | 7/1998 | Apte |
| 5,785,680 A | 7/1998 | Niezink et al. |
| 5,786,587 A | 7/1998 | Colgate, Jr. |
| 5,789,733 A | 8/1998 | Jachimowicz et al. |
| 5,791,474 A | 8/1998 | Hansen |
| 5,792,337 A | 8/1998 | Padovani et al. |
| 5,793,324 A | 8/1998 | Aslanidis et al. |
| 5,794,095 A | 8/1998 | Thompson |
| 5,796,831 A | 8/1998 | Paradinas et al. |
| 5,796,832 A * | 8/1998 | Kawan ............................ 705/65 |
| 5,797,060 A | 8/1998 | Thompson |
| 5,797,085 A | 8/1998 | Buek et al. |
| 5,797,133 A | 8/1998 | Jones et al. |
| 5,798,709 A | 8/1998 | Flaxl |
| 5,799,087 A | 8/1998 | Rosen |
| 5,806,040 A | 9/1998 | Vensko |
| 5,806,045 A | 9/1998 | Biorge et al. |
| 5,808,758 A | 9/1998 | Solmsdorf |
| 5,809,142 A | 9/1998 | Hurta et al. |
| 5,809,288 A | 9/1998 | Balmer |
| 5,809,633 A | 9/1998 | Mundigl et al. |
| 5,815,252 A | 9/1998 | Price-Francis |
| 5,815,657 A | 9/1998 | Williams et al. |
| 5,823,359 A | 10/1998 | Harris et al. |
| 5,825,007 A | 10/1998 | Jesadanont |
| 5,825,302 A | 10/1998 | Stafford |
| 5,826,077 A | 10/1998 | Blakeley et al. |
| 5,826,241 A | 10/1998 | Stein et al. |
| 5,826,242 A | 10/1998 | Montulli |
| 5,826,243 A | 10/1998 | Musmanno et al. |
| 5,828,044 A | 10/1998 | Jun et al. |
| 5,834,756 A | 11/1998 | Gutman et al. |
| 5,835,894 A | 11/1998 | Adcock et al. |
| 5,838,257 A | 11/1998 | Lambropoulos |
| 5,838,720 A | 11/1998 | Morelli |
| 5,838,812 A | 11/1998 | Pare, Jr. et al. |
| 5,841,364 A | 11/1998 | Hagl et al. |
| 5,842,088 A | 11/1998 | Thompson |
| 5,844,218 A | 12/1998 | Kawan et al. |
| 5,844,230 A | 12/1998 | Lalonde |
| 5,845,267 A | 12/1998 | Ronen |
| 5,851,149 A | 12/1998 | Xidos et al. |
| 5,852,812 A | 12/1998 | Reeder |
| 5,854,891 A | 12/1998 | Postlewaite et al. |
| 5,856,048 A | 1/1999 | Tahara et al. |
| 5,857,079 A | 1/1999 | Claus et al. |
| 5,857,152 A | 1/1999 | Everett |
| 5,857,709 A | 1/1999 | Chock |
| 5,858,006 A | 1/1999 | Van der AA et al. |
| 5,859,419 A | 1/1999 | Wynn |
| 5,859,587 A | 1/1999 | Alicot et al. |
| 5,859,779 A | 1/1999 | Giordano et al. |
| 5,862,325 A | 1/1999 | Reed et al. |
| 5,864,306 A | 1/1999 | Dwyer et al. |
| 5,864,323 A | 1/1999 | Berthon |
| 5,864,830 A | 1/1999 | Armetta et al. |
| 5,865,470 A | 2/1999 | Thompson |
| 5,867,100 A | 2/1999 | d'Hont |
| 5,869,822 A | 2/1999 | Meadows et al. |
| 5,870,031 A | 2/1999 | Kaiser et al. |
| 5,870,915 A | 2/1999 | d'Hont |
| 5,875,432 A | 2/1999 | Sehr |
| D406,861 S | 3/1999 | Leedy, Jr. |
| 5,878,138 A | 3/1999 | Yacobi |
| 5,878,141 A | 3/1999 | Daly et al. |
| 5,878,215 A | 3/1999 | Kling et al. |
| 5,878,337 A | 3/1999 | Joao et al. |
| 5,878,403 A | 3/1999 | DeFrancesco et al. |
| 5,880,675 A | 3/1999 | Trautner |
| 5,881,272 A | 3/1999 | Balmer |
| 5,883,377 A | 3/1999 | Chapin, Jr. |
| 5,883,810 A | 3/1999 | Franklin et al. |
| 5,884,271 A | 3/1999 | Pitroda |
| 5,884,280 A | 3/1999 | Yoshioka et al. |
| 5,884,292 A | 3/1999 | Baker et al. |
| 5,884,310 A | 3/1999 | Brichta et al. |
| 5,886,333 A | 3/1999 | Miyake |
| 5,887,266 A | 3/1999 | Heinonen et al. |
| 5,889,941 A | 3/1999 | Tushie et al. |
| 5,890,137 A | 3/1999 | Koreeda |
| D408,054 S | 4/1999 | Leedy, Jr. |
| 5,892,211 A | 4/1999 | Davis et al. |
| 5,897,622 A | 4/1999 | Blinn et al. |
| 5,898,783 A | 4/1999 | Rohrbach |
| 5,898,838 A | 4/1999 | Wagner |
| 5,900,954 A | 5/1999 | Katz et al. |
| 5,901,239 A | 5/1999 | Kamei |
| 5,903,652 A | 5/1999 | Mital |
| 5,903,830 A | 5/1999 | Joao et al. |
| 5,903,875 A | 5/1999 | Kohara |
| 5,903,880 A | 5/1999 | Biffar |
| 5,905,798 A | 5/1999 | Nerlikar et al. |
| 5,905,908 A | 5/1999 | Wagner |
| 5,907,620 A | 5/1999 | Klemba et al. |
| 5,909,492 A | 6/1999 | Payne et al. |
| 5,912,446 A | 6/1999 | Wong et al. |
| 5,912,678 A | 6/1999 | Saxena et al. |
| 5,913,203 A | 6/1999 | Wong et al. |
| 5,914,472 A | 6/1999 | Foladare et al. |
| 5,915,016 A | 6/1999 | Savalle et al. |
| 5,915,023 A | 6/1999 | Bernstein |

(56) References Cited

U.S. PATENT DOCUMENTS

| | | |
|---|---|---|
| 5,915,973 A | 6/1999 | Hoehn-Saric et al. |
| 5,917,168 A | 6/1999 | Nakamura et al. |
| 5,917,913 A | 6/1999 | Wang |
| 5,917,925 A | 6/1999 | Moore |
| 5,918,216 A | 6/1999 | Miksovsky et al. |
| 5,920,058 A | 7/1999 | Weber et al. |
| 5,920,628 A | 7/1999 | Indeck et al. |
| 5,920,629 A | 7/1999 | Rosen |
| 5,920,847 A | 7/1999 | Kolling et al. |
| 5,923,734 A | 7/1999 | Taskett |
| 5,923,884 A | 7/1999 | Peyret et al. |
| 5,924,080 A | 7/1999 | Johnson |
| 5,924,624 A | 7/1999 | Martin |
| 5,928,788 A | 7/1999 | Riedl |
| 5,929,801 A | 7/1999 | Aslanidis et al. |
| 5,930,767 A | 7/1999 | Reber et al. |
| 5,930,777 A | 7/1999 | Barber |
| 5,931,917 A | 8/1999 | Nguyen et al. |
| 5,932,870 A | 8/1999 | Berson |
| 5,933,328 A | 8/1999 | Wallace et al. |
| 5,933,624 A | 8/1999 | Balmer |
| 5,936,226 A | 8/1999 | Aucsmith |
| 5,936,227 A | 8/1999 | Truggelmann et al. |
| 5,938,010 A | 8/1999 | Osterbye |
| 5,942,761 A | 8/1999 | Tuli |
| 5,943,624 A | 8/1999 | Fox et al. |
| 5,945,653 A | 8/1999 | Walker et al. |
| 5,948,116 A | 9/1999 | Aslanidis et al. |
| 5,949,044 A | 9/1999 | Walker et al. |
| 5,949,335 A | 9/1999 | Maynard |
| 5,949,876 A | 9/1999 | Ginter et al. |
| 5,950,174 A | 9/1999 | Brendzel |
| 5,950,179 A | 9/1999 | Buchanan |
| 5,953,512 A | 9/1999 | Cai et al. |
| 5,953,710 A | 9/1999 | Fleming |
| 5,955,717 A | 9/1999 | Vanstone |
| 5,955,951 A | 9/1999 | Wischerop et al. |
| 5,955,969 A | 9/1999 | d'Hont |
| 5,956,024 A | 9/1999 | Strickland et al. |
| 5,956,693 A | 9/1999 | Geerlings |
| 5,956,699 A | 9/1999 | Wong et al. |
| 5,958,004 A | 9/1999 | Helland et al. |
| 5,960,411 A | 9/1999 | Hartman et al. |
| 5,960,416 A | 9/1999 | Block |
| 5,963,915 A | 10/1999 | Kirsch |
| 5,963,924 A | 10/1999 | Williams et al. |
| 5,966,697 A | 10/1999 | Fergerson et al. |
| 5,968,570 A | 10/1999 | Paulucci |
| 5,969,318 A | 10/1999 | Mackenthun |
| 5,970,148 A | 10/1999 | Meier |
| 5,970,470 A | 10/1999 | Walker |
| 5,970,471 A | 10/1999 | Hill |
| 5,970,472 A | 10/1999 | Allsop et al. |
| 5,970,473 A | 10/1999 | Gerszberg et al. |
| 5,970,475 A | 10/1999 | Barnes et al. |
| 5,971,276 A | 10/1999 | Sano et al. |
| 5,973,475 A | 10/1999 | Combaluzier |
| 5,974,238 A | 10/1999 | Chase, Jr. |
| RE36,365 E | 11/1999 | Levine et al. |
| 5,978,348 A | 11/1999 | Tamura |
| 5,978,840 A | 11/1999 | Nguyen et al. |
| 5,979,757 A | 11/1999 | Tracy et al. |
| 5,979,942 A | 11/1999 | Ivicic |
| 5,982,293 A | 11/1999 | Everett et al. |
| 5,983,200 A | 11/1999 | Slotznick |
| 5,983,207 A | 11/1999 | Turk et al. |
| 5,983,208 A | 11/1999 | Haller |
| 5,984,180 A | 11/1999 | Albrecht |
| 5,987,140 A | 11/1999 | Rowney et al. |
| 5,987,155 A | 11/1999 | Dunn et al. |
| 5,987,498 A | 11/1999 | Athing et al. |
| 5,988,497 A | 11/1999 | Wallace |
| 5,988,510 A | 11/1999 | Tuttle |
| 5,989,950 A | 11/1999 | Wu |
| 5,991,413 A | 11/1999 | Arditti et al. |
| 5,991,608 A | 11/1999 | Leyten |
| 5,991,748 A | 11/1999 | Taskett |
| 5,991,750 A | 11/1999 | Watson |
| 5,995,014 A | 11/1999 | DiMaria |
| 5,996,076 A | 11/1999 | Rowney et al. |
| 5,999,914 A | 12/1999 | Blinn et al. |
| 6,000,832 A | 12/1999 | Franklin et al. |
| 6,002,438 A | 12/1999 | Hocevar et al. |
| 6,002,767 A | 12/1999 | Kramer |
| 6,003,014 A | 12/1999 | Lee et al. |
| 6,005,942 A | 12/1999 | Chan et al. |
| 6,006,216 A | 12/1999 | Griffin et al. |
| 6,006,988 A | 12/1999 | Behrmann et al. |
| 6,009,412 A | 12/1999 | Storey |
| 6,011,487 A | 1/2000 | Plocher |
| 6,012,039 A | 1/2000 | Hoffman et al. |
| 6,012,049 A | 1/2000 | Kawan |
| 6,012,143 A | 1/2000 | Tanaka |
| 6,012,636 A | 1/2000 | Smith |
| 6,014,634 A | 1/2000 | Scroggie et al. |
| 6,014,635 A | 1/2000 | Harris et al. |
| 6,014,636 A | 1/2000 | Reeder |
| 6,014,645 A | 1/2000 | Cunningham |
| 6,014,646 A | 1/2000 | Vallee et al. |
| 6,014,648 A | 1/2000 | Brennan |
| 6,014,650 A | 1/2000 | Zampese |
| 6,014,748 A | 1/2000 | Tushi et al. |
| 6,016,476 A | 1/2000 | Maes et al. |
| 6,016,482 A | 1/2000 | Molinari et al. |
| 6,016,484 A | 1/2000 | Williams et al. |
| 6,018,717 A | 1/2000 | Lee et al. |
| 6,018,718 A | 1/2000 | Walker et al. |
| RE36,580 E | 2/2000 | Bogosian, Jr. |
| 6,021,943 A | 2/2000 | Chastain |
| 6,023,510 A | 2/2000 | Epstein |
| 6,024,286 A | 2/2000 | Bradley et al. |
| 6,024,385 A | 2/2000 | Goda |
| 6,025,283 A | 2/2000 | Roberts |
| 6,026,166 A | 2/2000 | LeBourgeois |
| 6,027,028 A | 2/2000 | Pieterse et al. |
| 6,029,147 A | 2/2000 | Horadan et al. |
| 6,029,149 A | 2/2000 | Dykstra et al. |
| 6,029,150 A | 2/2000 | Kravitz |
| 6,029,175 A | 2/2000 | Chow |
| 6,029,890 A | 2/2000 | Austin |
| 6,029,892 A | 2/2000 | Miyake |
| 6,032,136 A | 2/2000 | Brake, Jr. et al. |
| 6,032,866 A | 3/2000 | Knighton et al. |
| 6,036,100 A | 3/2000 | Asami |
| 6,038,292 A | 3/2000 | Thomas |
| 6,038,551 A | 3/2000 | Barlow et al. |
| 6,038,584 A | 3/2000 | Balmer |
| 6,041,308 A | 3/2000 | Walker et al. |
| 6,041,410 A | 3/2000 | Hsu et al. |
| 6,041,412 A | 3/2000 | Timson et al. |
| 6,044,360 A | 3/2000 | Picciallo |
| 6,044,388 A | 3/2000 | DeBellis et al. |
| 6,047,888 A | 4/2000 | Dethloff |
| 6,050,494 A | 4/2000 | Song et al. |
| 6,050,605 A | 4/2000 | Mikelionis et al. |
| 6,052,675 A | 4/2000 | Cheechio |
| 6,058,418 A | 5/2000 | Kobata |
| 6,060,815 A | 5/2000 | Nysen |
| 6,061,344 A | 5/2000 | Wood, Jr. |
| 6,061,789 A | 5/2000 | Hauser et al. |
| 6,064,320 A | 5/2000 | d'Hont et al. |
| 6,064,751 A | 5/2000 | Smithies et al. |
| 6,064,981 A | 5/2000 | Barni et al. |
| 6,065,675 A | 5/2000 | Teicher |
| 6,068,184 A | 5/2000 | Barnett |
| 6,068,193 A | 5/2000 | Kreft |
| 6,069,952 A | 5/2000 | Saito et al. |
| 6,070,003 A | 5/2000 | Gove et al. |
| 6,070,150 A | 5/2000 | Remington et al. |
| 6,070,154 A | 5/2000 | Tavor et al. |
| 6,072,870 A | 6/2000 | Nguyen et al. |
| 6,073,112 A | 6/2000 | Geerlings |
| 6,073,840 A | 6/2000 | Marion |
| 6,076,078 A | 6/2000 | Camp et al. |

(56) References Cited

U.S. PATENT DOCUMENTS

| | | |
|---|---|---|
| 6,076,296 A | 6/2000 | Schaeffer |
| 6,078,888 A * | 6/2000 | Johnson, Jr. .................. 705/1 |
| 6,078,906 A | 6/2000 | Huberman |
| 6,078,908 A | 6/2000 | Schmitz |
| 6,081,790 A | 6/2000 | Rosen |
| RE36,788 E | 7/2000 | Mansvelt et al. |
| 6,082,422 A | 7/2000 | Kaminski |
| 6,084,967 A | 7/2000 | Kennedy et al. |
| 6,085,976 A | 7/2000 | Sehr |
| 6,086,971 A | 7/2000 | Haas et al. |
| 6,088,683 A | 7/2000 | Jalili |
| 6,088,686 A | 7/2000 | Walker et al. |
| 6,088,717 A | 7/2000 | Reed et al. |
| 6,088,755 A | 7/2000 | Kobayashi et al. |
| 6,088,797 A | 7/2000 | Rosen |
| 6,089,611 A | 7/2000 | Blank |
| 6,091,835 A | 7/2000 | Smithies et al. |
| 6,092,057 A | 7/2000 | Zimmerman et al. |
| 6,092,198 A | 7/2000 | Lanzy et al. |
| 6,095,413 A | 8/2000 | Tetro et al. |
| 6,095,567 A | 8/2000 | Buell |
| 6,098,053 A | 8/2000 | Slater |
| 6,098,879 A | 8/2000 | Terranova |
| 6,099,043 A | 8/2000 | Story |
| 6,100,804 A | 8/2000 | Brady et al. |
| 6,101,174 A | 8/2000 | Langston |
| 6,101,477 A | 8/2000 | Hohle et al. |
| 6,102,162 A | 8/2000 | Teicher |
| 6,102,672 A | 8/2000 | Woollenweber |
| 6,104,311 A | 8/2000 | Lastinger |
| 6,104,922 A | 8/2000 | Baumann |
| 6,105,008 A | 8/2000 | Davis et al. |
| 6,105,013 A | 8/2000 | Curry et al. |
| 6,105,865 A | 8/2000 | Hardesty |
| 6,107,920 A | 8/2000 | Eberhardt et al. |
| 6,108,641 A | 8/2000 | Kenna et al. |
| 6,109,525 A | 8/2000 | Blomqvist et al. |
| 6,112,152 A | 8/2000 | Tuttle |
| 6,112,191 A | 8/2000 | Burke |
| 6,115,040 A | 9/2000 | Bladow et al. |
| 6,115,360 A | 9/2000 | Quay et al. |
| 6,115,458 A | 9/2000 | Taskett |
| 6,116,423 A | 9/2000 | Troxtell, Jr. et al. |
| 6,116,505 A | 9/2000 | Withrow |
| 6,116,655 A | 9/2000 | Thouin et al. |
| 6,116,736 A | 9/2000 | Stark et al. |
| 6,118,189 A | 9/2000 | Flaxl |
| 6,120,461 A | 9/2000 | Smyth |
| 6,121,544 A | 9/2000 | Petsinger |
| 6,122,625 A | 9/2000 | Rosen |
| 6,123,223 A | 9/2000 | Watkins |
| 6,125,352 A | 9/2000 | Franklin et al. |
| D432,939 S | 10/2000 | Hooglander |
| 6,128,604 A | 10/2000 | Sakamaki et al. |
| 6,129,274 A | 10/2000 | Suzuki |
| 6,130,623 A | 10/2000 | MacLellan et al. |
| 6,133,834 A | 10/2000 | Eberth et al. |
| 6,138,913 A | 10/2000 | Cyr et al. |
| 6,138,917 A | 10/2000 | Chapin, Jr. |
| 6,141,651 A | 10/2000 | Riley et al. |
| 6,141,752 A | 10/2000 | Dancs et al. |
| 6,144,916 A | 11/2000 | Wood et al. |
| 6,144,948 A | 11/2000 | Walker et al. |
| 6,148,093 A | 11/2000 | McConnell et al. |
| 6,148,484 A | 11/2000 | Andreae, Jr. |
| 6,154,879 A | 11/2000 | Pare et al. |
| 6,155,168 A | 12/2000 | Sakamoto |
| 6,157,824 A | 12/2000 | Bailey |
| 6,163,771 A | 12/2000 | Walker et al. |
| 6,167,236 A | 12/2000 | Kaiser et al. |
| 6,168,083 B1 | 1/2001 | Berger et al. |
| 6,171,138 B1 | 1/2001 | Lefebvre et al. |
| 6,173,269 B1 | 1/2001 | Solokl et al. |
| 6,173,272 B1 | 1/2001 | Thomas et al. |
| 6,173,897 B1 | 1/2001 | Halpern |
| 6,173,898 B1 | 1/2001 | Mande |
| 6,173,899 B1 | 1/2001 | Rozin |
| 6,177,859 B1 | 1/2001 | Tuttle et al. |
| 6,177,860 B1 | 1/2001 | Cromer et al. |
| 6,179,205 B1 | 1/2001 | Sloan |
| 6,179,206 B1 | 1/2001 | Matsumori |
| 6,181,287 B1 | 1/2001 | Beigel |
| 6,182,895 B1 | 2/2001 | Albrecht |
| 6,184,788 B1 | 2/2001 | Middlemiss et al. |
| 6,185,307 B1 | 2/2001 | Johnson, Jr. |
| 6,188,994 B1 | 2/2001 | Egendorf |
| 6,189,779 B1 | 2/2001 | Verdicchio et al. |
| 6,189,787 B1 | 2/2001 | Dorf |
| 6,192,255 B1 | 2/2001 | Lewis et al. |
| 6,195,006 B1 | 2/2001 | Bowers et al. |
| 6,196,465 B1 | 3/2001 | Awano |
| 6,197,396 B1 | 3/2001 | Haas et al. |
| 6,198,728 B1 | 3/2001 | Hulyalkar et al. |
| 6,198,762 B1 | 3/2001 | Krasnov |
| 6,198,875 B1 | 3/2001 | Edenson et al. |
| 6,199,079 B1 | 3/2001 | Gupta et al. |
| 6,199,762 B1 | 3/2001 | Hohle |
| 6,200,272 B1 | 3/2001 | Linden |
| 6,202,927 B1 | 3/2001 | Bashan et al. |
| 6,205,151 B1 | 3/2001 | Quay et al. |
| 6,206,293 B1 | 3/2001 | Gutman et al. |
| 6,213,390 B1 | 4/2001 | Oneda |
| 6,213,391 B1 | 4/2001 | Lewis |
| 6,215,437 B1 | 4/2001 | Schurmann et al. |
| 6,216,219 B1 | 4/2001 | Cai et al. |
| 6,219,439 B1 | 4/2001 | Burger |
| 6,219,639 B1 | 4/2001 | Bakis et al. |
| 6,220,510 B1 | 4/2001 | Everett et al. |
| 6,222,914 B1 | 4/2001 | McMullin |
| D442,627 S | 5/2001 | Webb et al. |
| D442,629 S | 5/2001 | Webb et al. |
| 6,223,977 B1 | 5/2001 | Hill |
| 6,223,984 B1 | 5/2001 | Renner et al. |
| 6,224,109 B1 | 5/2001 | Yang |
| 6,226,382 B1 | 5/2001 | M'Raihi et al. |
| 6,227,424 B1 | 5/2001 | Roegner |
| 6,227,447 B1 | 5/2001 | Campisano |
| 6,230,270 B1 | 5/2001 | Laczko, Sr. |
| 6,232,917 B1 | 5/2001 | Baumer et al. |
| 6,233,348 B1 | 5/2001 | Fujii et al. |
| 6,233,683 B1 | 5/2001 | Chan et al. |
| 6,237,848 B1 | 5/2001 | Everett |
| 6,239,675 B1 | 5/2001 | Flaxl |
| 6,240,187 B1 | 5/2001 | Lewis |
| 6,240,989 B1 | 6/2001 | Masoud |
| 6,247,030 B1 | 6/2001 | Suzuki |
| 6,248,199 B1 | 6/2001 | Smulson |
| 6,248,314 B1 | 6/2001 | Nakashimada et al. |
| 6,250,554 B1 | 6/2001 | Leo et al. |
| 6,250,557 B1 | 6/2001 | Forslund et al. |
| 6,255,031 B1 | 7/2001 | Yao et al. |
| 6,257,486 B1 | 7/2001 | Teicher et al. |
| 6,257,620 B1 | 7/2001 | Kenney |
| 6,259,769 B1 | 7/2001 | Page |
| 6,260,026 B1 | 7/2001 | Tomida et al. |
| 6,260,088 B1 | 7/2001 | Gove et al. |
| 6,263,316 B1 | 7/2001 | Khan et al. |
| 6,263,446 B1 | 7/2001 | Kausik et al. |
| 6,264,106 B1 | 7/2001 | Bridgelall |
| 6,265,977 B1 | 7/2001 | Vega et al. |
| 6,266,754 B1 | 7/2001 | Laczko, Sr. et al. |
| 6,267,292 B1 | 7/2001 | Walker et al. |
| 6,268,788 B1 | 7/2001 | Gray |
| 6,269,348 B1 | 7/2001 | Pare, Jr. et al. |
| 6,273,335 B1 | 8/2001 | Sloan |
| 6,277,232 B1 | 8/2001 | Wang et al. |
| 6,282,522 B1 | 8/2001 | Davis et al. |
| D447,515 S | 9/2001 | Faenza, Jr. et al. |
| 6,286,763 B1 | 9/2001 | Reynolds et al. |
| 6,289,324 B1 | 9/2001 | Kawan |
| 6,290,137 B1 | 9/2001 | Kiekhaefer |
| 6,293,462 B1 | 9/2001 | Gangi |
| 6,296,188 B1 | 10/2001 | Kiekhaefer |
| 6,297,727 B1 | 10/2001 | Nelson, Jr. |

(56) References Cited

U.S. PATENT DOCUMENTS

| | | |
|---|---|---|
| 6,304,223 B1 | 10/2001 | Hilton et al. |
| 6,304,899 B1 * | 10/2001 | Cromer et al. ............... 709/217 |
| 6,305,603 B1 | 10/2001 | Grunbok et al. |
| 6,307,956 B1 | 10/2001 | Black |
| 6,309,098 B1 | 10/2001 | Wong |
| 6,315,193 B1 | 11/2001 | Hogan |
| 6,315,195 B1 | 11/2001 | Ramacchandran |
| 6,315,206 B1 | 11/2001 | Hansen et al. |
| 6,317,721 B1 | 11/2001 | Hurta et al. |
| 6,317,750 B1 | 11/2001 | Tortolani et al. |
| 6,317,755 B1 | 11/2001 | Rakers et al. |
| 6,318,636 B1 | 11/2001 | Reynolds et al. |
| 6,323,566 B1 | 11/2001 | Meier |
| 6,325,285 B1 | 12/2001 | Baratelli |
| 6,325,293 B1 | 12/2001 | Moreno |
| 6,326,934 B1 | 12/2001 | Kinzie |
| 6,327,573 B1 | 12/2001 | Walker et al. |
| 6,327,578 B1 * | 12/2001 | Linehan ............... 705/65 |
| 6,329,920 B1 | 12/2001 | Morrison et al. |
| 6,330,544 B1 | 12/2001 | Walker et al. |
| 6,331,972 B1 | 12/2001 | Harris et al. |
| 6,332,134 B1 | 12/2001 | Foster |
| 6,332,193 B1 | 12/2001 | Glass et al. |
| D453,160 S | 1/2002 | Pentz et al. |
| D453,161 S | 1/2002 | Pentz |
| 6,336,095 B1 | 1/2002 | Rosen |
| 6,338,048 B1 | 1/2002 | Mori |
| 6,339,384 B1 | 1/2002 | Valdes-Rodriguez |
| 6,342,844 B1 | 1/2002 | Rozin |
| D453,337 S | 2/2002 | Pentz et al. |
| D453,338 S | 2/2002 | Pentz et al. |
| D453,516 S | 2/2002 | Pentz |
| D454,910 S | 3/2002 | Smith et al. |
| 6,353,420 B1 | 3/2002 | Chung |
| 6,353,811 B1 | 3/2002 | Weissman |
| 6,356,868 B1 | 3/2002 | Yuschik et al. |
| 6,360,953 B1 | 3/2002 | Lin et al. |
| 6,363,363 B1 | 3/2002 | Haller et al. |
| 6,364,208 B1 | 4/2002 | Stanford et al. |
| 6,367,011 B1 | 4/2002 | Lee et al. |
| 6,374,245 B1 | 4/2002 | Park |
| 6,377,034 B1 | 4/2002 | Ivanov |
| 6,377,699 B1 * | 4/2002 | Musgrave et al. ............ 382/117 |
| 6,378,073 B1 | 4/2002 | Davis et al. |
| D457,556 S | 5/2002 | Hochschild |
| 6,386,444 B1 | 5/2002 | Sullivan |
| 6,388,533 B2 | 5/2002 | Swoboda |
| 6,390,375 B2 | 5/2002 | Kayanakis |
| 6,397,198 B1 | 5/2002 | Hoffman et al. |
| 6,400,272 B1 | 6/2002 | Holtzman et al. |
| 6,402,026 B1 | 6/2002 | Schwier |
| 6,402,028 B1 | 6/2002 | Graham, Jr. et al. |
| 6,404,341 B1 | 6/2002 | Reid |
| 6,406,935 B2 | 6/2002 | Kayanakis et al. |
| 6,411,611 B1 | 6/2002 | Van der Tuijn |
| D460,455 S | 7/2002 | Pentz |
| 6,415,978 B1 | 7/2002 | McAllister |
| 6,419,158 B2 | 7/2002 | Hooglander |
| 6,421,650 B1 | 7/2002 | Goetz et al. |
| 6,422,464 B1 | 7/2002 | Terranova |
| 6,422,472 B1 | 7/2002 | Thevenot et al. |
| 6,424,029 B1 | 7/2002 | Giesler |
| 6,424,249 B1 | 7/2002 | Houvener |
| RE37,822 E | 8/2002 | Anthonyson |
| D461,477 S | 8/2002 | Pentz |
| 6,427,910 B1 | 8/2002 | Barnes et al. |
| 6,434,159 B1 | 8/2002 | Woodward et al. |
| 6,435,415 B1 | 8/2002 | Catte |
| 6,438,235 B2 | 8/2002 | Sims, III |
| 6,439,455 B1 | 8/2002 | Everett et al. |
| 6,442,532 B1 | 8/2002 | Kawan |
| D462,965 S | 9/2002 | Pentz |
| D462,966 S | 9/2002 | Pentz et al. |
| 6,445,794 B1 | 9/2002 | Shefi |
| 6,446,862 B1 | 9/2002 | Mann |
| 6,457,000 B1 | 9/2002 | Witkowski et al. |
| 6,457,996 B1 | 10/2002 | Shih |
| 6,460,696 B1 | 10/2002 | Meyer |
| 6,466,804 B1 | 10/2002 | Pecen et al. |
| 6,471,127 B2 | 10/2002 | Pentz et al. |
| 6,473,500 B1 | 10/2002 | Risafi et al. |
| 6,480,100 B1 | 11/2002 | Frieden et al. |
| 6,480,101 B1 | 11/2002 | Kelly et al. |
| 6,480,825 B1 | 11/2002 | Sharma et al. |
| 6,480,869 B1 | 11/2002 | Fujioka |
| 6,481,621 B1 | 11/2002 | Herrendoerfer et al. |
| 6,481,623 B1 | 11/2002 | Grant et al. |
| 6,481,632 B2 | 11/2002 | Wentker et al. |
| 6,483,427 B1 | 11/2002 | Werb |
| 6,483,477 B1 | 11/2002 | Plonka |
| 6,483,929 B1 | 11/2002 | Murakami et al. |
| 6,484,937 B1 | 11/2002 | Devaux et al. |
| 6,490,443 B1 | 12/2002 | Freeny, Jr. |
| 6,491,229 B1 | 12/2002 | Berney |
| 6,491,639 B1 | 12/2002 | Turcott |
| 6,494,367 B1 * | 12/2002 | Zacharias ............... 235/382 |
| 6,494,380 B2 | 12/2002 | Jarosz |
| 6,496,594 B1 | 12/2002 | Prokoski |
| 6,501,832 B1 * | 12/2002 | Saylor et al. ............... 379/88.04 |
| 6,505,772 B1 | 1/2003 | Mollett et al. |
| 6,507,662 B1 | 1/2003 | Brooks |
| 6,507,762 B1 | 1/2003 | Amro et al. |
| 6,510,983 B2 | 1/2003 | Horowitz et al. |
| 6,510,998 B1 | 1/2003 | Stanford et al. |
| 6,513,015 B2 | 1/2003 | Ogasawara |
| 6,519,565 B1 | 2/2003 | Clements et al. |
| 6,520,542 B2 | 2/2003 | Thompson et al. |
| 6,523,292 B2 | 2/2003 | Slavik |
| 6,529,880 B1 | 3/2003 | McKeen et al. |
| 6,535,726 B1 | 3/2003 | Johnson |
| 6,539,101 B1 | 3/2003 | Black |
| 6,546,373 B1 | 4/2003 | Cerra |
| 6,547,133 B1 | 4/2003 | DeVries, Jr. et al. |
| 6,549,912 B1 | 4/2003 | Chen |
| D474,234 S | 5/2003 | Nelms et al. |
| 6,560,581 B1 | 5/2003 | Fox et al. |
| 6,575,361 B1 | 6/2003 | Graves et al. |
| 6,577,229 B1 | 6/2003 | Bonneau et al. |
| 6,578,768 B1 | 6/2003 | Binder et al. |
| 6,581,839 B1 | 6/2003 | Lasch et al. |
| 6,587,835 B1 | 7/2003 | Treyz et al. |
| 6,588,660 B1 | 7/2003 | Buescher et al. |
| 6,588,673 B1 | 7/2003 | Chan et al. |
| 6,589,119 B1 | 7/2003 | Orus et al. |
| 6,591,249 B2 | 7/2003 | Zoka |
| 6,598,024 B1 | 7/2003 | Walker et al. |
| 6,601,622 B1 | 8/2003 | Young |
| 6,601,759 B2 | 8/2003 | Fife et al. |
| 6,601,762 B2 | 8/2003 | Piotrowski |
| 6,608,551 B1 | 8/2003 | Anderson et al. |
| 6,608,995 B1 | 8/2003 | Kawasaki et al. |
| 6,609,655 B1 | 8/2003 | Harrell |
| 6,609,656 B1 | 8/2003 | Elledge |
| 6,609,658 B1 | 8/2003 | Sehr |
| 6,623,039 B2 | 9/2003 | Thompson et al. |
| 6,626,356 B2 | 9/2003 | Davenport et al. |
| 6,628,961 B1 | 9/2003 | Ho et al. |
| 6,629,591 B1 | 10/2003 | Griswold et al. |
| 6,631,849 B2 | 10/2003 | Blossom |
| 6,636,620 B1 | 10/2003 | Hoshino |
| 6,636,833 B1 | 10/2003 | Flitcroft et al. |
| 6,644,551 B2 | 11/2003 | Clayman et al. |
| 6,650,887 B2 | 11/2003 | McGregor et al. |
| 6,651,168 B1 | 11/2003 | Kao et al. |
| 6,651,813 B2 | 11/2003 | Vallans et al. |
| 6,651,892 B2 | 11/2003 | Hooglander |
| 6,657,614 B1 | 12/2003 | Ito et al. |
| 6,662,166 B2 | 12/2003 | Pare, Jr. et al. |
| 6,665,405 B1 | 12/2003 | Lenstra |
| 6,669,086 B2 | 12/2003 | Abdi et al. |
| 6,671,358 B1 | 12/2003 | Sossaman et al. |
| 6,674,786 B1 | 1/2004 | Nakamura et al. |
| 6,679,427 B1 | 1/2004 | Kuroiwa |
| 6,681,328 B1 | 1/2004 | Harris et al. |

(56) References Cited

U.S. PATENT DOCUMENTS

| | | |
|---|---|---|
| 6,681,926 B2 | 1/2004 | De Volpi |
| 6,684,269 B2 | 1/2004 | Wagner |
| 6,685,089 B2 | 2/2004 | Terranova et al. |
| 6,686,847 B1 | 2/2004 | Mittler |
| 6,687,714 B1 | 2/2004 | Kogen et al. |
| 6,687,875 B1 | 2/2004 | Suzuki |
| 6,690,930 B1 | 2/2004 | Dupre |
| 6,693,513 B2 | 2/2004 | Tuttle |
| 6,697,947 B1 | 2/2004 | Matyas, Jr. et al. |
| 6,703,918 B1 | 3/2004 | Kita |
| 6,704,039 B2 | 3/2004 | Pena |
| 6,705,530 B2 | 3/2004 | Kiekhaefer |
| 6,708,375 B1 | 3/2004 | Johnson |
| 6,711,262 B1 | 3/2004 | Vatanen |
| 6,732,919 B2 | 5/2004 | Macklin et al. |
| 6,732,936 B1 | 5/2004 | Kiekhaefer |
| 6,735,081 B1 | 5/2004 | Bishop et al. |
| 6,742,120 B1 | 5/2004 | Markakis et al. |
| 6,747,546 B1 | 6/2004 | Hikita et al. |
| 6,749,123 B2 | 6/2004 | Lasch et al. |
| 6,751,805 B1 | 6/2004 | Austion |
| 6,760,581 B2 | 7/2004 | Dutta |
| 6,763,500 B2 | 7/2004 | Black et al. |
| 6,764,014 B2 | 7/2004 | Lasch et al. |
| 6,765,470 B2 | 7/2004 | Shinzaki |
| 6,766,952 B2 | 7/2004 | Luu |
| 6,769,718 B1 | 8/2004 | Warther et al. |
| 6,771,981 B1 | 8/2004 | Zalewski et al. |
| 6,789,012 B1 | 9/2004 | Childs et al. |
| 6,789,733 B2 | 9/2004 | Terranova et al. |
| 6,793,141 B1 | 9/2004 | Graham |
| 6,799,163 B2 | 9/2004 | Nolan |
| 6,799,726 B2 | 10/2004 | Stockhammer |
| 6,816,058 B2 | 11/2004 | McGregor et al. |
| 6,819,219 B1 | 11/2004 | Bolle et al. |
| 6,823,910 B1 | 11/2004 | Elnekaveh |
| 6,830,193 B2 | 12/2004 | Tanaka |
| 6,834,270 B1 | 12/2004 | Pagani et al. |
| 6,834,795 B1 | 12/2004 | Rasmussen et al. |
| 6,843,415 B2 | 1/2005 | Vogler |
| 6,845,863 B1 | 1/2005 | Riley |
| 6,851,617 B2 | 2/2005 | Saint et al. |
| 6,853,087 B2 | 2/2005 | Neuhaus et al. |
| 6,853,894 B1 | 2/2005 | Kolls |
| 6,853,987 B1 | 2/2005 | Cook |
| 6,857,566 B2 | 2/2005 | Wankmueller |
| 6,859,672 B2 | 2/2005 | Roberts et al. |
| 6,873,974 B1 | 3/2005 | Schutzer |
| 6,877,097 B2 | 4/2005 | Hamid et al. |
| 6,883,715 B1 | 4/2005 | Fruhauf et al. |
| 6,895,310 B1 | 5/2005 | Kolls |
| 6,898,299 B1 | 5/2005 | Brooks |
| H2120 H | 7/2005 | Cudlitz |
| 6,914,517 B2 | 7/2005 | Kinsella |
| 6,915,277 B1 | 7/2005 | Manchester et al. |
| 6,920,560 B2 | 7/2005 | Wallace |
| 6,924,729 B1 | 8/2005 | Aschauer et al. |
| 6,925,439 B1 | 8/2005 | Pitroda |
| 6,925,565 B2 | 8/2005 | Black |
| 6,928,181 B2 | 8/2005 | Brooks |
| 6,931,538 B1 | 8/2005 | Sawaguchi |
| 6,934,861 B2 | 8/2005 | Haala |
| D509,243 S | 9/2005 | Hunter, Jr. et al. |
| 6,940,461 B2 | 9/2005 | Nantz et al. |
| 6,944,402 B1 | 9/2005 | Baker et al. |
| 6,944,768 B2 | 9/2005 | Siegel et al. |
| 6,959,874 B2 | 11/2005 | Bardwell |
| 6,961,448 B2 | 11/2005 | Nichols et al. |
| 6,970,583 B2 | 11/2005 | Black |
| 6,978,933 B2 | 12/2005 | Yap et al. |
| 6,986,099 B2 | 1/2006 | Todd |
| 6,990,480 B1 | 1/2006 | Burt |
| 6,994,262 B1 | 2/2006 | Warther |
| 7,003,497 B2 | 2/2006 | Maes |
| 7,003,501 B2 | 2/2006 | Ostroff |
| 7,003,789 B1 * | 2/2006 | Linehan ........................ 725/1 |
| 7,004,385 B1 | 2/2006 | Douglass |
| 7,049,962 B2 | 5/2006 | Atherton et al. |
| 7,051,925 B2 | 5/2006 | Schwarz, Jr. |
| 7,059,159 B2 | 6/2006 | Lanigan et al. |
| 7,068,148 B2 | 6/2006 | Shanks et al. |
| 7,069,444 B2 | 6/2006 | Lowensohn et al. |
| 7,070,112 B2 | 7/2006 | Beenau et al. |
| 7,093,767 B2 | 8/2006 | Faenza et al. |
| 7,096,204 B1 | 8/2006 | Chen et al. |
| 7,096,494 B1 | 8/2006 | Chen |
| 7,100,821 B2 | 9/2006 | Rasti |
| 7,102,523 B2 | 9/2006 | Shanks et al. |
| 7,103,575 B1 | 9/2006 | Linehan |
| 7,108,190 B2 | 9/2006 | Burgan et al. |
| 7,119,659 B2 | 10/2006 | Bonalle et al. |
| 7,127,672 B1 | 10/2006 | Patterson et al. |
| 7,131,574 B1 | 11/2006 | Sciupac et al. |
| 7,132,946 B2 | 11/2006 | Waldner et al. |
| 7,136,835 B1 | 11/2006 | Flitcroft et al. |
| 7,150,407 B1 | 12/2006 | Berger et al. |
| 7,154,375 B2 | 12/2006 | Beenau et al. |
| 7,171,662 B1 | 1/2007 | Misara et al. |
| 7,172,112 B2 | 2/2007 | Bonalle et al. |
| 7,213,748 B2 | 5/2007 | Tsuei et al. |
| 7,237,121 B2 | 6/2007 | Cammack et al. |
| 7,239,226 B2 | 7/2007 | Berardi et al. |
| 7,240,007 B2 | 7/2007 | Junqua et al. |
| 7,254,557 B1 | 8/2007 | Gillin et al. |
| 7,281,135 B2 | 10/2007 | Black |
| 7,287,271 B1 | 10/2007 | Riggins |
| 7,287,695 B2 | 10/2007 | Wankmueller |
| 7,299,364 B2 | 11/2007 | Noble et al. |
| 7,303,120 B2 | 12/2007 | Beenau et al. |
| 7,314,164 B2 | 1/2008 | Bonalle et al. |
| 7,314,165 B2 | 1/2008 | Bonalle et al. |
| 7,318,550 B2 | 1/2008 | Bonalle et al. |
| 7,325,724 B2 | 2/2008 | Bonalle et al. |
| 7,341,181 B2 | 3/2008 | Bonalle et al. |
| 7,363,504 B2 | 4/2008 | Bonalle et al. |
| 7,536,304 B2 | 5/2009 | Di Mambro et al. |
| 2001/0003071 A1 | 6/2001 | Mansutti et al. |
| 2001/0013542 A1 | 8/2001 | Horowitz et al. |
| 2001/0013546 A1 | 8/2001 | Ross |
| 2001/0013551 A1 | 8/2001 | Ramachandran |
| 2001/0017584 A1 | 8/2001 | Shinzaki |
| 2001/0018660 A1 | 8/2001 | Sehr |
| 2001/0022446 A1 | 9/2001 | Klure |
| 2001/0024157 A1 | 9/2001 | Hansmann et al. |
| 2001/0029493 A1 | 10/2001 | Pare et al. |
| 2001/0030238 A1 | 10/2001 | Arisawa |
| 2001/0032192 A1 | 10/2001 | Putta et al. |
| 2001/0034565 A1 | 10/2001 | Leatherman |
| 2001/0034720 A1 | 10/2001 | Armes |
| 2001/0036301 A1 | 11/2001 | Yamaguchi et al. |
| 2001/0036835 A1 | 11/2001 | Leedom, Jr. |
| 2001/0039617 A1 | 11/2001 | Buhrlen et al. |
| 2001/0040507 A1 | 11/2001 | Eckstein et al. |
| 2001/0045469 A1 | 11/2001 | Hooglander |
| 2001/0049628 A1 | 12/2001 | Icho |
| 2001/0053239 A1 | 12/2001 | Takhar |
| 2001/0055411 A1 | 12/2001 | Black |
| 2002/0002468 A1 | 1/2002 | Spagna et al. |
| 2002/0011519 A1 | 1/2002 | Shults |
| 2002/0014529 A1 | 2/2002 | Tanaka |
| 2002/0014952 A1 | 2/2002 | Terranova |
| 2002/0016687 A1 | 2/2002 | Felsenstein et al. |
| 2002/0019807 A1 | 2/2002 | Halpern |
| 2002/0024590 A1 | 2/2002 | Pena |
| 2002/0026419 A1 | 2/2002 | Maritzen et al. |
| 2002/0026575 A1 * | 2/2002 | Wheeler et al. ................ 713/156 |
| 2002/0028704 A1 | 3/2002 | Bloomfield et al. |
| 2002/0029342 A1 | 3/2002 | Keech |
| 2002/0030579 A1 | 3/2002 | Albert et al. |
| 2002/0030581 A1 | 3/2002 | Janiak et al. |
| 2002/0035548 A1 | 3/2002 | Hogan et al. |
| 2002/0036237 A1 | 3/2002 | Atherton et al. |
| 2002/0038818 A1 | 4/2002 | Zingher et al. |
| 2002/0040935 A1 | 4/2002 | Weyant |

(56) References Cited

U.S. PATENT DOCUMENTS

| | | |
|---|---|---|
| 2002/0040936 A1 | 4/2002 | Wentker et al. |
| 2002/0041093 A1 | 4/2002 | Cox et al. |
| 2002/0042782 A1 | 4/2002 | Albazz et al. |
| 2002/0043566 A1 | 4/2002 | Goodman et al. |
| 2002/0046341 A1 | 4/2002 | Kazaks et al. |
| 2002/0052839 A1 | 5/2002 | Takatori |
| 2002/0062249 A1 | 5/2002 | Iannacci |
| 2002/0062284 A1 | 5/2002 | Kawan |
| 2002/0062291 A1 | 5/2002 | Zoka |
| 2002/0066784 A1 | 6/2002 | Segal et al. |
| 2002/0072349 A1 | 6/2002 | Geiselman et al. |
| 2002/0073025 A1 | 6/2002 | Tanner et al. |
| 2002/0074398 A1 | 6/2002 | Lancos et al. |
| 2002/0077837 A1 | 6/2002 | Krueger et al. |
| 2002/0077895 A1 | 6/2002 | Howell |
| 2002/0077992 A1 | 6/2002 | Tobin |
| 2002/0079367 A1 | 6/2002 | Montani |
| 2002/0083320 A1 | 6/2002 | Vatanen |
| 2002/0087869 A1 | 7/2002 | Kim |
| 2002/0092914 A1 | 7/2002 | Pentz et al. |
| 2002/0095298 A1 | 7/2002 | Ewing |
| 2002/0095343 A1 | 7/2002 | Barton et al. |
| 2002/0095389 A1 | 7/2002 | Gaines |
| 2002/0095587 A1 | 7/2002 | Doyle et al. |
| 2002/0095588 A1 | 7/2002 | Shigematsu et al. |
| 2002/0097142 A1 | 7/2002 | Janiak et al. |
| 2002/0097144 A1 | 7/2002 | Collins et al. |
| 2002/0099665 A1 | 7/2002 | Burger et al. |
| 2002/0107007 A1 | 8/2002 | Gerson |
| 2002/0107742 A1 | 8/2002 | Magill |
| 2002/0107791 A1* | 8/2002 | Nobrega et al. ................ 705/39 |
| 2002/0107798 A1 | 8/2002 | Hameau et al. |
| 2002/0108062 A1 | 8/2002 | Nakajima et al. |
| 2002/0109580 A1 | 8/2002 | Shreve et al. |
| 2002/0111210 A1 | 8/2002 | Luciano, Jr. et al. |
| 2002/0111917 A1 | 8/2002 | Hoffman et al. |
| 2002/0111919 A1* | 8/2002 | Weller et al. ................... 705/67 |
| 2002/0112177 A1 | 8/2002 | Voltmer et al. |
| 2002/0113082 A1 | 8/2002 | Leatherman et al. |
| 2002/0116274 A1 | 8/2002 | Hind et al. |
| 2002/0120584 A1 | 8/2002 | Hogan et al. |
| 2002/0125164 A1 | 9/2002 | Bassinson |
| 2002/0126010 A1 | 9/2002 | Trimble et al. |
| 2002/0128977 A1 | 9/2002 | Nambiar et al. |
| 2002/0129248 A1 | 9/2002 | Wheeler et al. |
| 2002/0130186 A1 | 9/2002 | Lasch et al. |
| 2002/0130187 A1 | 9/2002 | Berg et al. |
| 2002/0131567 A1 | 9/2002 | Maginas |
| 2002/0133467 A1 | 9/2002 | Hobson et al. |
| 2002/0133725 A1 | 9/2002 | Roy et al. |
| 2002/0138351 A1 | 9/2002 | Houvener et al. |
| 2002/0138425 A1 | 9/2002 | Shimizu et al. |
| 2002/0138438 A1 | 9/2002 | Bardwell |
| 2002/0139839 A1 | 10/2002 | Catan |
| 2002/0140542 A1 | 10/2002 | Prokoski et al. |
| 2002/0145043 A1 | 10/2002 | Challa et al. |
| 2002/0147002 A1 | 10/2002 | Trop et al. |
| 2002/0147600 A1 | 10/2002 | Waters et al. |
| 2002/0147913 A1 | 10/2002 | Lun Yip |
| 2002/0148892 A1 | 10/2002 | Bardwell |
| 2002/0149467 A1 | 10/2002 | Calvesio et al. |
| 2002/0152123 A1 | 10/2002 | Giordano et al. |
| 2002/0153410 A1 | 10/2002 | Santini |
| 2002/0153424 A1 | 10/2002 | Li |
| 2002/0154795 A1 | 10/2002 | Lee et al. |
| 2002/0158747 A1 | 10/2002 | McGregor et al. |
| 2002/0163421 A1 | 11/2002 | Wang et al. |
| 2002/0165931 A1 | 11/2002 | Greer et al. |
| 2002/0166891 A1 | 11/2002 | Stoutenburg et al. |
| 2002/0166897 A1 | 11/2002 | Hooglander |
| 2002/0169673 A1 | 11/2002 | Prorock et al. |
| 2002/0174067 A1 | 11/2002 | Hoffman et al. |
| 2002/0175805 A9 | 11/2002 | Armstrong et al. |
| 2002/0176522 A1 | 11/2002 | Fan |
| 2002/0178063 A1 | 11/2002 | Gravelle et al. |
| 2002/0178124 A1 | 11/2002 | Lewis |
| 2002/0178369 A1 | 11/2002 | Black |
| 2002/0179704 A1 | 12/2002 | Deaton |
| 2002/0185543 A1 | 12/2002 | Pentz et al. |
| 2002/0186133 A1 | 12/2002 | Loof |
| 2002/0186838 A1 | 12/2002 | Brandys |
| 2002/0188501 A1 | 12/2002 | Lefkowith |
| 2002/0188854 A1 | 12/2002 | Heaven et al. |
| 2002/0188855 A1 | 12/2002 | Nakayama et al. |
| 2002/0190124 A1 | 12/2002 | Piotrowski |
| 2002/0190125 A1 | 12/2002 | Stockhammer |
| 2002/0191816 A1 | 12/2002 | Maritzen et al. |
| 2002/0192856 A1 | 12/2002 | Halope et al. |
| 2002/0193102 A1 | 12/2002 | Hyyppa et al. |
| 2002/0194137 A1 | 12/2002 | Park et al. |
| 2002/0194303 A1 | 12/2002 | Suila et al. |
| 2002/0194503 A1 | 12/2002 | Faith et al. |
| 2002/0196963 A1 | 12/2002 | Bardwell |
| 2003/0001006 A1 | 1/2003 | Lee |
| 2003/0001755 A1 | 1/2003 | Tiernay et al. |
| 2003/0004866 A1 | 1/2003 | Huennekens et al. |
| 2003/0004881 A1 | 1/2003 | Shinzaki et al. |
| 2003/0005310 A1 | 1/2003 | Shinzaki |
| 2003/0006901 A1 | 1/2003 | Kim et al. |
| 2003/0009382 A1 | 1/2003 | D'Arbeloff et al. |
| 2003/0014307 A1 | 1/2003 | Heng |
| 2003/0014357 A1 | 1/2003 | Chrisekos et al. |
| 2003/0014891 A1 | 1/2003 | Nelms et al. |
| 2003/0018532 A1 | 1/2003 | Dudek et al. |
| 2003/0018567 A1 | 1/2003 | Flitcroft et al. |
| 2003/0025600 A1 | 2/2003 | Blanchard |
| 2003/0028481 A1 | 2/2003 | Flitcroft et al. |
| 2003/0033697 A1 | 2/2003 | Hicks et al. |
| 2003/0037264 A1 | 2/2003 | Ezaki et al. |
| 2003/0037851 A1 | 2/2003 | Hogganvik |
| 2003/0046228 A1 | 3/2003 | Berney |
| 2003/0046237 A1* | 3/2003 | Uberti ........................... 705/44 |
| 2003/0046540 A1 | 3/2003 | Nakamura et al. |
| 2003/0047482 A1 | 3/2003 | Jones et al. |
| 2003/0054836 A1 | 3/2003 | Michot |
| 2003/0055727 A1 | 3/2003 | Walker et al. |
| 2003/0057226 A1 | 3/2003 | Long |
| 2003/0057278 A1 | 3/2003 | Wong |
| 2003/0061172 A1 | 3/2003 | Robinson |
| 2003/0069828 A1 | 4/2003 | Blazey et al. |
| 2003/0069846 A1 | 4/2003 | Marcon |
| 2003/0074317 A1 | 4/2003 | Hofi |
| 2003/0086591 A1 | 5/2003 | Simon |
| 2003/0093187 A1 | 5/2003 | Walker |
| 2003/0097344 A1 | 5/2003 | Chaum et al. |
| 2003/0106935 A1 | 6/2003 | Burchette, Jr. |
| 2003/0112120 A1 | 6/2003 | K. |
| 2003/0112972 A1 | 6/2003 | Hattick et al. |
| 2003/0115126 A1 | 6/2003 | Pitroda |
| 2003/0120554 A1 | 6/2003 | Hogan et al. |
| 2003/0120626 A1 | 6/2003 | Piotrowski |
| 2003/0121969 A1 | 7/2003 | Wankmueller |
| 2003/0122120 A1 | 7/2003 | Brazis et al. |
| 2003/0123714 A1 | 7/2003 | O'Gorman et al. |
| 2003/0124294 A1 | 7/2003 | Hodson et al. |
| 2003/0125054 A1 | 7/2003 | Garcia |
| 2003/0130820 A1 | 7/2003 | Lane, III |
| 2003/0132132 A1 | 7/2003 | Small |
| 2003/0132284 A1 | 7/2003 | Reynolds et al. |
| 2003/0132297 A1 | 7/2003 | McCall et al. |
| 2003/0140228 A1 | 7/2003 | Binder |
| 2003/0149661 A1 | 8/2003 | Mitchell et al. |
| 2003/0149662 A1* | 8/2003 | Shore ........................... 705/39 |
| 2003/0150911 A1 | 8/2003 | Joseph |
| 2003/0152252 A1 | 8/2003 | Kondo et al. |
| 2003/0153356 A1 | 8/2003 | Liu et al. |
| 2003/0155416 A1 | 8/2003 | Macklin et al. |
| 2003/0159044 A1 | 8/2003 | Doyle et al. |
| 2003/0160074 A1 | 8/2003 | Pineda |
| 2003/0163699 A1 | 8/2003 | Pailles et al. |
| 2003/0167207 A1 | 9/2003 | Berardi et al. |
| 2003/0173408 A1 | 9/2003 | Mosher, Jr. et al. |
| 2003/0177102 A1 | 9/2003 | Robinson |
| 2003/0177347 A1 | 9/2003 | Schneier et al. |

(56) References Cited

U.S. PATENT DOCUMENTS

| | | | |
|---|---|---|---|
| 2003/0178495 | A1 | 9/2003 | Jones et al. |
| 2003/0183689 | A1 | 10/2003 | Swift et al. |
| 2003/0183695 | A1 | 10/2003 | Labrec et al. |
| 2003/0183699 | A1 | 10/2003 | Masui |
| 2003/0187786 | A1 | 10/2003 | Swift et al. |
| 2003/0187787 | A1 | 10/2003 | Freund |
| 2003/0187790 | A1 | 10/2003 | Swift et al. |
| 2003/0187796 | A1 | 10/2003 | Swift et al. |
| 2003/0191949 | A1 | 10/2003 | Odagawa |
| 2003/0195037 | A1 | 10/2003 | Vuong et al. |
| 2003/0195842 | A1 | 10/2003 | Reece |
| 2003/0195843 | A1 | 10/2003 | Matsuda et al. |
| 2003/0197593 | A1 | 10/2003 | Siegel et al. |
| 2003/0200184 | A1 | 10/2003 | Dominguez et al. |
| 2003/0208439 | A1 | 11/2003 | Rast |
| 2003/0218066 | A1 | 11/2003 | Fernandes et al. |
| 2003/0220876 | A1 | 11/2003 | Burger et al. |
| 2003/0222153 | A1 | 12/2003 | Pentz et al. |
| 2003/0223625 | A1 | 12/2003 | Hillhouse et al. |
| 2003/0225623 | A1 | 12/2003 | Wankmueller |
| 2003/0225713 | A1 | 12/2003 | Atkinson et al. |
| 2003/0226041 | A1 | 12/2003 | Palmer et al. |
| 2003/0227550 | A1 | 12/2003 | Manico et al. |
| 2003/0229793 | A1 | 12/2003 | McCall et al. |
| 2003/0230514 | A1 | 12/2003 | Baker |
| 2003/0233334 | A1 | 12/2003 | Smith |
| 2003/0236704 | A1 | 12/2003 | Antonucci |
| 2004/0006497 | A1 | 1/2004 | Nestor et al. |
| 2004/0006539 | A1 | 1/2004 | Royer et al. |
| 2004/0010462 | A1 | 1/2004 | Moon et al. |
| 2004/0011877 | A1 | 1/2004 | Reppermund |
| 2004/0014457 | A1 | 1/2004 | Stevens |
| 2004/0015451 | A1 | 1/2004 | Sahota et al. |
| 2004/0016796 | A1 | 1/2004 | Hanna et al. |
| 2004/0017934 | A1 | 1/2004 | Kocher |
| 2004/0019494 | A1 | 1/2004 | Ridgeway et al. |
| 2004/0019564 | A1 | 1/2004 | Goldthwaite et al. |
| 2004/0020982 | A1 | 2/2004 | Hoffman et al. |
| 2004/0021552 | A1 | 2/2004 | Koo |
| 2004/0024694 | A1 | 2/2004 | Lawrence et al. |
| 2004/0026518 | A1 | 2/2004 | Kudo et al. |
| 2004/0029569 | A1 | 2/2004 | Khan et al. |
| 2004/0030601 | A1 | 2/2004 | Pond et al. |
| 2004/0030645 | A1* | 2/2004 | Monaghan ............ 705/40 |
| 2004/0031856 | A1 | 2/2004 | Atsmon et al. |
| 2004/0039814 | A1 | 2/2004 | Crabtree et al. |
| 2004/0039860 | A1 | 2/2004 | Mills et al. |
| 2004/0041021 | A1 | 3/2004 | Nugent, Jr. |
| 2004/0041690 | A1 | 3/2004 | Yamagishi |
| 2004/0044627 | A1* | 3/2004 | Russell et al. ............ 705/50 |
| 2004/0046034 | A1 | 3/2004 | Ey Yamani et al. |
| 2004/0049687 | A1 | 3/2004 | Orsini |
| 2004/0050930 | A1 | 3/2004 | Rowe |
| 2004/0052406 | A1 | 3/2004 | Brooks |
| 2004/0059923 | A1 | 3/2004 | ShamRao |
| 2004/0061593 | A1 | 4/2004 | Lane |
| 2004/0062423 | A1 | 4/2004 | Doi |
| 2004/0073792 | A1 | 4/2004 | Noble et al. |
| 2004/0083184 | A1 | 4/2004 | Tsuei et al. |
| 2004/0083380 | A1 | 4/2004 | Janke |
| 2004/0084524 | A1 | 5/2004 | Ramachandran |
| 2004/0084542 | A1 | 5/2004 | DeYoe et al. |
| 2004/0089724 | A1 | 5/2004 | Lasch et al. |
| 2004/0098336 | A1 | 5/2004 | Flink |
| 2004/0104266 | A1 | 6/2004 | Bolle et al. |
| 2004/0104268 | A1 | 6/2004 | Bailey et al. |
| 2004/0118930 | A1 | 6/2004 | Berardi et al. |
| 2004/0124104 | A1 | 7/2004 | De Volpi |
| 2004/0124246 | A1 | 7/2004 | Allen et al. |
| 2004/0127256 | A1 | 7/2004 | Goldthwaite et al. |
| 2004/0129787 | A1 | 7/2004 | Saito et al. |
| 2004/0131237 | A1 | 7/2004 | Machida |
| 2004/0133787 | A1 | 7/2004 | Doughty et al. |
| 2004/0136573 | A1 | 7/2004 | Sato |
| 2004/0139021 | A1 | 7/2004 | Reed et al. |
| 2004/0144841 | A1 | 7/2004 | Tsukamoto et al. |
| 2004/0144846 | A1 | 7/2004 | Lasch et al. |
| 2004/0149820 | A1 | 8/2004 | Zuili |
| 2004/0155101 | A1 | 8/2004 | Royer et al. |
| 2004/0158723 | A1 | 8/2004 | Root |
| 2004/0160310 | A1 | 8/2004 | Chen et al. |
| 2004/0161135 | A1 | 8/2004 | Sano et al. |
| 2004/0165753 | A1 | 8/2004 | Takhiri et al. |
| 2004/0169071 | A1 | 9/2004 | Burgan et al. |
| 2004/0172541 | A1 | 9/2004 | Ando et al. |
| 2004/0176071 | A1 | 9/2004 | Gehrmann et al. |
| 2004/0177045 | A1 | 9/2004 | Brown |
| 2004/0178063 | A1 | 9/2004 | Mirchi et al. |
| 2004/0180657 | A1 | 9/2004 | Yaqub et al. |
| 2004/0188519 | A1 | 9/2004 | Cassone |
| 2004/0190757 | A1 | 9/2004 | Murphy et al. |
| 2004/0193676 | A1 | 9/2004 | Marks |
| 2004/0195314 | A1 | 10/2004 | Lee |
| 2004/0199469 | A1 | 10/2004 | Barillova et al. |
| 2004/0202354 | A1 | 10/2004 | Togino |
| 2004/0208343 | A1 | 10/2004 | Golden et al. |
| 2004/0215575 | A1 | 10/2004 | Garrity |
| 2004/0222803 | A1 | 11/2004 | Tartagni |
| 2004/0230488 | A1 | 11/2004 | Beenau et al. |
| 2004/0232220 | A1 | 11/2004 | Beenau et al. |
| 2004/0232224 | A1 | 11/2004 | Beenau et al. |
| 2004/0233039 | A1 | 11/2004 | Beenau et al. |
| 2004/0235450 | A1 | 11/2004 | Rosenberg |
| 2004/0236699 | A1 | 11/2004 | Beenau et al. |
| 2004/0236700 | A1 | 11/2004 | Beenau et al. |
| 2004/0236701 | A1 | 11/2004 | Beenau et al. |
| 2004/0236819 | A1 | 11/2004 | Anati et al. |
| 2004/0239480 | A1 | 12/2004 | Beenau et al. |
| 2004/0240711 | A1 | 12/2004 | Hamza et al. |
| 2004/0255168 | A1 | 12/2004 | Murashita et al. |
| 2004/0257196 | A1 | 12/2004 | Kotzin |
| 2004/0258282 | A1 | 12/2004 | Bjorn et al. |
| 2005/0001711 | A1 | 1/2005 | Doughty et al. |
| 2005/0004921 | A1 | 1/2005 | Beenau et al. |
| 2005/0005172 | A1 | 1/2005 | Haala |
| 2005/0011776 | A1 | 1/2005 | Nagel |
| 2005/0017068 | A1 | 1/2005 | Zalewski et al. |
| 2005/0018658 | A1 | 1/2005 | Ikeda et al. |
| 2005/0020304 | A1 | 1/2005 | Shinzaki |
| 2005/0021457 | A1 | 1/2005 | Johnson et al. |
| 2005/0023157 | A1 | 2/2005 | Logan |
| 2005/0033686 | A1 | 2/2005 | Peart et al. |
| 2005/0033687 | A1 | 2/2005 | Beenau et al. |
| 2005/0033688 | A1 | 2/2005 | Pert et al. |
| 2005/0033689 | A1 | 2/2005 | Bonalle et al. |
| 2005/0033992 | A1 | 2/2005 | Inabe |
| 2005/0035192 | A1 | 2/2005 | Bonalle et al. |
| 2005/0035847 | A1 | 2/2005 | Bonalle et al. |
| 2005/0036665 | A1 | 2/2005 | Higuchi |
| 2005/0038718 | A1 | 2/2005 | Barnes et al. |
| 2005/0040221 | A1 | 2/2005 | Schwarz, Jr. |
| 2005/0040272 | A1 | 2/2005 | Argumedo et al. |
| 2005/0045718 | A1 | 3/2005 | Bortolin et al. |
| 2005/0050367 | A1 | 3/2005 | Burger et al. |
| 2005/0054438 | A1 | 3/2005 | Rothschild et al. |
| 2005/0058262 | A1 | 3/2005 | Timmins et al. |
| 2005/0060233 | A1 | 3/2005 | Bonalle et al. |
| 2005/0065842 | A1 | 3/2005 | Summers |
| 2005/0065872 | A1 | 3/2005 | Moebs et al. |
| 2005/0071231 | A1 | 3/2005 | Beenau et al. |
| 2005/0087597 | A1 | 4/2005 | Gotfried et al. |
| 2005/0091325 | A1 | 4/2005 | Kuwana et al. |
| 2005/0097038 | A1 | 5/2005 | Yu et al. |
| 2005/0098621 | A1 | 5/2005 | deSylva |
| 2005/0100199 | A1 | 5/2005 | Boshra |
| 2005/0102524 | A1 | 5/2005 | Haala |
| 2005/0103839 | A1 | 5/2005 | Hewel |
| 2005/0109836 | A1 | 5/2005 | Ben-Aissa |
| 2005/0113137 | A1 | 5/2005 | Rodriguez et al. |
| 2005/0116024 | A1 | 6/2005 | Beenau et al. |
| 2005/0119978 | A1 | 6/2005 | Ates |
| 2005/0121512 | A1 | 6/2005 | Wankmueller |
| 2005/0122209 | A1 | 6/2005 | Black |
| 2005/0123137 | A1 | 6/2005 | McCallum |

(56) References Cited

U.S. PATENT DOCUMENTS

| | | |
|---|---|---|
| 2005/0125312 A1 | 6/2005 | Dearing et al. |
| 2005/0125343 A1 | 6/2005 | Mendelovich |
| 2005/0127164 A1 | 6/2005 | Wankmueller |
| 2005/0137977 A1 | 6/2005 | Wankmueller |
| 2005/0139669 A1 | 6/2005 | Arnouse |
| 2005/0144133 A1 | 6/2005 | Hoffman et al. |
| 2005/0149358 A1 | 7/2005 | Sacco et al. |
| 2005/0149926 A1 | 7/2005 | Saltz |
| 2005/0160271 A9 | 7/2005 | Brundage et al. |
| 2005/0160790 A1 | 7/2005 | Tanaka et al. |
| 2005/0165684 A1 | 7/2005 | Jensen et al. |
| 2005/0166062 A1 | 7/2005 | Sanchez-Cifuentes |
| 2005/0169504 A1 | 8/2005 | Black |
| 2005/0171787 A1 | 8/2005 | Zagami |
| 2005/0171905 A1 | 8/2005 | Wankmueller |
| 2005/0180618 A1 | 8/2005 | Black |
| 2005/0187883 A1 | 8/2005 | Bishop et al. |
| 2005/0187916 A1 | 8/2005 | Levin et al. |
| 2005/0197923 A1 | 9/2005 | Kilner et al. |
| 2005/0203857 A1 | 9/2005 | Friedman |
| 2005/0207002 A1 | 9/2005 | Liu et al. |
| 2005/0211784 A1 | 9/2005 | Justin |
| 2005/0212657 A1 | 9/2005 | Simon |
| 2005/0216424 A1 | 9/2005 | Gandre et al. |
| 2005/0221853 A1 | 10/2005 | Silvester |
| 2005/0223230 A1 | 10/2005 | Zick |
| 2005/0232471 A1 | 10/2005 | Baer |
| 2005/0240778 A1 | 10/2005 | Saito |
| 2005/0246292 A1 | 11/2005 | Sarcanin |
| 2005/0251688 A1 | 11/2005 | Nanavati et al. |
| 2005/0261972 A1 | 11/2005 | Black |
| 2005/0275505 A1 | 12/2005 | Himmelstein |
| 2005/0278222 A1 | 12/2005 | Nortrup |
| 2006/0000892 A1 | 1/2006 | Bonalle et al. |
| 2006/0000893 A1 | 1/2006 | Bonalle et al. |
| 2006/0000894 A1 | 1/2006 | Bonalle et al. |
| 2006/0000895 A1 | 1/2006 | Bonalle et al. |
| 2006/0000896 A1 | 1/2006 | Bonalle et al. |
| 2006/0000897 A1 | 1/2006 | Bonalle et al. |
| 2006/0000898 A1 | 1/2006 | Bonalle et al. |
| 2006/0000899 A1 | 1/2006 | Bonalle et al. |
| 2006/0005022 A1 | 1/2006 | Wakamori et al. |
| 2006/0005042 A1 | 1/2006 | Black |
| 2006/0016868 A1 | 1/2006 | Bonalle et al. |
| 2006/0016869 A1 | 1/2006 | Bonalle et al. |
| 2006/0016871 A1 | 1/2006 | Bonalle et al. |
| 2006/0016874 A1 | 1/2006 | Bonalle et al. |
| 2006/0016875 A1 | 1/2006 | Bonalle et al. |
| 2006/0016877 A1 | 1/2006 | Bonalle et al. |
| 2006/0033609 A1 | 2/2006 | Bridgelall |
| 2006/0034492 A1 | 2/2006 | Siegel et al. |
| 2006/0066444 A1 | 3/2006 | Steeves |
| 2006/0069635 A1 | 3/2006 | Ram et al. |
| 2006/0071756 A1 | 4/2006 | Steeves |
| 2006/0080552 A1 | 4/2006 | Lauper |
| 2006/0095369 A1 | 5/2006 | Hofi |
| 2006/0104485 A1 | 5/2006 | Miller et al. |
| 2006/0123240 A1 | 6/2006 | Chaiken |
| 2006/0136336 A1 | 6/2006 | Drummond et al. |
| 2006/0156395 A1 | 7/2006 | Fontaine |
| 2006/0158434 A1 | 7/2006 | Zank et al. |
| 2006/0173291 A1 | 8/2006 | Glossop |
| 2006/0173791 A1 | 8/2006 | Mann et al. |
| 2006/0177061 A1 | 8/2006 | Orsini et al. |
| 2006/0178937 A1 | 8/2006 | Rau et al. |
| 2006/0190419 A1 | 8/2006 | Bunn et al. |
| 2006/0202835 A1 | 9/2006 | Thibault |
| 2006/0208066 A1 | 9/2006 | Finn et al. |
| 2006/0213986 A1 | 9/2006 | Register et al. |
| 2006/0229988 A1 | 10/2006 | Oshima et al. |
| 2006/0237528 A1 | 10/2006 | Bishop et al. |
| 2006/0242423 A1 | 10/2006 | Kussmaul |
| 2006/0278723 A1 | 12/2006 | Dan et al. |
| 2007/0008131 A1 | 1/2007 | Doan et al. |
| 2007/0046468 A1 | 3/2007 | Davis |
| 2007/0052517 A1* | 3/2007 | Bishop et al. .................. 340/5.2 |
| 2007/0057797 A1 | 3/2007 | Waldner et al. |
| 2007/0075841 A1 | 4/2007 | Maltsev et al. |
| 2007/0112957 A1 | 5/2007 | Shastri et al. |
| 2007/0119924 A1 | 5/2007 | Register et al. |
| 2007/0241861 A1 | 10/2007 | Venkatanna et al. |
| 2007/0252001 A1 | 11/2007 | Kail et al. |
| 2007/0252010 A1 | 11/2007 | Gonzalez et al. |
| 2007/0284432 A1 | 12/2007 | Abouyounes |
| 2007/0296544 A1 | 12/2007 | Beenau et al. |
| 2007/0296551 A1 | 12/2007 | Beenau et al. |
| 2007/0299782 A1 | 12/2007 | Beenau et al. |
| 2007/0299783 A1 | 12/2007 | Beenau et al. |
| 2008/0006691 A1 | 1/2008 | Bonalle et al. |
| 2008/0008359 A1 | 1/2008 | Beenau et al. |
| 2008/0008363 A1 | 1/2008 | Bonalle et al. |
| 2008/0010214 A1 | 1/2008 | Bonalle et al. |
| 2008/0011830 A1 | 1/2008 | Bonalle et al. |
| 2008/0011831 A1 | 1/2008 | Bonalle et al. |
| 2008/0013796 A1 | 1/2008 | Bonalle et al. |
| 2008/0013807 A1 | 1/2008 | Bonalle et al. |
| 2008/0015941 A1 | 1/2008 | Beenau et al. |
| 2008/0015992 A1 | 1/2008 | Bonalle et al. |
| 2008/0015993 A1 | 1/2008 | Bonalle et al. |
| 2008/0015994 A1 | 1/2008 | Bonalle et al. |
| 2008/0016002 A1 | 1/2008 | Beenau et al. |
| 2008/0033722 A1 | 2/2008 | Beenau et al. |
| 2008/0067242 A1 | 3/2008 | Bonalle et al. |
| 2008/0072065 A1 | 3/2008 | Bonalle et al. |
| 2009/0140839 A1 | 6/2009 | Bishop et al. |

FOREIGN PATENT DOCUMENTS

| | | |
|---|---|---|
| CH | 689680 | 8/1999 |
| DE | 2847756 | 5/1980 |
| DE | 3636921 | 5/1981 |
| DE | 3941070 | 6/1991 |
| DE | 4339460 | 11/1993 |
| DE | 29702538 | 4/1997 |
| DE | 19741726 | 9/1997 |
| DE | 10203926 | 1/2002 |
| EP | 0181770 | 5/1986 |
| EP | 0343829 | 11/1989 |
| EP | 0354817 | 2/1990 |
| EP | 0358525 | 3/1990 |
| EP | 0368570 | 5/1990 |
| EP | 0388090 | 9/1990 |
| EP | 0424726 | 10/1990 |
| EP | 0403134 | 12/1990 |
| EP | 0411602 | 2/1991 |
| EP | 0473998 | 3/1992 |
| EP | 0481388 | 4/1992 |
| EP | 0531605 | 3/1993 |
| EP | 0552047 | 7/1993 |
| EP | 0560318 | 9/1993 |
| EP | 0568185 | 11/1993 |
| EP | 0657297 | 6/1995 |
| EP | 0721850 | 7/1996 |
| EP | 0735505 | 10/1996 |
| EP | 0780839 | 6/1997 |
| EP | 0789316 | 8/1997 |
| EP | 0854461 | 7/1998 |
| EP | 0866420 | 9/1998 |
| EP | 0894620 | 2/1999 |
| EP | 0916519 | 5/1999 |
| EP | 0917120 | 5/1999 |
| EP | 0927945 | 7/1999 |
| EP | 0933717 | 8/1999 |
| EP | 0949595 | 10/1999 |
| EP | 0956818 | 11/1999 |
| EP | 0959440 | 11/1999 |
| EP | 0984404 | 3/2000 |
| EP | 1016947 | 7/2000 |
| EP | 1017030 | 7/2000 |
| EP | 1039403 | 9/2000 |
| EP | 1104909 | 6/2001 |
| EP | 1113387 | 7/2001 |
| EP | 1115095 | 7/2001 |
| EP | 1199684 | 4/2002 |

(56) References Cited

FOREIGN PATENT DOCUMENTS

| | | |
|---|---|---|
| EP | 1251450 | 10/2002 |
| EP | 1345146 | 9/2003 |
| EP | 1610273 | 12/2005 |
| GB | 1371254 | 10/1974 |
| GB | 2088110 | 6/1982 |
| GB | 2108906 | 5/1985 |
| GB | 2240948 | 8/1991 |
| GB | 2281714 | 3/1995 |
| GB | 2347537 | 9/2000 |
| GB | 2350021 | 11/2000 |
| GB | 2361790 | 10/2001 |
| JP | 61-100436 | 5/1986 |
| JP | 62-043774 | 3/1987 |
| JP | 62-264999 | 11/1987 |
| JP | 63-071794 | 4/1988 |
| JP | 63-098689 | 4/1988 |
| JP | 63-072721 | 5/1988 |
| JP | 63-175987 | 7/1988 |
| JP | 64-004934 | 1/1989 |
| JP | 64-087395 | 3/1989 |
| JP | 64-087396 | 3/1989 |
| JP | 64-087397 | 3/1989 |
| JP | 02-130737 | 5/1990 |
| JP | 02-252149 | 10/1990 |
| JP | 03-290780 | 12/1991 |
| JP | 42-005596 | 7/1992 |
| JP | 04-303692 | 10/1992 |
| JP | 05-069689 | 3/1993 |
| JP | 05-254283 | 10/1993 |
| JP | 06-183187 | 7/1994 |
| JP | 06-191137 | 7/1994 |
| JP | 06-234287 | 8/1994 |
| JP | 07-173358 | 7/1995 |
| JP | 07-205569 | 8/1995 |
| JP | 08-244385 | 9/1996 |
| JP | 08-324163 | 12/1996 |
| JP | 09-050505 | 2/1997 |
| JP | 09-052240 | 2/1997 |
| JP | 09-274640 | 10/1997 |
| JP | 10-129161 | 5/1998 |
| JP | 10-289296 | 10/1998 |
| JP | 10-334206 | 12/1998 |
| JP | 10-340231 | 12/1998 |
| JP | 11-175640 | 7/1999 |
| JP | 11-227367 | 8/1999 |
| JP | 11-353425 | 12/1999 |
| JP | 2000-011109 | 1/2000 |
| JP | 2000-015288 | 1/2000 |
| JP | 2000-040181 | 2/2000 |
| JP | 2000-048153 | 2/2000 |
| JP | 2000-067312 | 3/2000 |
| JP | 2000-163538 | 6/2000 |
| JP | 2000-177229 | 6/2000 |
| JP | 2000-194799 | 7/2000 |
| JP | 2000-207641 | 7/2000 |
| JP | 2000-222176 | 8/2000 |
| JP | 2000-252854 | 9/2000 |
| JP | 2001-005931 | 1/2001 |
| JP | 2001-504406 | 4/2001 |
| JP | 2001-134536 | 5/2001 |
| JP | 2001-160105 | 6/2001 |
| JP | 2001-283122 | 10/2001 |
| JP | 2001-315475 | 11/2001 |
| JP | 2002-032687 | 1/2002 |
| JP | 2002-109584 | 4/2002 |
| JP | 2002-133335 | 5/2002 |
| JP | 2002-133336 | 5/2002 |
| JP | 2002-157530 | 5/2002 |
| JP | 2002-163585 | 6/2002 |
| JP | 2002-183443 | 6/2002 |
| JP | 2002-274087 | 9/2002 |
| JP | 2003-288646 | 10/2003 |
| JP | 2004-164347 | 6/2004 |
| JP | 2004-348478 | 12/2004 |
| WO | WO 81/00776 | 3/1981 |
| WO | WO 89/03760 | 5/1989 |
| WO | WO 90/08661 | 8/1990 |
| WO | WO 91/08910 | 6/1991 |
| WO | WO 92/16913 | 10/1992 |
| WO | WO 95/32919 | 12/1995 |
| WO | WO 95/35546 | 12/1995 |
| WO | WO 96/06409 | 2/1996 |
| WO | WO 96/18972 | 6/1996 |
| WO | WO 97/09688 | 3/1997 |
| WO | WO 97/40459 | 10/1997 |
| WO | WO 98/21683 | 5/1998 |
| WO | WO 98/22291 | 5/1998 |
| WO | WO 98/45778 | 10/1998 |
| WO | WO 99/03057 | 1/1999 |
| WO | WO 99/12136 | 3/1999 |
| WO | WO 99/14055 | 3/1999 |
| WO | WO 99/21321 | 4/1999 |
| WO | WO 99/27492 | 6/1999 |
| WO | WO 99/40548 | 8/1999 |
| WO | WO 99/47983 | 9/1999 |
| WO | WO 99/49424 | 9/1999 |
| WO | WO 00/10144 | 2/2000 |
| WO | WO 00/38088 | 6/2000 |
| WO | WO 00/49586 | 8/2000 |
| WO | WO 00/73989 | 12/2000 |
| WO | WO 01/04825 | 1/2001 |
| WO | WO 01/13320 | 2/2001 |
| WO | WO 01/15098 | 3/2001 |
| WO | WO 01/18745 | 3/2001 |
| WO | WO 01/25872 | 4/2001 |
| WO | WO 01/43095 | 6/2001 |
| WO | WO 01/55955 | 8/2001 |
| WO | WO 01/72224 | 10/2001 |
| WO | WO 01/77856 | 10/2001 |
| WO | WO 01/78024 | 10/2001 |
| WO | WO 01/80473 | 10/2001 |
| WO | WO 01/86535 | 11/2001 |
| WO | WO 01/86599 | 11/2001 |
| WO | WO 01/90962 | 11/2001 |
| WO | WO 01/95243 | 12/2001 |
| WO | WO 02/01485 | 1/2002 |
| WO | WO 02/13134 | 2/2002 |
| WO | WO 02/21903 | 3/2002 |
| WO | WO 02/063545 | 8/2002 |
| WO | WO 02/065246 | 8/2002 |
| WO | WO 02/065404 | 8/2002 |
| WO | WO 02/067190 | 8/2002 |
| WO | WO 02/069221 | 9/2002 |
| WO | WO 02/073512 | 9/2002 |
| WO | WO 02/086665 | 10/2002 |
| WO | WO 02/091281 | 11/2002 |
| WO | WO 02/097575 | 12/2002 |
| WO | WO 02/101670 | 12/2002 |
| WO | WO 03/007623 | 1/2003 |
| WO | WO 2004/052657 | 6/2004 |

OTHER PUBLICATIONS

White, "How Computers Work", Millennium Edition, 1999, Que Corporation, Indianapolis, IN, all pages.*
Gralla, "How the Internet Works", Millennium Edition, 1999, Que Corporation, Indianapolis, IN, all pages.*
Muller, "Desktop Encyclopedia of the Internet", 1999, Artech House Inc., Norwood, MA, all pages.*
"The Bank Credit Card Business", American Bankers Association, 1996, all pages.*
Menezes et al., "Handbook of Applied Cryptography", 1997, CRC Press, chapter 10.*
Rankl et al., "Smart Card Handbook," Second Edition, 2000, Wiley & Sons, all pages.*
"Biometrics: Speaker Verification", by Kulkarni, et al., http://biometrics.cse.msu.edu/speaker.html, Mar. 8, 2004, 5 pages.
"Judge Dismisses FTC Suit Against Rambus", Evers, IDG New Service, http://www.infoworld.com/article/04/02/18/HNjudgedismisses_1.html, Feb. 18, 2004, 3 pages.
"Credit on Your Key Ring, Buy Gas at Mobil, Exxon and Soon Burgers at McDonald's", by Krakow, MSNBC, http://www.msnbc.msn.com/id/3072638, Feb. 17, 2004, 4 pages.

(56) References Cited

OTHER PUBLICATIONS

"The Evolution of Mobile Payment", by McPherson, Financial Insights, Feb. 2, 2004, http://www.banktech.com./story/mews/showArticle/jhtml?article ID=17601432, 2 pages.
"RFID Take Priority With Wal-Mart", by DocMemory, http://www.simmtester.com/page/news/shownews.asp?num=6550, Feb. 9, 2004, 2 pages.
"Microsoft, IBM and Phillips Test RFID Technology", by Rohde, IDG New Service, http:www.computerweekly.com/Article127889.htm, Feb. 9, 2004, 3 pages.
"Pay by Touch Press Releases", http://www.paybytouch.com/press.html, Feb. 10, 2004, 3 pages.
"PowerPay RFID Payment and Marketing Solution Speeds Purchases at Seahawks Stadium with Technology from Texas Instruments", http://www.powerpayit.com/news/Seahawks_pr.html, Feb. 9, 2004, 2 pages.
"Putting Their Finger on It", by Wilson, http://sanfrancisco.bizjournals.com/sanfrancisco/stories/2003/10/20/story6.html?t=printable, Feb. 9, 2004, 2 pages.
"TI Embraces Prox Card Standard", by Roberti, Mar. 6, 2003, http://www.ti.com/tiris/docs/in-the-news/2003/3-6-03.shtml, 2 pages.
"Paying It by Ear", The Guardian, Jan. 18, 2003, http://money.guardian.co.uk/creditanddebt/creditcards/story/0,1456,876908,00.html, 3 pages.
"International Biometric Group—Signature Biometrics: How It Works", http://www.ibgweb.com/reports/public/reports/signature-scan_tech.html, Feb. 18, 2004, 1 page.
"International Biometric Group—Voice Recognition Technology: How It Works", http://www.ibgweb.com/reports/public/reports/voice-scan_tech.html, Feb. 18, 2004, 1 page.
"Individual Biometrics—Hand Geometry", http://ctl.ncsc.dni.us/biomet%20web/BMHand.html, Feb. 18, 2004, 2 pages.
"Individual Biometrics—Retinal Scan", http:ctl.ncsc.dni.us/biomet%20web/BMRetinal.html, Feb. 18, 2004, 2 pages.
"Individual Biometrics—Iris Scan", http:ctl.ncsc.dni.us/biomet%20web/BMIris.html, Feb. 18, 2004, 2 pages.
"Individual Biometrics—Vascular Patterns", http:ctl.ncsc.dni.us/biomet%20web/BMVascular.html, Feb. 18, 2004, 1 page.
"Individual Biometrics—Fingerprint", http:ctl.ncsc.dni.us/biomet%20web/BMFingerprint.html, Feb. 18, 2004, 3 pages.
"Fingerprint Technology—Indentix Inc.—Empowering Identification™—Understanding Biometrics", http://www.identix.com/newsroom/news_biometrics_finger.html, Feb. 18, 2004, 1 page.
"Individual Biometrics—Facial Recognition", http:ctl.ncsc.dni.us/biomet%20web/BMfacial.html, Feb. 18, 2004, 2 pages.
"Fingerprint Analysis—The Basics", http://www.crimtrac.gov.au/fingerprintanalysis.htm, Feb. 18, 2004, 3 pages.
"Visual Speech and Speaker Recognition", by Luettin, Jun. 30, 2000, http://herens.idiap.ch/~luettin/luettin-thesis.bib.abs.html, 1 page.
"Automatic Ear Recognition by Force Field Transformations", by Hurley, et al., The Institution of Electrical Engineers, 2000, pp. 7/1-7/5.
"Everything You Need to Know About Biometrics", by Bowman, Identix Corproration, Jan. 2000, 8 pages.
"How Fingerprint Scanners Work", by Harris, http:computer.howstuffworks.com/fingerprint-scanner.htm/printable, Feb. 18, 2004, 6 pages.
"How Facial Recognition Systems Work", by Bonsor, http://computer.howstuffworks.com/facial-recognition.htm/ printable, Feb. 18, 2004, 6 pages.
"Biometrics: Hand Geometry", by Ross, et al., http://biometrics.cse.msu.edu/hand_geometry.html, Feb. 26, 2004, 2 pages.
"ISO Magnetic Stripe Card Standards", http://www.cyberd.co.uk/support./technotes/ioscards.htm, Feb. 9, 2004, 4 pages.
"Smart Card Developer's Kit: Some Basic Standards for Smart Cards", http:unix.be.eu.org/docs/smart-card-developer-kit/ch03/033-035.html, Feb. 9, 2004, 2 pages.
Goldman, J., "Internet Security, The Next Generation, When Software Encryption is not Enough," WEB Techniques, Nov. 1997, pp. 43-46.

Simmons, J., "Smart Cards Hold the Key to Secure Internet Commerce," EC World, Dec. 1998, pp. 36-38.
Wayner, P., "Digital Cash," AP Professional, 1996, pp. 76-83, 85-100.
Turban, et al., "Using Smartcards in Electronic Commerce," Proc. 31st Annual Hawaii Inter. Conf. on System Sciences, vol. 4, 1998, pp. 62-69.
Dhem, et al., "SCALPS: Smart Card for Limited Payment Systems," IEEE Micro, Jun. 1996, pp. 42-51.
Smith, M.T., "Smart Cards: Integrating for Portable Complexity," Computer—Integrated Engineering, Aug. 1998, pp. 110-115.
Geer, et al., "Token-Mediated Certification and Electronic Commerce," Proc. 2nd USENIX Workshop on Electronic Commerce, Nov. 18-21, 1996, pp. 13-22.
Gobioff, et al., "Smart Cards in Hostile Environments," Proc. 2nd USENIX Workshop in Electronic Commerce, Nov. 18-21, 1996, pp. 23-28.
Fancher, C.H., "In Your Pocket Smartcards," IEEE Spectrum, Feb. 1997, pp. 47-53.
Blythe, I., "Smarter, More Secure Smartcards," BYTE, Jun. 1997, pp. 63-64.
Leach, Dr. J., "Dynamic Authentication for Smartcards," Computers and Security, vol. 14, No. 5, 1995, pp. 385-389.
Wu, et al., "Authenticating Passwords Over an Insecure Channel," Computers and Security, vol. 15, No. 5, 1996, pp. 431-439.
Manninger, et al., "Adapting an Electronic Purse for Internet Payments," ACISP '98 Proceedings, Jul. 13-15, 1998, pp. 205-214.
Yan, et al., "Banking on the Internet and Its Applications," Proc. 13th Annual Hawaii International Conference on System Sciences, vol. 4, 1997, pp. 275-284.
Transport Layer Security Working Group, "The SSL Protocol, Version 3.0," Nov. 18, 1996 (also available at http://home.netscape.com/eng/ssl3/draft302.txt).
Business Wire (press release), "Master Card E-Wallet," Jul. 11, 2000.
Obongo.com Website, "Obongo," Aug. 8, 2000 (Description of wallet toolbar also available at http://www.obongo.com/chabi/website/index.htm).
PR Newswire (press release), "Providian Launches Nation's First Clear Chip Card," Sep. 12, 2000. The press release may be related to the art of the invention, but based upon the information in the press release, it is unclear if the press release is prior art.
"Physical Reality: A Second Look", Ken Sharp, Senior Technical Editor, http://www.idsystems.com/reader/1999_03/phys0399_pt2/phys0399_pt2.htm (6 pages).
"'Magic Wands' to Speed Mobile Sales",Bob Brewin, Jan. 15, 2001, http://www.computerworld.com/mobiletopics/mobile/story/1,10801,563300.html (4 pages).
"Mobile Speedpass Goes Global as Mobil Singapore Rolls Out Asia's First RFID-Based Pay-At-The-Pump System", Press Release, Apr. 5, 1999, http://www.ti.com/tiris/docs/news_releases/rel12.htm (3 pages).
"Speedpass Unleashed", Jun. 4, 2002 http://www.cardweb.com/cardtrak/news/cf2_20a_97.html (2 pages).
Prophecy Central Update #9, Oct. 10, 1997, http://www.bible-prophecy.com/pcu9.htm (5 pages).
International Newsletter of the TI RFID Group, Issue 20, 2000 (12 pages).
"CES: Microsoft's SPOT Technology has Humble Origins", by James Niccolai, Jan. 10, 2003, http://archive.inforworld.com/articles/hn/xml/03/01/10/030110hnspot.xml?s=IDGNS (3 pages).
"Microsoft: See SPOT Run on Your Wrist", by Richard Shim, Jun. 5, 2003, http://news.com.com/2100-1041_3-1013442.html?tag=fd_top (1 page).
"Networking: Microsoft SPOT", by Jeremy A. Kaplan, Jul. 1, 2003, http://www.pcmag.com/print_article/0,3048, a=43561,00.asp (2 pages).
"Microsoft Launches Smart Personal Object Technology Initiative", Press Release from COMDEX Fall 2002, Nov. 17, 2002, http://www.Microsoft.com/presspass/features/2002/nov02/11-17SPOT.asp (4 pages).
"Bank Extends RFID Payment Pilot: Bank of America will continue to test its QuickWave RFID payment card for another three months", RFID Journal, Jan. 23, 2003.

(56) References Cited

OTHER PUBLICATIONS

"MasterCard to Test RFID Card: Pilot will test whether consumers, merchants and credit card issuers value "contactless" payments", RFID Journal, Dec. 20, 2002.
"Vendors Target Amusement Parks: Protecting children and enabling cashless payments make RFID an appealing option for the entertainment industry", RFID Journal, Nov. 27, 2002.
"Inside's Next-Gen Smart Card: The French company plans to introduce an RFID card that uses a 16-bit microprocessor and new encryption technology", RFID Journal, Oct. 29, 2002.
"Sony, Philips Creating RFID Link: Consumer electronics giants are jointly developing a new RFID standard for payments and for communication between devices", RFID Journal, Sep. 17, 2002.
"Japan Gets Digital Ticket System: A national ticket seller and phone company are teaming up to create an electronic ticket", RFID Journal, Aug. 31, 2002.
"Security for Wireless Java: NTRU, a startup that offers security software, has relased of Java version of its NTRU encryption algorithm", RFID Journal, Jun. 27, 2002.
"Making RFID Payments Ubiquitous: Philips and Visa want people to be able to pay for goods and services anywhere by using RFID chips embedded in the phones and other devices", RFID Journal, Jun. 2, 2003.
"RFID Smart Cards Gain Ground: The convenience of contactless transactions is driving widespread adoption of contactless smart cards", RFID Journal, Apr. 9, 2003.
"TI Embraces Prox Card Standard: Texas Instruments ISO 14443 payment platform promises faster data transfer rates and more security", RFID Journal, Mar. 6, 2003.
"Multiple Frequency Transponders: Volume production of dual-band RFID chips begins", Frontline Solutions, Jul. 16, 2003.
Functional Specification, Standard Card IC MF1 IC S50, Philips Semiconductors, Product Specification Rev. 5.1 May 2001.
http://www.semiconductors.phillips.com/news/content/file_878.html, Apr. 7, 2003.
http://www.palowireless.com/infotooth/whatis.asp, Apr. 28, 2003.
http://www.palowireless.com/infotooth/tutorial.asp, Apr. 28, 2003.
http://www.palowireless.com/infotooth/tutorial/profiles.asp, Apr. 28, 2003.
http://www.palowireless.com/infotooth/tutorial/radio.asp, Apr. 28, 2003.
http://www.polowireless.com/infotooth/tutorial/baseband.asp, Apr. 28, 2003.
http://www.palowireless.com/infotooth/tutorial/lmp.asp, Apr. 28, 2003.
http://www.palowireless.com/infotooth/tutorial/hci.asp, Apr. 28, 2003.
http://www.palowireless.com/infotooth/tutorial/l2cap.asp, Apr. 28, 2003.
http://www.palowireless.com/infotooth/tutorial/rfcomm.asp, Apr. 28, 2003.
http://www.palowireless.com/infotooth/tutorial/sdp.asp, Apr. 28, 2003.
http://www.palowireless.com/infotooth/tutorialk1_gap.asp, Apr. 28, 2003.
"Sony, Phillips to Test RFID Platform", RFID Journal, May 8, 2003.
Costco, The Choice is Yours, 1998, http://www.costco.com/frameset.asp?trg=subcat%2Easp&catid=502&subsid=503&log=.
For Partners, Card Co-branding, 2000, http://www.statravel.com.sg/idcards/pcobrand.
USBanker, Article 5, 1995, http://www.banking.com/us-banker/art5.
Financial Technology International Bulletin, V14, n1, p. 4, Sep. 1996.
Green, Thomas C., "American Express Offers temporary CC numbers for the web," Sep. 9, 2000, The Register, www.theregister.c.uk/c.
CNN.com, U.S. News, "American Express to offer disposable credit card numbers," Sep. 8, 2000, Associated Press, www.cnn.c.
Martin, Zack, "One-Time Numbers Stop Web Hackers From Pilfering Data," Jan. 2001, Card Marketing, Thomson Financial, www.c rdf rum.c.

The Dollar Stretcher, "Disposable Credit Card Numbers," Jan. 2001, CardRatings.org, www.stretcher.c.
ISO/IEC 7816-6:1996(E)—First Edition—May 15, 1996.
ISO/IEC 7816-4:1995(E)—First Edition—Sep. 1, 1995.
Final Office Action issued Feb. 6, 2009 in U.S. Appl. No. 11/306,617.
ISR issued May 22, 2008 in PCT/US06/045362.
Written Opinion issued Jul. 9, 2008 in PCT/US06/045362.
Notice of Allowance issued Mar. 3, 2009 in U.S. Appl. No. 11/161,295.
Non-Final Office Action issued Mar. 19, 2008 in U.S. Appl. No. 11/164,609.
U.S. Appl. No. 60/395,606, filed Jul. 15, 2002.
"Credit Card Offer Travelers New Benefit," PR Newswire, Aug. 5, 1987.
"Inside's Next Gen Smart Card: The French company plans to introduce an RFID card that uses a 16-bit microprocessor and new encryption technology," RFID Journal, Oct. 29, 2002.
"New Evidence about Positive Three-Tier Co-Pay Performance Presented at Express Scripts 2000 Outcomes Conference," PR Newswire Association, Inc., Jun. 28, 2000.
"Prestige Credit Cards: Those Pricey Plastics," Changing Times, Apr. 1986.
"Shell Introduces Optional Credit Card," The Associated Press, Sep. 3, 1985.
"Shell Introducing Expanded 'Signature' Credit Card," Tulsa Business Chronicle, Sep. 5, 1985.
"Shell-Oil: Introduces Shell Signature Travel and Entertainment Credit Card," Business Wire, Sep. 3, 1985.
"The Chase Manhattan Bank Today Announced a Comprehensive Program to Enhance the Value of All of its Credit Cards," PR Newswire, Dec. 18, 1986.
Carey, Gordon, "Multi-tier Copay," Pharmaceutical Executive, Feb. 2000.
Crumbaugh, Darlene M., "Effective Marketing Positions: Check card as consumer lifeline," Hoosier Banker, Apr. 1998, p. 10, vol. 82, issue 4.
Gabber, et al., "Agora: A Minimal Distributed Protocol for Electronic Commerce," USENIX Oakland, CA, Nov. 18, 1996.
Goldwasser, Joan, "Best of the Cash-Back Cards," Kiplinger's Personal Finance Magazine, Apr. 1999.
Kuntz, Mary, "Credit Cards as Good as Gold," Forbes, Nov. 4, 1985.
Lahey, Liam, "Microsoft Bolsters Rebate Structure," Computer Dealer News, Feb. 8, 2002.
Lamond, "Credit Card Transactions Real World and Online," Copyright 1996.
Nyman, Judy, "Free Income Tax Clinics are Opening as Apr. 30 Deadline Draws Nearer," The Toronto Star, Final Edition, Mar. 25, 1986.
Obel, Michael, "Oil Companies Push Marketing, Cost Cutting to Fortify Earnings," Oil & Gas Journal, Sep. 16, 1985.
Schmuckler, Eric, "Playing Your Cards Right," Forbes, Dec. 28, 1987.
"Core One Credit Union—Discover The Advantage," http://coreone.org/2visa.html, Copyright 2001 (last visited Oct. 9, 2002).
ISR dated Mar. 26, 2004 for PCT/US03/34602.
WO dated Oct. 13, 2004 for PCT/US03/34602.
IPER dated Jan. 20, 2005 for PCT/US03/34602.
Office Action dated Feb. 16, 2005 for TW092131042.
Office Action dated May 18, 2006 for AR 041912 A1.
Office Action dated Mar. 8, 2007 for AR 041912 A1.
Non-Final Office Action issued Apr. 1, 2008 in U.S. Appl. No. 10/810,473.
Non-Final Office Action issued Oct. 17, 2007 in U.S. Appl. No. 10/710,611.
Final Office Action issued May 28, 2008 in U.S. Appl. No. 10/710,611.
Advisory Action issued Sep. 5, 2008 in U.S. Appl. No. 10/710,611.
Non-Final Office Action issued Mar. 4, 2008 in U.S. Appl. No. 10/711,720.
Final Office Action issued Jul. 23, 2008 in U.S. Appl. No. 10/711,720.
Non-Final Office Action issued Jul. 7, 2005 in U.S. Appl. No. 10/708,548.

(56) References Cited

OTHER PUBLICATIONS

Notice of Allowance issued Jan. 31, 2006 in U.S. Appl. No. 10/708,548.
Non-Final Office Action issued Feb. 25, 2008 in U.S. Appl. No. 10/708,569.
Non-Final Office Action issued Sep. 24, 2007 in U.S. Appl. No. 10/708,547.
Final Office Action issued Feb. 14, 2008 in U.S. Appl. No. 10/708,547.
Advisory Action issued Jul. 29, 2008 in U.S. Appl. No. 10/708,547.
Non-Final Office Action issued Mar. 22, 2006 in U.S. Appl. No. 10/708,597.
Final Office Action issued Oct. 10, 2006 in U.S. Appl. No. 10/708,597.
Restriction Requirement issued Mar. 22, 2007 in U.S. Appl. No. 10/708,597.
Non-Final Office Action issued Aug. 8, 2007 in U.S. Appl. No. 10/708,597.
Final Office Action issued Mar. 17, 2008 in U.S. Appl. No. 10/708,597.
Advisory Action issued Jul. 11, 2008 in U.S. Appl. No. 10/708,597.
Non-Final Office Action issued Nov. 1, 2007 in U.S. Appl. No. 10/746,781.
Final Office Action issued Jul. 10, 2008 in U.S. Appl. No. 10/746,781.
Ex-Parte Quayle Action issued Dec. 14, 2005 in U.S. Appl. No. 10/708,549.
Notice of Allowance issued May 8, 2006 in U.S. Appl. No. 10/708,549.
Non-Final Office Action issued May 17, 2007 in U.S. Appl. No. 10/810,469.
Final Office Action issued Jan. 11, 2008 in U.S. Appl. No. 10/810,469.
Advisory Action issued Apr. 30, 2008 in U.S. Appl. No. 10/810,469.
Notice of Allowance issued Aug. 5, 2008 in U.S. Appl. No. 10/810,469.
Final Office Action issued Jul. 28, 2005 in U.S. Appl. No. 10/710,307.
Final Office Action issued Nov. 21, 2005 in U.S. Appl. No. 10/710,307.
Advisory Action issued Feb. 10, 2006 in U.S. Appl. No. 10/710,307.
Non-Final Office Action issued May 2, 2006 in U.S. Appl. No. 10/710,307.
Final Office Action issued Oct. 10, 2006 in U.S. Appl. No. 10/710,307.
Advisory Action issued Jan. 5, 2007 in U.S. Appl. No. 10/710,307.
Non-Final Office Action issued Apr. 10, 2007 in U.S. Appl. No. 10/710,307.
Notice of Allowance issued Oct. 4, 2007 in U.S. Appl. No. 10/710,307.
Supplemental Notice of Allowance issued Nov. 8, 2007 in U.S. Serial No. 710,307.
Office Action dated Mar. 6, 2008 for AU2005270228.
Office Action dated Jun. 18, 2008 for AU2005270228.
Office Action dated Apr. 14, 2008 for CA2570739.
ISR/WO dated Oct. 10, 2006 for PCT/US05/19388.
IPRP dated Mar. 15, 2007 for PCT/US05/19388.
Non-Final Office Action issued Feb. 26, 2008 in U.S. Appl. No. 11/859,153.
Notice of Allowance issued Jun. 20, 2008 in U.S. Appl. No. 11/859,153.
Examination Report dated Jun. 22, 2007 for GB 0700319.7.
Examination Report dated Nov. 22, 2007 for GB 0700319.7.
Non-Final Office Action issued Dec. 13, 2007 in U.S. Appl. No. 10/318,432.
Non-Final Office Action issued Jun. 27, 2008 in U.S. Appl. No. 10/318,432.
ISR dated Apr. 22, 2004 for PCT/US03/21280.
Non-Final Office Action issued Mar. 10, 2008 in U.S. Appl. No. 11/160,627.
Final Office Action issued Jun. 24, 2008 in U.S. Appl. No. 11/160,627.
Advisory Action issued Aug. 6, 2008 in U.S. Appl. No. 11/160,627.
Restriction Requirement issued Apr. 30, 2008 in U.S. Appl. No. 11/160,548.
Non-Final Office Action issued Aug. 21, 2008 in U.S. Appl. No. 11/160,548.
Non-Final Office Action issued Jul. 8, 2005 in U.S. Appl. No. 10/708,839.
Final Office Action issued Nov. 21, 2005 in U.S. Appl. No. 10/708,839.
Advisory Action issued Feb. 9, 2006 in U.S. Appl. No. 10/708,839.
Non-Final Office Action issued May 2, 2006 in U.S. Appl. No. 10/708,839.
Final Office Action issued Jan. 25, 2007 in U.S. Appl. No. 10/708,839.
Notice of Abandonment issued Oct. 11, 2007 in U.S. Appl. No. 10/708,839.
Non-Final Office Action issued Sep. 7, 2006 in U.S. Appl. No. 10/708,585.
Notice of Allowance issued May 11, 2007 in U.S. Appl. No. 10/708,585.
Non-Final Office Action issued Nov. 28, 2005 in U.S. Appl. No. 10/708,823.
Final Office Action issued May 17, 2006 in U.S. Appl. No. 10/708,823.
Notice of Abandonment issued Jan. 5, 2007 in U.S. Appl. No. 10/708,823.
Non-Final Office Action issued May 13, 2008 in U.S. Appl. No. 10/708,545.
ISR/WO dated Aug. 19, 2008 for PCT/US05/07905.
Non-Final Office Action issued Sep. 7, 2006 in U.S. Appl. No. 10/708,550.
Notice of Allowance issued May 11, 2007 in U.S. Appl. No. 10/708,550.
ISR/WO dated Feb. 16, 2007 for PCT/US05/36848.
IPRP (Ch 1) dated Apr. 26, 2007 for PCT/US05/36848.
Non-Final Office Action issued Apr. 4, 2007 in U.S. Appl. No. 10/711,965.
Non-Final Office Action issued Oct. 16, 2007 in U.S. Appl. No. 10/711,965.
Final Office Action issued Mar. 28, 2008 in U.S. Appl. No. 10/711,965.
Advisory Action issued Jul. 31, 2008 in U.S. Appl. No. 10/711,965.
Final Office Action issued Aug. 18, 2008 in U.S. Appl. No. 10/711,965.
Non-Final Office Action issued May 4, 2006 in U.S. Appl. No. 10/711,970.
Notice of Allowance issued Feb. 2, 2007 in U.S. Appl. No. 10/711,970.
ISR/WO dated Aug. 17, 2006 for PCT/US05/36828.
IPRP (Ch 1) dated Apr. 26, 2007 for PCT/US05/36828.
Non-Final Office Action issued Feb. 25, 2008 in U.S. Appl. No. 10/711,964.
Final Office Action issued Jun. 30, 2008 in U.S. Appl. No. 10/711,964.
Advisory Action issued Sep. 10, 2008 in U.S. Appl. No. 10/711,964.
Non-Final Office Action issued Oct. 3, 2006 in U.S. Appl. No. 10/711,966.
Final Office Action issued May 21, 2007 in U.S. Appl. No. 10/711,966.
Non-Final Office Action issued Dec. 11, 2007 in U.S. Appl. No. 10/711,966.
Non-Final Office Action issued Nov. 28, 2005 in U.S. Appl. No. 10/708,824.
Final Office Action issued May 17, 2006 in U.S. Appl. No. 10/708,824.
Notice of Abandonment issued Jan. 5, 2007 in U.S. Appl. No. 10/708,824.
Non-Final Office Action issued Dec. 13, 2005 in U.S. Appl. No. 10/708,825.
Final Office Action issued May 11, 2006 in U.S. Appl. No. 10/708,825.

(56) References Cited

OTHER PUBLICATIONS

Notice of Abandonment issued Jan. 25, 2007 in U.S. Appl. No. 10/708,825.
Non-Final Office Action issued Nov. 29, 2005 in U.S. Appl. No. 10/708,826.
Final Office Action issued May 17, 2006 in U.S. Appl. No. 10/708,826.
Notice of Abandonment issued Jan. 5, 2007 in U.S. Appl. No. 10/708,826.
Non-Final Office Action issued Jan. 10, 2006 in U.S. Appl. No. 10/708,827.
Non-Final Office Action issued Apr. 20, 2005 in U.S. Appl. No. 10/192,488.
Final Office Action issued Sep. 8, 2005 in U.S. Appl. No. 10/192,488.
Advisory Action issued Nov. 10, 2005 in U.S. Appl. No. 10/192,488.
Non-Final Office Action issued Jan. 18, 2006 in U.S. Appl. No. 10/192,488.
Final Office Action issued Sep. 25, 2006 in U.S. Appl. No. 10/192,488.
Notice of Allowance issued Feb. 2, 2007 in U.S. Appl. No. 10/192,488.
Examiner's Report dated Oct. 5, 2006 for AU2002318293.
Office Action dated Jun. 28, 2007 in CA 2,452,351.
Office Action dated Apr. 25, 2008 in CA 2,452,351.
Supplemental Search Report dated Nov. 16, 2004 for EP02748120.9.
Examination Report dated Mar. 8, 2005 for EP02748120.9.
Examination Report dated Feb. 8, 2006 for EP02748120.9.
Examination Report dated Oct. 24, 2007 for EP02748120.9.
Office Action dated Mar. 9, 2006 in JP2003-513257.
Office Action dated Oct. 20, 2006 in JP2003-513257.
Office Action dated Aug. 1, 2007 in JP2003-513257.
Office Action dated Jan. 29, 2008 in JP2003-513257.
Office Action dated Jul. 11, 2007 for MX PA/a/2004/000253.
Office Action dated Jan. 27, 2005 in NZ530497.
ISR dated Dec. 30, 2002 for PCT/US02/0219903.
Office Action dated Dec. 30, 2005 for CN02813783.3.
Office Action dated May 16, 2007 for CN02813783.3.
Non-Final Office Action mailed Feb. 8, 2008 in U.S. Appl. No. 10/340,352.
Final Office Action mailed Jun. 13, 2008 in U.S. Appl. No. 10/340,352.
Advisory Action mailed Aug. 19, 2008 in U.S. Appl. No. 10/340,352.
Office Action dated Jan. 29, 2007 for CA2458143.
Office Action dated Dec. 19, 2007 for CA2458143.
Supplemental Search Report dated May 26, 2006 for EP03763325.2.
Examination Report dated Oct. 26, 2006 for EP03763325.2.
Office Action dated Aug. 3, 2006 in JP2004-562629.
Office Action dated Mar. 8, 2007 in JP2004-562629.
Final Office Action dated Oct. 4, 2007 in JP2004-562629.
ISR dated Apr. 22, 2004 for PCT/US03/21279.
Office Action dated Oct. 4, 2007 for JP2007-026166.
Non-Final Office Action issued Mar. 26, 2008 in U.S. Appl. No. 10/905,005.
Non-Final Office Action issued Nov. 1, 2006 in U.S. Appl. No. 10/905,006.
Notice of Allowance issued Jul. 12, 2007 in U.S. Appl. No. 10/905,006.
Non-Final Office Action issued Jun. 20, 2006 in U.S. Appl. No. 10/318,480.
Notice of Allowance issued Jan. 24, 2007 in U.S. Appl. No. 10/318,480.
Supplemental Notice of Allowance issued Mar. 13, 2007 in U.S. Appl. No. 10/318,480.
ISR dated Apr. 22, 2004 for PCT/US03/21447.
Non-Final Office Action issued Nov. 22, 2005 in U.S. Appl. No. 10/876,822.
Final Office Action issued Aug. 3, 2006 in U.S. Appl. No. 10/876,822.
Non-Final Office Action issued Feb. 6, 2007 in U.S. Appl. No. 10/876,822.
Final Office Action issued Jul. 18, 2007 in U.S. Appl. No. 10/876,822.
Non-Final Office Action issued Jan. 28, 2008 in U.S. Appl. No. 10/876,822.
Final Office Action issued Aug. 22, 2008 in U.S. Appl. No. 10/876,822.
Non-Final Office Action issued Mar. 23, 2006 in U.S. Appl. No. 10/318,432.
Restriction Requirement issued Jan. 17, 2007 in U.S. Appl. No. 10/318,432.
Non-Final Office Action issued May 1, 2007 in U.S. Appl. No. 10/318,432.
Non-Final Office Action issued May 2, 2008 in U.S. Appl. No. 11/861,351.
Non-Final Office Action issued May 1, 2008 in U.S. Appl. No. 11/861,354.
Non-Final Office Action issued May 25, 2007 in U.S. Appl. No. 10/710,327.
Notice of Allowance issued Nov. 13, 2007 in U.S. Appl. No. 10/710,327.
Non-Final Office Action issued May 1, 2008 in U.S. Appl. No. 11/861,463.
Non-Final Office Action issued May 8, 2008 in U.S. Appl. No. 11/861,481.
Non-Final Office Action issued Sep. 21, 2006 in U.S. Appl. No. 10/710,328.
Notice of Abandonment issued Jun. 28, 2007 in U.S. Appl. No. 10/710,328.
Non-Final Office Action issued Sep. 19, 2006 in U.S. Appl. No. 10/710,329.
Notice of Abandonment issued Aug. 23, 2007 in U.S. Appl. No. 10/710,329.
Non-Final Office Action issued Mar. 9, 2006 in U.S. Appl. No. 10/710,330.
Notice of Abandonment issued Nov. 17, 2006 in U.S. Appl. No. 10/710,330.
Non-Final Office Action issued Jul. 29, 2005 in U.S. Appl. No. 10/710,331.
Final Office Action issued Nov. 29, 2005 in U.S. Appl. No. 10/710,331.
Advisory Action issued Feb. 9, 2006 in U.S. Appl. No. 10/710,331.
Non-Final Office Action issued May 3, 2006 in U.S. Appl. No. 10/710,331.
Notice of Abandonment issued Jan. 10, 2007 in U.S. Appl. No. 10/710,331.
Non-Final Office Action issued Jul. 19, 2005 in U.S. Appl. No. 10/710,332.
Final Office Action issued Nov. 21, 2005 in U.S. Appl. No. 10/710,332.
Advisory Action issued Feb. 10, 2006 in U.S. Appl. No. 10/710,332.
Non-Final Office Action issued May 3, 2006 in U.S. Appl. No. 10/710,332.
Final Office Action issued Oct. 10, 2006 in U.S. Appl. No. 10/710,332.
Advisory Action issued Jan. 5, 2007 in U.S. Appl. No. 10/710,332.
Non-Final Office Action issued Apr. 20, 2007 in U.S. Appl. No. 10/710,332.
Notice of Allowance issued Oct. 4, 2007 in U.S. Appl. No. 10/710,332.
Supplemental Notice of Allowance issued Nov. 8, 2007 in U.S. Appl. No. 10/710,332.
Non-Final Office Action issued May 2, 2008 in U.S. Appl. No. 11/861,600.
Non-Final Office Action issued May 1, 2008 in U.S. Appl. No. 11/861,626.
Non-Final Office Action issued Jan. 27, 2005 in U.S. Appl. No. 10/710,334.
Final Office Action issued Sep. 30, 2005 in U.S. Appl. No. 10/710,334.
Advisory Action issued Dec. 19, 2005 in U.S. Appl. No. 10/710,334.
Non-Final Office Action issued Apr. 10, 2006 in U.S. Appl. No. 10/710,334.

(56) References Cited

OTHER PUBLICATIONS

Notice of Abandonment issued Nov. 6, 2006 in U.S. Appl. No. 10/710,334.
Non-Final Office Action issued Aug. 8, 2005 in U.S. Appl. No. 10/710,335.
Final Office Action issued Dec. 15, 2005 in U.S. Appl. No. 10/710,335.
Advisory Action issued Mar. 8, 2006 in U.S. Appl. No. 10/710,335.
Non-Final Office Action issued May 9, 2006 in U.S. Appl. No. 10/710,335.
Final Office Action issued Oct. 19, 2006 in U.S. Appl. No. 10/710,335.
Advisory Action issued Jan. 12, 2007 in U.S. Appl. No. 10/710,335.
Non-Final Office Action issued Apr. 19, 2007 in U.S. Appl. No. 10/710,335.
Notice of Allowance issued Sep. 19, 2007 in U.S. Appl. No. 10/710,335.
Supplemental Notice of Allowance issued Oct. 25, 2007 in U.S. Appl. No. 10/710,335.
Non-Final Office Action issued May 1, 2008 in U.S. Appl. No. 11/862,268.
Non-Final Office Action issued Aug. 4, 2008 in U.S. Appl. No. 11/306,617.
ISR/WO dated Jul. 9, 2008 for PCT/US06/45362.
Non-Final Office Action issued Jun. 24, 2008 in U.S. Appl. No. 11/161,295.
Non-Final Office Action issued Sep. 8, 2005 in U.S. Appl. No. 10/906,732.
Final Office Action issued Mar. 8, 2006 in U.S. Appl. No. 10/906,732.
Advisory Action issued Jul. 5, 2006 in U.S. Appl. No. 10/906,732.
Notice of Allowance issued Aug. 11, 2006 in U.S. Appl. No. 10/906,732.
Non-Final Office Action issued Apr. 23, 2007 in U.S. Appl. No. 10/708,822.
Notice of Allowance issued Sep. 19, 2007 in U.S. Appl. No. 10/708,822.
ISR/WO dated Nov. 16, 2005 for PCT/US05/09452.
IPRP dated Aug. 16, 2006 for PCT/US05/09452.
IPRP dated Jan. 5, 2007 for PCT/US05/09452.
Non-Final Office Action issued Jan. 22, 2008 in U.S. Appl. No. 11/858,958.
Non-Final Office Action issued Jun. 6, 2005 in U.S. Appl. No. 10/708,830.
Non-Final Office Action issued Oct. 4, 2005 in U.S. Appl. No. 10/708,830.
Notice of Allowance issued Mar. 2, 2006 in U.S. Appl. No. 10/708,830.
Supplemental Notice of Allowance issued Aug. 4, 2006 in U.S. Appl. No. 10/708,830.
Non-Final Office Action issued May 15, 2007 in U.S. Appl. No. 10/708,831.
Notice of Allowance issued Oct. 31, 2007 in U.S. Appl. No. 10/708,831.
Notice of Abandonment issued Mar. 6, 2008 in U.S. Appl. No. 10/708,831.
Non-Final Office Action issued Jun. 6, 2005 in U.S. Appl. No. 10/708,833.
Notice of Allowance issued Dec. 9, 2005 in U.S. Appl. No. 10/708,833.
Supplemental Notice of Allowance issued Feb. 23, 2006 in U.S. Appl. No. 10/708,833.
Non-Final Office Action issued Mar. 22, 2006 in U.S. Appl. No. 10/708,837.
Final Office Action issued Oct. 10, 2006 in U.S. Appl. No. 10/708,837.
Advisory Action issued Jan. 12, 2007 in U.S. Appl. No. 10/708,837.
Non-Final Office Action issued Apr. 23, 2007 in U.S. Appl. No. 10/708,837.
Notice of Allowance issued Oct. 12, 2007 in U.S. Appl. No. 10/708,837.
Supplemental Notice of Allowance issued Dec. 20, 2007 in U.S. Appl. No. 10/708,837.
Non-Final Office Action issued Dec. 11, 2007 in U.S. Appl. No. 11/851,533.
Final Office Action issued Jul. 25, 2008 in U.S. Appl. No. 11/851,533.
Advisory Action issued Aug. 29, 2008 in U.S. Appl. No. 11/851,533.
Non-Final Office Action issued Jan. 4, 2008 in U.S. Appl. No. 11/851,556.
Final Office Action issued Jul. 31, 2008 in U.S. Appl. No. 11/851,556.
Non-Final Office Action issued Jan. 10, 2008 in U.S. Appl. No. 10/708,840.
Final Office Action issued Jul. 17, 2008 in U.S. Appl. No. 10/708,840.
Advisory Action issued Sep. 5, 2008 in U.S. Appl. No. 10/708,840.
Non-Final Office Action issued Feb. 8, 2008 in U.S. Appl. No. 11/851,580.
Non-Final Office Action issued Feb. 11, 2008 in U.S. Appl. No. 11/851,623.
Restriction Requirement issued Aug. 20, 2008 in U.S. Appl. No. 11/851,623.
Non-Final Office Action issued Feb. 15, 2008 in U.S. Appl. No. 11/858,393.
Non-Final Office Action issued Jan. 30, 2006 in U.S. Appl. No. 10/708,841.
Final Office Action issued May 25, 2006 in U.S. Appl. No. 10/708,841.
Notice of Allowance issued Oct. 6, 2006 in U.S. Appl. No. 10/708,841.
Non-Final Office Action issued Mar. 11, 2008 in U.S. Appl. No. 11/164,352.
Final Office Action issued Aug. 18, 2008 in U.S. Appl. No. 11/164,352.
ISR/WO dated Jul. 11, 2008 for PCT/US06/07570.
Non-Final Office Action issued Aug. 11, 2004 in U.S. Appl. No. 10/611,563.
Final Office Action issued Mar. 24, 2005 in U.S. Appl. No. 10/611,563.
Advisory Action issued May 18, 2005 in U.S. Appl. No. 10/611,563.
Non-Final Office Action issued Jul. 27, 2005 in U.S. Appl. No. 10/611,563.
Non-Final Office Action issued Nov. 16, 2005 in U.S. Appl. No. 10/611,563.
Final Office Action issued May 31, 2006 in U.S. Appl. No. 10/611,563.
Advisory Action issued Oct. 6, 2006 in U.S. Appl. No. 10/611,563.
Non-Final Office Action issued Jan. 8, 2007 in U.S. Appl. No. 10/611,563.
Non-Final Office Action issued Jun. 18, 2007 in U.S. Appl. No. 10/611,563.
Notice of Allowance issued Sep. 24, 2007 in U.S. Appl. No. 10/611,563.
Non-Final Office Action issued Oct. 15, 2007 in U.S. Appl. No. 11/161,105.
Final Office Action issued Apr. 21, 2008 in U.S. Appl. No. 11/161,105.
Notice of Allowance issued Jul. 3, 2008 in U.S. Appl. No. 11/161,105.
Final Office Action issued May 9, 2006 in U.S. Appl. No. 10/708,827.
Notice of Abandonment issued Jan. 5, 2007 in U.S. Appl. No. 10/708,827.
Non-Final Office Action issued Jan. 27, 2006 in U.S. Appl. No. 10/708,828.
Final Office Action issued Jul. 21, 2006 in U.S. Appl. No. 10/708,828.
Notice of Abandonment issued Mar. 22, 2007 in U.S. Appl. No. 10/708,828.
Non-Final Office Action issued Dec. 15, 2005 in U.S. Appl. No. 10/708,829.
Final Office Action issued May 25, 2006 in U.S. Appl. No. 10/708,829.

(56) References Cited

OTHER PUBLICATIONS

Notice of Abandonment issued Jan. 5, 2007 in U.S. Appl. No. 10/708,829.
Non-Final Office Action issued Nov. 27, 2006 in U.S. Appl. No. 10/708,832.
Notice of Abandonment issued Aug. 16, 2007 in U.S. Appl. No. 10/708,832.
Non-Final Office Action issued Jan. 20, 2006 in U.S. Appl. No. 10/708,834.
Final Office Action issued May 25, 2006 in U.S. Appl. No. 10/708,834.
Notice of Abandonment issued Jan. 5, 2007 in U.S. Appl. No. 10/708,834.
Non-Final Office Action issued Dec. 16, 2005 in U.S. Appl. No. 10/708,835.
Final Office Action issued May 17, 2006 in U.S. Appl. No. 10/708,835.
Notice of Abandonment issued Jan. 5, 2007 in U.S. Appl. No. 10/708,835.
Non-Final Office Action issued Dec. 16, 2005 in U.S. Appl. No. 10/708,836.
Final Office Action issued May 25, 2006 in U.S. Appl. No. 10/708,836.
Notice of Abandonment issued Jan. 5, 2007 in U.S. Appl. No. 10/708,836.
Non-Final Office Action issued Aug. 8, 2005 in U.S. Appl. No. 10/708,838.
Final Office Action issued Nov. 29, 2005 in U.S. Appl. No. 10/708,838.
Advisory Action issued Feb. 9, 2006 in U.S. Appl. No. 10/708,838.
Non-Final Office Action issued Apr. 18, 2006 in U.S. Appl. No. 10/708,838.
Notice of Abandonment issued Nov. 1, 2006 in U.S. Appl. No. 10/708,838.
ISR/WO issued Jan. 29, 2008 in PCT/US06/22542.
Non-Final Office Action issued Nov. 1, 2007 in U.S. Appl. No. 10/711,613.
Restriction Requirement issued Aug. 7, 2008 in U.S. Appl. No. 10/711,613.
Non-Final Office Action issued Dec. 9, 2003 in U.S. Appl. No. 10/242,584.
Notice of Allowance issued Jul. 9, 2004 in U.S. Appl. No. 10/242,584.
Office Action dated May 23, 2008 for JP2004-543166.
ISR dated Mar. 7, 2003 for PCT/US02/32653.
WO dated Aug. 27, 2004 for PCT/US02/32653.
IPER dated Jan. 10, 2005 for PCT/US02/32653.
Ex-Parte Quayle Action issued Jun. 6, 2005 in U.S. Appl. No. 10/710,484.
Notice of Allowance issued Aug. 2, 2005 in U.S. Appl. No. 10/710,484.
Non-Final Office Action issued May 17, 2005 in U.S. Appl. No. 10/711,773.
Final Office Action issued Nov. 1, 2005 in U.S. Appl. No. 10/711,773.
Advisory Action issued Feb. 15, 2006 in U.S. Appl. No. 10/711,773.
Notice of Allowance issued May 17, 2006 in U.S. Appl. No. 10/711,773.
ISR/WO dated Jun. 20, 2005 for PCT/US05/07195.
IPRP (Ch 1) dated Apr. 19, 2007 for PCT/US05/07195.
Non-Final Office Action issued Feb. 28, 2006 in U.S. Appl. No. 10/709,815.
Notice of Allowance issued Sep. 26, 2006 in U.S. Appl. No. 10/709,815.
Non-Final Office Action issued Jul. 10, 2008 in U.S. Appl. No. 11/163,595.
Non-Final Office Action issued Jul. 12, 2005 in U.S. Appl. No. 10/708,822.
Final Office Action issued Nov. 2, 2005 in U.S. Appl. No. 10/708,822.
Advisory Action issued Dec. 20, 2005 in U.S. Appl. No. 10/708,822.
Non-Final Office Action issued Apr. 7, 2006 in U.S. Appl. No. 10/708,822.
Final Office Action issued Oct. 19, 2006 in U.S. Appl. No. 10/708,822.
Advisory Action issued Jan. 10, 2007 in U.S. Appl. No. 10/708,822.
Search Report dated May 23, 2008 for GB 0700319.7.
Non-Final Office Action issued Feb. 26, 2008 in U.S. Appl. No. 11/859,171.
Notice of Allowance issued Jun. 19, 2008 in U.S. Appl. No. 11/859,171.
Examination Report dated Jun. 16, 2008 for SG200608843-9.
Non-Final Office Action issued Jul. 29, 2005 in U.S. Appl. No. 10/710,308.
Final Office Action issued Nov. 29, 2005 in U.S. Appl. No. 10/710,308.
Advisory Action issued Feb. 10, 2006 in U.S. Appl. No. 101710,308.
Non-Final Office Action issued May 2, 2006 in U.S. Appl. No. 10/710,308.
Final Office Action issued Oct. 10, 2006 in U.S. Appl. No. 10/710,308.
Advisory Action issued Jan. 8, 2007 in U.S. Appl. No. 10/710,308.
Non-Final Office Action issued May 1, 2007 in U.S. Appl. No. 10/710,308.
Notice of Allowance issued Sep. 26, 2007 in U.S. Appl. No. 10/710,308.
Supplemental Notice of Allowance issued Dec. 11, 2007 in U.S. Appl. No. 10/710,308.
Non-Final Office Action issued Mar. 18, 2008 in U.S. Appl. No. 11/860,704.
Notice of Allowance issued Jul. 3, 2008 in U.S. Appl. No. 11/860,704.
Non-Final Office Action issued Apr. 3, 2008 in U.S. Appl. No. 11/860,726.
Notice of Allowance issued Jul. 14, 2008 in U.S. Appl. No. 11/860,726.
Non-Final Office Action issued Jul. 19, 2005 in U.S. Appl. No. 10/710,309.
Final Office Action issued Nov. 21, 2005 in U.S. Appl. No. 10/710,309.
Advisory Action issued Feb. 10, 2006 in U.S. Appl. No. 10/710,309.
Non-Final Office Action issued May 2, 2006 in U.S. Appl. No. 10/710,309.
Notice of Abandonment issued Dec. 19, 2006 in U.S. Appl. No. 10/710,309.
Non-Final Office Action issued May 6, 2005 in U.S. Appl. No. 10/710,310.
Final Office Action issued Oct. 19, 2005 in U.S. Appl. No. 10/710,310.
Advisory Action issued Dec. 29, 2005 in U.S. Appl. No. 10/710,310.
Non-Final Office Action issued Apr. 5, 2006 in U.S. Appl. No. 10/710,310.
Notice of Abandonment issued Oct. 20, 2006 in U.S. Appl. No. 10/710,310.
Non-Final Office Action issued Sep. 19, 2006 in U.S. Appl. No. 10/710,311.
Notice of Abandonment issued Jun. 28, 2007 in U.S. Appl. No. 10710,311.
Non-Final Office Action issued Feb. 9, 2006 in U.S. Appl. No. 10/710,315.
Final Office Action issued Jul. 13, 2006 in U.S. Appl. No. 10/710,315.
Notice of Abandonment issued Apr. 20, 2007 in U.S. Appl. No. 10/710,315.
Non-Final Office Action issued Feb. 9, 2006 in U.S. Appl. No. 10/710,317.
Final Office Action issued Jul. 18, 2006 in U.S. Appl. No. 10/710,317.
Notice of Abandonment issued Mar. 22, 2007 in U.S. Appl. No. 10/710,317.
Non-Final Office Action issued Sep. 19, 2006 in U.S. Appl. No. 10/710,319.
Notice of Abandonment issued Aug. 9, 2007 in U.S. Appl. No. 10/710,319.

(56) References Cited

OTHER PUBLICATIONS

Non-Final Office Action issued Mar. 9, 2006 in U.S. Appl. No. 10/710,323.
Notice of Abandonment issued Dec. 12, 2006 in U.S. Appl. No. 10/710,323.
Non-Final Office Action issued Oct. 10, 2006 in U.S. Appl. No. 10/710,324.
Notice of Abandonment issued Oct. 11, 2007 in U.S. Appl. No. 10/710,324.
Non-Final Office Action issued Oct. 10, 2006 in U.S. Appl. No. 10/710,325.
Notice of Abandonment issued Jun. 4, 2007 in U.S. Appl. No. 10/710,325.
Non-Final Office Action issued Mar. 22, 2006 in U.S. Appl. No. 10/710,326.
Final Office Action issued Oct. 10, 2006 in U.S. Appl. No. 10/710,326.
Advisory Action issued Jan. 12, 2007 in U.S. Appl. No. 10/710,326.
Non-Final Office Action issued May 1, 2007 in U.S. Appl. No. 10/710,326.
Notice of Allowance issued Oct. 4, 2007 in U.S. Appl. No. 10/710,326.
Supplemental Notice of Allowance issued Nov. 8, 2007 in U.S. Appl. No. 10/710,326.
Non-Final Office Action issued May 1, 2008 in U.S. Appl. No. 11/861,347.
Notice of Allowance dated Jan. 30, 2014 in U.S. Appl. No. 12/367,414.
Advisory Action dated Oct. 1, 2010 in U.S. Appl. No. 12/367,414.
Final Office Action dated Jul. 21, 2010 in U.S. Appl. No. 12/367,414.
Office Action dated Nov. 12, 2009 in U.S. Appl. No. 12/367,414.
PR Newswire (press release), "Providian Launches Nation's First Clear Chip Card," Sep. 12, 2000. The press release may be related to the art of the invention, but based upon the information in the press release, it is unclear if the press release is prior art. However, in an abundance of caution the Applicant desires to put the press release into the file wrapper.
"Physical Reality: A Second Look", Ken Sharp, Senior Technical Editor, http://www.idsystems.com/reader/1999_031 phys0399_pt2/phys0399_pt2.htm (6 pages).
"Mobile Speedpass Goes Global as Mobil Singapore Rolls Out Asia's First RFID-Based Pay-At-The-Pump System", Press Release, Apr. 5, 1999, http://www.ti.com/tiris/docs/news_releases/rel12,htm (3 pages).
"CES: Microsoft's SPOT Technology has Humble Origins", by James Niccolai, Jan. 10, 2003, http://archive.inforworld.com/articles/hn/xml/03/01/10/03011Ohnspot.xml?s=IDGNS (3 pages).
"Networking: Microsoft SPOT", by Jeremy A. Kaplan, Jul. 1, 2003, http://www.pcmag.com/print_article/0,3048,a=43561,00.asp (2 pages).
"MasterCard to Test RFID Card: Pilot will test whether consumers, merchants and credit card issuers value "contactless" payments", RFID Journal, Dec. 20, 2002.
http://www.palowireless.com/infotooth/tutorial/Imp.asp, Apr. 28, 2003.
Costco, The Choice is Yours, 1998, http://www.costco.com/frameset.asp?trg=subcar/o 2Easp&catid=502&subsid=503&log= .
Financial Technology International Bulletin, V14, n1, p4, Sep. 1996.

* cited by examiner

SYSTEMS AND METHODS FOR NON-TRADITIONAL PAYMENT USING BIOMETRIC DATA

CROSS-REFERENCE TO RELATED APPLICATIONS

This invention is a continuation-in-part of, and claims priority to, U.S. patent application Ser. No. 11/164,352, titled "SYSTEMS AND METHODS FOR NON-TRADITIONAL PAYMENT," filed Nov. 18, 2005, which itself is a continuation-in-part of, and claims priority to, U.S. patent application Ser. No. 10/711,720, titled "SYSTEMS AND METHODS FOR MANAGING MULTIPLE ACCOUNTS ON A RF TRANSACTION DEVICE USING SECONDARY IDENTIFICATION INDICIA," filed Sep. 30, 2004. The '720 application itself claims priority to U.S. Provisional Application No. 60/507,803, filed Sep. 30, 2003. The '720 application is also a continuation-in-part of, and claims priority to, U.S. patent application Ser. No. 10/340,352, entitled "SYSTEM AND METHOD FOR INCENTING PAYMENT USING RADIO FREQUENCY IDENTIFICATION IN CONTACT AND CONTACTLESS TRANSACTIONS," filed Jan. 10, 2003 (which itself claims priority to U.S. Provisional Patent Application No. 60/396,577, filed Jul. 16, 2002), and is also a continuation-in-part and claims priority to U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS," filed on Jul. 9, 2002 (which itself claims priority to U.S. Provisional Patent Application No. 60/304,216, filed Jul. 10, 2001. All of the above-listed applications are incorporated herein by reference.

FIELD OF INVENTION

The present invention generally relates to payment systems, and more particularly, to systems and methods for facilitating payments using non-traditional payment devices and biometric data for authentication, then activation of the payment device.

BACKGROUND OF THE INVENTION

In general, financial transaction devices that are capable of managing multiple accounts, are typically designed to access only those accounts managed by the same issuer. For example, the same issuer provides both the credit card and the wholesale purchase club account to the user. As such, the issuer providing both accounts generally establishes its own application tenant storage format and management protocol related to the accounts. The established format and protocol is ordinarily different from any format or protocol used by other unrelated issuers, which provides the issuer increased control over access to the account data. Because of the differing unique protocols/formats amongst issuers, multiple issuers typically provide a transaction device corresponding to an account offered by the issuer, where the data for accessing the account is stored in that issuer's protocol/format. Thus, a user wishing to access multiple accounts managed by different issuers, must ordinarily carry at least one transaction device per issuer. Carrying multiple transaction devices can be inconvenient in that the instruments may be more easily misplaced, lost or stolen, preventing the user from accessing the account.

Another disadvantage of conventional methods of managing multiple accounts, which is related to the different issuer formats/protocols, is that, since conventional financial transaction devices typically only store application tenant information related to one issuer, the information may not be recognized by a second issuer distinct from the first. That is, the user of the financial transaction device typically is only able to use the financial transaction device at locations identified by the issuer of the transaction card. The financial transaction device may not be used at any other locations, since the locations not identified by the user will not recognize the application tenant information which is typically stored on the instrument in an issuer determined format. As such, in order to access multiple accounts managed by different issuers using different formats/protocols, the user must typically carry multiple cards, as noted above.

Further still, with the expansion and permeation of technology, more and more users typically carry multiple transaction devices and technological devices. For example, a user may carry 4-5 transaction devices, a cell phone, a PDA, a handheld device, and a laptop. When a user, for example, goes to the coffee shop, it is desirable for the user to use one device for both his purchase and his technological needs. Thus, a need exists for a technological device that can perform both transactions.

SUMMARY OF THE INVENTION

The invention includes systems and methods for facilitating transactions using non-traditional devices. An exemplary method includes the steps of forming a transaction request at a non-traditional device, and communicating the transaction request to a reader. In one embodiment, the non-traditional device may be configured with a transponder or other RF operable device, which remains inactive until an authorized user of the device submits a spoken pass phrase. The pass phrase is received by a voice verification system which processes the pass phrase into a digital voice print. The digital voice print is compared to a stored voice print template of the user in order to validate the user. Upon validation, the RF operable device receives a signal to activate an RF transponder.

In another embodiment, the non-traditional device may be configured with an RF protocol, such as a protocol in ISO 14443 format or according to Near Field Communication (NFC) formats. In another embodiment, the non-traditional device may be configured to directly communicate with an acquirer/issuer or payment processor to complete payment. For example, the non-traditional device may be a cellular telephone that communicates directly to an acquirer/issuer or payment processor. A typical cellular telephone is already equipped with a microphone, a processor to process authentication using a voice print, and a communication line connecting the cellular telephone directly to an acquirer/issuer. In another embodiment, the non-traditional device may be configured to facilitate transactions using a random number, an authentication tag, a counter, or an encrypted payload. In yet another embodiment, the non-traditional device may not be an RF operable device and may facilitate a payment transaction through voice verification and direct communication between a merchant point of sale device and a voice verification system.

BRIEF DESCRIPTION OF THE DRAWINGS

A more complete understanding of the present invention may be derived by referring to the detailed description and claims when considered in connection with the Figures, wherein like reference numbers refer to similar elements throughout the Figures, and:

DETAILED DESCRIPTION OF EXEMPLARY EMBODIMENTS

Figure 1:
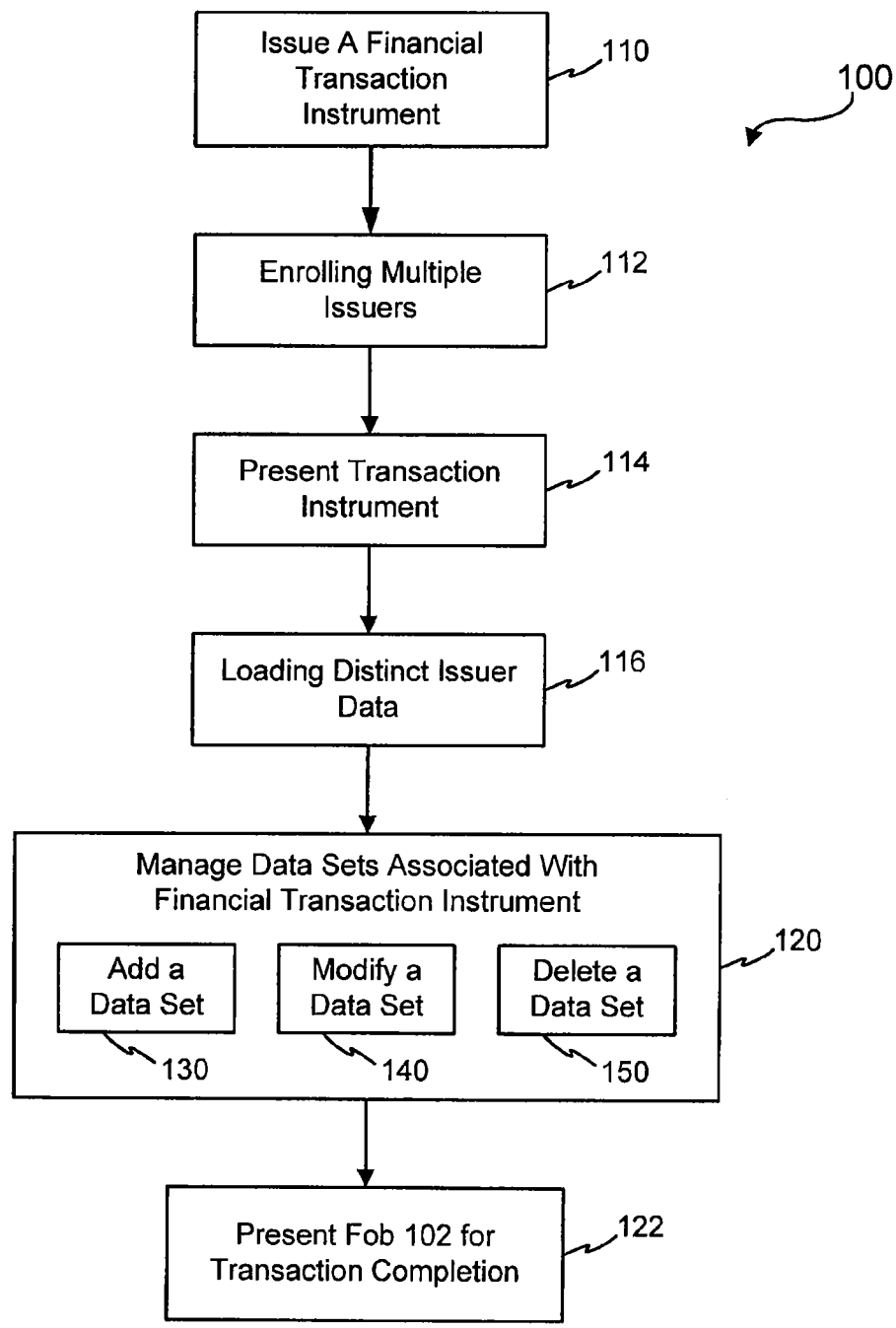
FIG. 1 illustrates a general overview of an exemplary data set management method in accordance with an exemplary embodiment of the present invention.

While the exemplary embodiments herein are described in sufficient detail to enable those skilled in the art to practice the invention, it should be understood that other embodiments may be realized and that logical and mechanical changes may be made without departing from the spirit and scope of the invention. Thus, the following detailed description is presented for purposes of illustration only and not of limitation.

The present invention improves upon prior art contactless cards and includes novel systems and methods for securing the use of contactless cards in the payment process from end-to-end, (meaning from the time it is used to the time it is accepted by the acquirer), or any portion thereof. Embodiments of the invention generally include security solutions for contactless transaction systems, the use of PINs, substantially securely accessing multiple card products in one device, and/or emulating a magnetic stripe card and cellular phones without substantially compromising security. The invention also includes new security methods which minimize the risks associated with this air interface. In one embodiment, consumer payment information is transmitted using RF technology, so the information can often be accessed without having physical procession of the payment device (e.g., card or fob).

More particularly, exemplary embodiments reduce or eliminate account fraud for RF devices by substantially securing the data contained on the device. The invention incorporates transaction card account payment security from a RF device with a POS device instead of (or in addition to) using an identifier that identifies where to find the correct transaction card account number from the merchant system, outside the POS and using a separate network (not one of the standard financial networks). While the invention and RF devices may include new POS terminals to read the RF signal and transmit it to facilitate authorization and submission, the increased consumer convenience and security should translate into greater use of the fob. Moreover, the POS terminals for the RF devices often include a failure rate less than magnetic-stripe devices, as there is little or no mechanical interaction between the card and the reader (no swiping), thereby resulting in less ongoing cost and maintenance of the POS devices. As used herein, the terms secure, valid, authorized, authenticated, etc. (including similar terms and various forms of the terms) may include full, partial or substantial security, validation, authorization, authentication, etc.

An exemplary aspect of the present invention includes the RF device storing substantially "in-the-clear" account data (such as the account number and its expiration date), an encryption key and a counter. The RF devices are typically manufactured with the account number, encryption key and the beginning counter set in them. The RF device at a minimum contains a simple processor chip capable of incrementing a counter and producing an authentication tag. RF devices with greater capabilities (like contactless smart cards) can be used, but are simply an extension of the present invention discussed herein.

In an exemplary embodiment, and which is substantially secure for this particular scheme, both the RF device and reader include an authentication tag with the transaction request. When the RF device comes into range of a merchant's RF reader, the reader sends a random number or 'nonce' to the RF device. The RF device uses the random number (from the RF reader), its counter, and its account number to produce an authentication tag (Message Authentication Code) using its encryption key. The account data, counter, random number and authentication tag is then returned to the RF reader by the RF device as a transaction request. Once the request has been sent to the RF reader, the RF device increments its counter by the designated value. For a basic introduction to cryptography, please review a text written by Bruce Schneider which is entitled "Applied Cryptography: Protocols, Algorithms, and Source Code In C," published by John Wiley & Sons (second edition, 1996), which is hereby incorporated by reference.

The invention contemplates various ways to update the counter. The simplest approach is to increment the counter by some value. That value can be obvious (e.g., 1) or something more obscure such as 47 (a number or algorithm which may be different for each account or account range). The key is that the counter is something that can be anticipated by the acquirer as it authenticates the transaction request. Another method to obscure the value is to not have the starting value equal to 0 or 1. Rather, it may be seeded with a specific value (which also may vary by account or account range) and incremented. Finally, the counter may be a random number produced by some algorithm that is based on an initial seed that is produced by the RF device and is also known by the issuer. This is similar to a hidden secret known only to the device and the issuer.

The RF reader then utilizes the transaction request and creates a second authentication tag using the RF reader's encryption key. The RF reader converts the transaction request into a form recognized and used by its corresponding POS device (typically this will be using the format described by ISO 8583), including the two authentication tags, the RF device counter, and the RF reader random number. The extra data may be stored anywhere on the submission record. The POS device uses its existing payment infrastructure and network to send a message/request to the acquirer for the account for authorization of the transaction processing.

The acquirer routes the authorization request to the account issuer. The account issuer's authorization process substantially recognizes the type of request and substantially verifies the authentication tags from both the RF device and the RF reader. This approach provides better security of the request by verifying not only the RF device, but also verifying that the authorization request originated from a legitimate RF reader. Because the backend server verifies the authentication tags using the same encryption key, the correct encryption key for the RFID and the RF reader should be known by that same server. Whereas the encryption key may change for the different accounts that are used at any RF reader, the encryption key for the reader should be the same. The encryption key may be the same for all the RFIDs containing accounts in a particular number range, or it may be unique for each account. The incoming account number is used to identify the encryption key that is then used to calculate or recalculate, construct or reconstruct the authentication tag using the account number, random number and/or counter from the RF device. If the same authentication tag value is produced, the RF device tag is authentic and considered valid.

The authentication tag for the RF reader is processed in a similar manner. The encryption key associated with the RF reader based on the POS identifier from the incoming request is identified and used to rehash the incoming account number, random number, counter, and/or RF device authentication tag. If the same or substantially the same authentication tag value is produced, the RF reader tag is authentic and considered valid.

Once the authentication tags have been verified, the issuer validates the counter from the account. Depending on the method used to increment the counter, the acquirer may identify the expected counter value that it will match to the incoming counter value. Any unexpected or reused value may indicate a likely misuse of the RFID or a fraudulent replay of a previous RFID transaction request transmission. To account for undelivered or missing requests, the acquirer may allow for acceptable gaps in the counter value, but reused values may always be rejected.

If either authentication tag or the counter is found to be fully or partially invalid, the authorization request may be rejected. If they are found to be valid, the actual account number is submitted for payment authorization, using the normal process. The authorization response is then returned to the merchant. If the payment is authorized the merchant submits the request through its existing submissions infrastructure and network for settlement.

Another exemplary embodiment that may differ from the first RF device includes an authentication tag for the transaction request and the RF reader is not authenticated. A similar RF device process is used, but when the transaction request is sent to the RF reader, the reader simply converts the request into a form recognized and usable by the POS device. The issuer then verifies the authentication tag of the RF device.

In yet another exemplary embodiment the RF reader includes an authentication tag for the transaction request. In this embodiment, when the RFID is read by the RF reader, the account data and counter is provided to the RF reader. The RF reader uses its encryption key to create an authentication tag for the transaction request. The acquirer then verifies the authentication tag using the encryption key associated with the POS device. In this approach, the security of the account relies on the integrity of the POS device, while simplifying the process (the RFID does not increment a counter) and content (no encryption key) of the account. However, the RFID transmission is vulnerable to eavesdropping. This particular scheme does not necessarily encrypt the account data, but leaves it in the clear. The security is from the authentication tag(s), the nonce and counter that is used and verified by the issuer. Moreover, it helps to insure that the transaction request came from a credible source (e.g., the account and/or the POS device). However, unless the issuer enforces that the account number on the RF device can only originate from a RF associated POS device, this in and of itself may not be adequate to secure the account completely, since the payment information is communicated in the clear, the account number may be captured and faked in any normal online payment. However, by restricting these accounts to be used only through the RF payment channel, the appropriate controls may be enforced.

In another exemplary embodiment, more than one account or one number is stored on the RF device. Two kinds of account numbers, a routing number and transaction account number housed on the RF device may exist. The routing number may be an account number that cannot be used for payment, and that designates to which issuing bank the transaction request should be directed for authorization and submission (using the Industry routing currently used within the existing payment network). The encrypted account data from the RF device is included in the request and describes the actual account data (number and expiration date) to be used for the transaction processing.

In an alternate embodiment, the RF reader activates a RF device and sends a random number to the RF device. The RF device uses its encryption key to create an authentication tag using the routing number, the random number from the RF reader, the counter from the RF device, and/or the encrypted account data. The RF device then returns the routing number as the account number known by the RF reader and merchant, the counter, the encrypted account from the RF device, the random number provided by the RF reader and/or the authentication tag to the RF reader as a transaction request.

The RF reader converts this request into a form recognizable by a POS device and forwards the transaction request to its POS device. In an exemplary embodiment, the request may be in the ISO 8583 format. The POS device then forwards the request to the associated acquirer using the existing infrastructure and network based on the routing number provided. The POS device uses the standard 8583 protocol in a new, unique way, by placing at least a subset of the encrypted payload from the RFID, in this case containing the account number, into the Cryptogram field in the authorization request. The acquirer may forward the authorization to the issuing bank (if different). The issuing bank recognizes the type of request, and verifies the authentication tag and the counter for the request (as described previously). Since the routing number is defined as the account number on the ISO 8583 request it can be used by the issuing bank to locate the encryption key used to create the authentication tag for the RF device. If either the authentication tag or counter verification fails, the request is rejected and returned to the merchant. If both prove to be valid, the payload is decrypted using the encryption key used for the payload, again using a key that is retrieved based on the routing number. The encryption payload key and encryption key to create the authentication tag may be different keys. The decrypted transaction account number is processed using the authorization system. The authorization may be returned using business as usual procedures over the 8583 protocol. If the authorization is approved, the merchant submits the transaction request, the 8583 protocol is again used. The routing number may be used to route the submission to the acquiring bank for merchant payment. At least a subset of the encrypted payload from the RFID, may be included in the Cryptogram field in the submission request. When the issuing bank receives the transaction request, the account number in the Cryptogram field is decrypted using the secret encryption key associated with the routing number. The account member can then be billed based on the decrypted account number ID.

In another exemplary embodiment, the invention uses more than one transaction account number on the RF device. As noted, there are two kinds of account numbers, a routing number and multiple transaction account numbers housed on the RF device. In this embodiment, the routing number may be an account number that cannot be used for payment, but that designates to which issuer the transaction request should be directed for authorization and submission (using the industry routing currently used within the existing payment network). The encrypted account data from the RF device may be included in the request and describes the actual account data (e.g., number and expiration date) to be used for the payment.

In one exemplary variation of this aspect, the system uses a paired list of routing and encrypted account data. The routing and encrypted account number to be used for the transaction request may be determined from the current value of the counter, so that the routing number and the encrypted account number are both unique for the transaction. When the RF device is activated when passed within range of a RF reader, the RF device increments the counter and uses the counter as an index to select the routing number and encrypted account number to include in the transaction request. These account numbers and the counter are then used with the random number from the RF reader, the counter and the encryption key to produce the authentication tag for the transaction request. There can be a single encryption key that is used for each of the encrypted account numbers on the RF device or each encrypted account may have its own encryption key that is used.

A PIN can also be used with the RF device for identification and authentication. If there are multiple accounts contained on the RF device, instead of relying on the counter and an algorithm to determine which should be used, a PIN provided by the accountholder may be used. When the RF device is presented to the RF reader, the accountholder may be prompted to enter a PIN. The PIN may simply authenticate the user to use the account. But when there are multiple accounts, the entered PIN may be used to identify which account should be used within the transaction request. This would allow the RF device to contain different account numbers for different types of account products, such as, for example, credit and charge cards. As an example, data related to two accounts may exist on the RF device representing a charge and credit card, each associated with a unique PIN. When the RF device is presented, the accountholder may decide which card and/or account should be used for the payment through the PIN entered. The entered PIN would be returned to the RF device and used to identify which card and/or account will be used. If the PIN for the charge card is used, that card account is used in the transaction request that is provided back to the RF reader. A counter valve may still be important for the purpose of building the authentication tag for the transaction request. Although this approach includes a RF device with greater processing capabilities, it extends the security of the account numbers imbedded on the card by requiring an explicit authentication of the account by the accountholder before the payment can be requested.

In another exemplary embodiment, a PIN can be used in conjunction with voice verification to enhance the security of the system. In this embodiment, a transaction device is equipped with an RFID device configured to transmit payment account information from the transaction device to an RF reader at a POS device. The RFID device is not enabled until just prior to a purchase transaction, and is again disabled on completion of the purchase transaction. To enable the RFID device, a user interacts with a transaction device, such as a cellular telephone, to call a verification system. When the call is received at the verification system, the user is prompted to recite a pass phrase. The recited pass phrase is compared with a previously created voiceprint template file to verify the user's voice. Once verified, the verification system transmits a key to enable the RFID device which may then transmit account information to the RF reader to complete a purchase transaction.

Another embodiment may include a single routing number associated with a RFID, but multiple encrypted account numbers. As the counter is incremented, the counter is used as an index to pull the next encrypted account number from protected memory on the RFID to be transmitted to the reader, using the already described random number, counter and/or authentication tag.

Since the RF device typically corresponds to only one actual account from the issuer the list of encrypted accounts on the RFID may correspond to a series of façade account numbers that are linked to the single account number on a centralized server. Because the façade numbers have limited use, it also possible to transmit them to the reader 'in the clear', without significantly impacting fraud rates. The façade or blinded account numbers may be supported through a single-use account number or proxy account number (e.g., Private Payments) system, which identifies the underlying account number to be used for the transaction request. As the routing and encrypted account data is selected (by either the RF device or reader), it may be placed into the transaction request and forwarded to the POS device and the acquirer for authorization. Once the request has been authenticated (as described previously using the authentication tag and the RF device counter), the account where the charge will be applied may be authorized. The routing number is used to identify the encryption key to be used to decrypt the account data within the transaction request from the transaction request. The authorization system may recognize that the account is not a usable account number, but a façade/blinded account. The authorization system may request a Private Payments system to identify the actual account number. The actual account number may be returned from Private Payments for authorization and the response may be returned to the requestor. For more information on Private Payment systems, see U.S. patent application Ser. No. 09/800,461, filed Mar. 7, 2001, and titled "SYSTEM FOR FACILITATING A TRANSACTION," and U.S. patent application Ser. No. 10/905,078, filed Dec. 14, 2004, and titled "METHOD AND SYSTEM FOR FACILITATING A TRANSACTION USING A TRANSPONDER," both of which are hereby incorporated by reference.

This embodiment may minimize risk by limiting the exposure of any account during any one transaction since the actual account may change from request to request. Although this appears to limit the life span of the RF device to the number of items included in the list, the counter may be reset once the limit of the list has been exceeded. Even though there are 10 items in the list, following the 10 requests, the counter may be offset (not reset because that would reduce the ability to properly verify misuse) so that the list of accounts may be used and reused. As discussed previously, the accounts may also be selected from the list randomly using an algorithm known only to the card and the acquirer. In this case, the account used cannot be anticipated without knowing the algorithm. Thus, the list may never really expire, instead its use may not follow a basic pattern. Finally, there may not be a one to one correlation between the counter and the encrypted account number returned, for example, an encrypted account number may be changed every 10 increments of the counter, increasing fraud potential insignificantly.

There may be two variables that may be changed to create other embodiments of the invention, namely, what is used to select the account data and where the account data is selected. Instead of using the counter from the RF device to identify what account data to use, the list may use a date range to define the effective period when each individual routing and encrypted account data would be used. Being date sensitive may limit the long-term use of this account to what is contained on the card. Once the last item in the list has been used, then the account may no longer be used. Instead of the RF device selecting the account data, the entire list may be sent to the RF reader and the reader may make the selection using either the counter or the date range.

Another exemplary embodiment of the invention may include a combination of the previous two, one routing account number and a list of encrypted account data. Which instance of the encrypted account data is used may be determined as described previously using the counter, random identifier, or an associated date range by either the RF device or RF reader. Whereas the routing number in the earlier descriptions represents how the data will be authenticated by the acquirer, this approach may include a unique routing number for each RF device. So as requests are made for a specific RF device for a specific counter, the corresponding account data from the list may be used for the transaction request.

Because the merchant knows the routing number, but not the payment account number when the actual account number is in the encrypted payload, disputes may be an issue. One way to solve this problem is to allow credits, that is refunds from the merchant, to be processed using the routing number. In this embodiment, only transaction requests from the merchant, in which the merchant attempts to use the routing number for payment may be rejected.

In another embodiment, during the authorization step, the issuing bank may return the actual payment credit card number in the response. This would result in the merchant knowing the 'real' credit card number, without the credit card number having ever been transmitted in the clear from the RFID. The merchant may then submit the 'real' credit card number with the transaction request, simplifying disputes.

Another exemplary embodiment extends the invention to include other encrypted data in the datagram sent in the 8583 protocols. The first example of this use may be to provide the customer's name on the payment receipt. For privacy reasons, the customer name may not be transmitted in the clear to the reader. In a unique usage of the 8583 protocol, the name may be protected without requiring decryption on the reader. The customer name may include an encrypted payload from the RFID, along with the account number. The RF reader may have no knowledge of the contents of the encrypted payload on the RFID and simply move this information into the cryptogram field in the authorization request. The acquirer may forward the authorization to the issuing bank (if different). At the issuing bank, the routing number would be used to determine the encryption key and use it to decrypt the payload from the RFID. The account number may be used as described previously for authorization. The decrypted name may be returned to the reader in the authorization request (if approved). The POS device would then use the name returned from the issuer to print on the customer's receipt.

The present invention also provides a system and method for a RF operable transaction device configured to manage multiple data sets (e.g., "application tenants") of differing formats associated with a plurality of distinct transaction account issuers. In this context, an "application tenant" may include all or any portion of any data sets which are substantially correlated to an account issuer, which the issuer may additionally use to substantially identify an instrument user or related account. For example, where the account issuer provides application tenant information, the application tenant may include, inter alia, a membership identifier associated with a user enrolled in an issuer provided transaction account program, and all related subsets of data stored on the transaction device. Where multiple application tenants are referred to herein, each tenant may constitute its own distinct data set, independent of any other application tenant data sets. For example, each application tenant may include a unique membership identifier and all associated subsets of data. Alternatively, an application tenant may include a membership identifier and an application for processing all data owned by an issuer. Thus, the data set or subset may include the processing application. Moreover, differing formats, as discussed herein, include differences in all or any portion of the formats. As such, "application tenant" and "distinct data set," and data set "owner" and account "issuer" may be used interchangeably herein.

In addition, it should be noted that although the present invention is described with respect to a financial transaction device, the invention is not so limited. The invention is suitable for any instrument capable of storing distinct data sets which may be provided by multiple distinct account issuers where the distinct data sets may be formatted one different from another. The account may be, for example, a calling card, a loyalty, debit, credit, incentive, direct debit, savings, financial, membership account or the like. While the information provided by the account issuers may be described as being "owned" by the issuers, the issuers or their designees may simply be a manager of the account.

The present invention may be described herein in terms of functional block components, optional selections and/or various processing steps. It should be appreciated that such functional blocks may be realized by any number of hardware and/or software components configured to perform the specified functions. For example, the present invention may employ various integrated circuit components (e.g., memory elements, processing elements, logic elements, look-up tables, and/or the like), which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and/or the like. For a basic introduction of cryptography and network security, the following may be helpful references: (1) "Applied Cryptography: Protocols, Algorithms, And Source Code In C," by Bruce Schneier, published by John Wiley & Sons (second edition 1996); (2) "Java Cryptography" by Jonathan Knudson, published by O'Reilly & Associates (1998); and (3) "Cryptography and Network Security: Principles and Practice" by Mayiam Stalling, published by Prentice Hall; all of which are hereby incorporated by reference.

As used herein, the terms "user," "end user," "consumer," "customer" or "participant" may be used interchangeably with each other, and each shall mean any person, entity, machine, hardware, software and/or business. Furthermore, the terms "business" or "merchant" may be used interchangeably with each other and shall mean any person, entity, machine, hardware, software or business. Further still, the merchant may be any person, entity, software and/or hardware that is a provider, broker and/or any other entity in the distribution chain of goods or services. For example, the merchant may be a ticket/event agency (e.g., Ticketmaster, Telecharge, Clear Channel, brokers, agents).

The systems and/or components of the systems discussed herein may also include one or more host servers or other computing systems including a processor configured to process digital data, a memory coupled to the processor for storing digital data, an input digitizer coupled to the processor for inputting digital data, an application program stored in the memory and accessible by the processor for directing processing of digital data by the processor, a display coupled to the processor and memory for displaying information derived from digital data processed by the processor and a plurality of databases, the databases including client data, merchant data, financial institution data and/or like data that may be used in association with the present invention. As those skilled in the art may appreciate, the user interface for each system described herein may typically include an operating system (e.g., Windows NT, 95/98/2000, Linux, Solaris, etc.) as well as various conventional support software and drivers typically associated with computers. The user computer and other systems described herein can be in a home or business environment with access to a network. In an exemplary embodiment, access is through the Internet through a commercially-available web-browser software package.

Communication between various elements of the present invention is accomplished through any suitable communication means, such as, for example, a telephone network, intranet, Internet, point-of-sale device (point-of-sale device, personal digital assistant, cellular phone, kiosk, etc.), online communications, off-line communications, wireless communications, and/or the like. One skilled in the art may also appreciate that, for security reasons, any databases, systems, or components of the present invention may consist of any combination of databases or components at a single location or at multiple locations, wherein each database or system includes any of various suitable security features, such as firewalls, access codes, encryption, decryption, compression, decompression, and/or the like.

The systems may be suitably coupled to the network via data links. A variety of conventional communications media and protocols may be used for data links. For example, a connection to an Internet Service Provider (ISP) over the local loop as is typically used in connection with standard modem communication, cable modem, Dish networks, ISDN, Digital Subscriber Line (DSL), or various wireless communication methods. The merchant system might also reside within a local area network (LAN) that interfaces to the network via a leased line (T1, D3, etc.). Such communication methods are well known in the art and are covered in a variety of standard texts. See, e.g., Gilbert Held, "Understanding Data Communications" (1996), hereby incorporated by reference.

The computing units may be connected with each other via a data communication network. The network may be a public network and assumed to be insecure and open to eavesdroppers. In the illustrated implementation, the network may be embodied as the Internet. In this context, the computers may or may not be connected to the Internet at all times. For instance, the customer computer may employ a modem to occasionally connect to the Internet, whereas the bank computing center might maintain a permanent connection to the Internet. Specific information related to the protocols, standards, and application software utilized in connection with the Internet may not be discussed herein. For further information regarding such details, see, for example, Dilip Naik, "Internet Standards and Protocols" (1998); "Java 2 Complete," various authors (Sybex 1999); Deborah Ray and Eric Ray, "Mastering HTML 4.0" (1997); Loshin, "TCP/IP Clearly Explained" (1997). All of these texts are hereby incorporated by reference.

It may be appreciated that many applications of the present invention may be formulated. One skilled in the art may appreciate that a network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention may be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention is frequently described herein as being implemented with TCP/IP communications protocols, it may be readily understood that the invention may also be implemented using IPX, Appletalk, IP-6, NetBIOS, OSI or any number of existing or future protocols. Moreover, the present invention contemplates the use, sale or distribution of any goods, services or information over any network having similar functionality described herein.

In accordance with various embodiments of the invention, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Interbase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and/or the like.

The financial transaction device (e.g., smart card, magnetic stripe card, bar code card, optical card, biometric device, radio frequency fob or transponder and/or the like) may communicate to the merchant, information from one or more data sets associated with the financial transaction device. In one example, membership data and credit card data associated with an account or card may be transmitted using any conventional protocol for transmission and/or retrieval of information from an account or associated transaction card (e.g., credit, debit, loyalty, etc.). In one exemplary embodiment, the transaction device may be configured to communicate via RF signals. As such, the data contained on the instrument may be communicated via radio frequency signals.

A financial transaction device may include one or more physical devices used in carrying out various financial transactions. For example, a financial transaction device may include a rewards card, charge card, credit card, debit card, prepaid card, telephone card, smart card, magnetic stripe card, radio frequency card/transponder and/or the like. In yet another exemplary embodiment of the present invention, a financial transaction device may be an electronic coupon, voucher, and/or other such instrument.

The financial transaction device in accordance with this invention may be used to pay for acquisitions, obtain access, provide identification, pay an amount, receive payment, redeem reward points and/or the like. In the radio frequency ("RF") embodiments of the transaction device, instrument to instrument transactions may also be performed. See, for example, Sony's "Near Field Communication" ("NFC") emerging standard which is touted as operating on 13.56 MHz and allowing the transfer of any kind of data between NFC enabled devices and across a distance of up to twenty centimeters. See also, Bluetooth chaotic network configurations; described in more detail at http://www.palowireless.com/infotooth/whatis.asp, which is incorporated herein by reference. Furthermore, data on a first RF device may be transmitted directly or indirectly to another RF device to create a copy of all or part of the original device.

Furthermore, financial transaction device as described herein may be associated with various applications which allow the financial transaction devices to participate in various programs, such as, for example, loyalty programs. A loyalty program may include one or more loyalty accounts. Exemplary loyalty programs include frequent flyer miles, on-line points earned from viewing or purchasing products or websites on-line and programs associated with diner's cards, credit cards, debit cards, hotel cards, calling cards, and/or the like. Generally, the user is both the owner of the transaction card account and the participant in the loyalty program; however, this association is not necessary. For example, a participant in a loyalty program may gift loyalty points to a user who pays for a purchase with his own transaction account, but uses the gifted loyalty points instead of paying the monetary value.

Further still, a "code," "account," "account number," "identifier," "loyalty number" or "membership identifier," as used herein, includes any device, code, or other identifier/indicia suitably configured to allow the consumer to interact or communicate with the system, such as, for example, authorization/access code, personal identification number (PIN), Internet code, other identification code, and/or the like that is optionally located on a rewards card, charge card, credit card, debit card, prepaid card, telephone card, smart card, magnetic stripe card, bar code card, radio frequency card and/or the like. The account number may be distributed and stored in any form of plastic, electronic, magnetic, radio frequency, audio and/or optical device capable of transmitting or downloading data from itself to a second device. A customer account number may be, for example, a sixteen-digit credit card number, although each credit provider has its own numbering system, such as the fifteen-digit numbering system used by an exemplary loyalty system. Each company's credit card numbers comply with that company's standardized format such that the company using a sixteen-digit format may generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer. In addition, loyalty account numbers of various types may be used.

Further yet, the "transaction information" in accordance with this invention may include the nature or amount of transaction, as well as, a merchant, user, and/or issuer identifier, security codes, or routing numbers, and the like. In various exemplary embodiments of the present invention, one or more transaction accounts may be used to satisfy or complete a transaction. For example, the transaction may be only partially completed using the transaction account(s) correlating to the application tenant information stored on the transaction device with the balance of the transaction being completed using other sources. Cash may be used to complete part of a transaction and the transaction account associated with a user and the transaction device, may be used to satisfy the balance of the transaction. Alternatively, the user may identify which transaction account, or combination of transaction accounts, stored on the transaction device the user desires to complete the transaction. Any known or new methods and/or systems configured to manipulate the transaction account in accordance with the invention may be used.

In various exemplary embodiments, the financial transaction device may be embodied in form factors other than, for example, a card-like structure. As already mentioned, the financial transaction device may comprise an RF transponder, a speed pass, store discount card, or other similar device. Furthermore, the financial transaction device may be physically configured to have any decorative or fanciful shape including key chains, jewelry and/or the like. The financial transaction device may furthermore be associated with coupons. A typical RF device which may be used by the present invention is disclosed in U.S. application Ser. No. 10/192, 488, entitled "SYSTEM AND METHOD FOR PAYMENT USING RADIO FREQUENCY IDENTIFICATION IN CONTACT AND CONTACTLESS TRANSACTIONS," and its progeny, which are all commonly assigned, and which are all incorporated herein by reference.

As used herein, the term "data set" may include any set of information and/or the like which may be used, for example, in completing a transaction. For example, data sets may include information related to credit cards, debit cards, membership clubs, loyalty programs, speed pass accounts, rental car memberships, frequent flyer programs, coupons, tickets and/or the like. This information may include membership identifiers, account number(s), personal information, balances, past transaction details, account issuer routing number, cookies, identifiers, security codes, and/or any other information. The data set may additionally include an issuer defined management process for determining which subsets of data are to be provided to an issuer or merchant. In some instances, a data set may be associated with one or more account numbers corresponding to accounts maintained by the account issuer.

The various data sets associated with a financial transaction device may either be stored on the financial transaction device itself or remotely. In one exemplary embodiment, the financial transaction device itself is configured to store at least two data sets. In other exemplary embodiments, data sets may be stored in one or more databases and the data sets are affiliated with the financial transaction device. For example, a central database on the instrument may store multiple distinct data sets correlated with a unique issuer. The data sets stored on the remote database may be stored thereon, in such a manner as to mimic the corresponding data sets stored on the transaction device. The multiple distinct data sets may be accessed, for example, by a merchant system, whether stored on the transaction device or remote database stand alone device, and/or a computer user interface, via a network. In this example, the financial transaction device may include one or more user identifiers (e.g., membership identifiers), which may be used to provide access to a subset of data included on the financial transaction device.

Various information and data are described herein as being "stored." In this context, "stored" may mean that the information is kept on a database. In accordance with the invention, a database may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Databases may be organized in any suitable manner, including as data tables or lookup tables. Association of certain data may be accomplished through any data association technique known and practiced in the art. For example, the association may be accomplished either manually or automatically. Association techniques include common techniques such as using a key field in the tables to speed searches, sequential searches through all the tables and files, and sorting records in the file according to a known order to simplify lookup.

Although all data sets associated with a particular financial transaction device may be owned by the same owner, it is contemplated that in general, some of the data sets stored on the financial transaction device have different owners. Furthermore, the storage of data sets is configured to facilitate independent storage and management of the data sets on the financial transaction device. Further still, the data sets may be stored in distinct differing formats provided by the distinct issuer or data set owner (also called "issuer," herein). The owners of data sets may include different individuals, entities, businesses, corporations, software, hardware, and/or the like. However, one skilled in the art will appreciate that the owners may also include different divisions or affiliates of the same corporation or entity.

A data set may contain any type of information stored in digital format. For example, a data set may include account numbers, programs/applications, scripts, cookies, instruments for accessing other data sets, and/or any other information.

As discussed above, many issuers of existing financial transaction devices utilize predetermined formats for account numbers, data and/or applications stored in association with the financial transaction device. Similarly, the data storage media associated with these financial transaction devices are typically configured to accommodate specific predetermined data formats. Thus, since the data format associated with a first issuer is often different from a data format of a second issuer, storage of multiple distinct data of differing formats on a single device provides complications for conventional systems. This is true since, each issuer typically maintains an account processing system that uses a processing protocol different from other issuers, and the information stored on the transaction card relative to the issuer must be formatted accordingly. As such, to ensure the security and integrity of the issuer-owned data, the loading of data on a transaction device is typically performed by an issuer or a third-party provider who typically uploads all related and similarly formatted data sets onto the transaction device. However, since the third party may typically only be authorized by the issuer to load issuer-owned data of similar format onto an issuer-provided transaction device, including differently formatted data sets on a single transaction device by the third party is often not permitted. More particularly, independent owners of data sets are often reluctant to conform their data set formats to a "standard format" because of the security advantages of maintaining a separate, distinct, often secreted format.

In contrast, and in accordance with an exemplary embodiment of the present invention, the format of the information stored in the present invention may vary from one data set to another. That is, the present invention permits the data to be stored on the financial transaction device in any format, and more particularly, in any format recognizable by the data owner/transaction device issuer. Thus, as noted, each data set may be used for a very wide variety of purposes including storage of applications, raw data, cookies, coupons, membership data, account balances, loyalty information, and/or the like.

In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information can be stored in a storage space associated with a data set. As discussed above, the binary information may be stored on the financial transaction device or external to but affiliated with the financial transaction device. The BLOB method may store data sets as ungrouped data elements formatted as a block of binary via a fixed memory offset using either fixed storage allocation, circular queue techniques, or best practices with respect to memory management (e.g., paged memory, memory recently used, etc.). By using BLOB methods, the ability to store various data sets that have different formats facilitates the storage of data associated with the financial transaction device by multiple and unrelated owners of the data sets. For example, a first data set which may be stored may be provided by a first issuer, a second data set which may be stored may be provided by an unrelated second issuer, and yet a third data set which may be stored, may be provided by a third issuer unrelated to the first and second issuers. Each of these three exemplary data sets may contain different information that is stored using different data storage formats and/or techniques. Further, each data set may contain subsets of data which also may be distinct from other subsets.

Even further, where the invention contemplates the use of a self-service user interaction device. In this context, the self-service user interaction device may be any device suitable for interacting with a transaction device, and receiving information from the transaction device user and providing the information to a merchant, account issuer, account manager, data set owner, merchant point of sale, and the like. For example, the self-service user interaction device may be a stand alone read write device, self-service kiosk, merchant point of sale, read/write device, and the like. In one example, the self-service user interaction device may be configured to communicate information to and from the transaction device and to manipulate the data sets stored thereon. The self-service interaction device may be in communication with the various components of the invention using any communications protocol.

In general, systems and methods disclosed herein, are configured to facilitate the management of multiple distinct data sets associated with a financial transaction device. Management of data sets may include such steps as adding, augmenting, updating and/or deleting data sets associated with the financial transaction device. Such manipulations of the data may occur without replacing or reissuing the financial transaction device. With reference to FIG. 1, an exemplary method 100 according to the present invention is shown. Method 100 may include issuing a financial transaction device issued to a transaction device user (step 110), enrolling multiple data set owners in a multiple account on a transaction device program (step 112), and managing data sets associated with the financial transaction device (step 120). In managing the data, the method 100 may determine, for example, whether the data should be added to a data set (step 130), modified (step 140) or deleted (step 150), as described more fully below. Once the data is appropriately managed, the financial transaction device user may present the data contained on the instrument to a merchant system for completion of a transaction.

The system may be further configured such that, during an exemplary transaction, data sets associated with the financial transaction device may be managed. For example, the user may be prompted (e.g., on a screen, by electronic voice, by a store clerk, by a signal and/or the like) as to the possibility of adding, for example, a loyalty account to the same financial transaction device and the user may also be presented with terms and/or conditions in a similar or different manner. The user may be prompted at any time during the transaction, but in an exemplary embodiment, the user is prompted at the completion of the transaction. If the user accepts the invitation to add data to the financial transaction device, a new data set may be added (step 130) and/or an existing data set is updated (step 140). For example, if data is to be updated, the stand alone may locate appropriate data to be updated on the transaction device, and make the updates ("modifications") in accordance with data owner instructions. If the data is to be added, the stand alone device may be configured to provide any account information (e.g., account identifier, security code, data owner routing number, etc.) to the transaction device for storage thereon. The stand alone may locate an appropriate database location on transaction device for storing the added data. The stand alone device facilitates storage of the data in a distinct location on the transaction device database, where the data is stored independently of any other data. In an exemplary embodiment of the invention, the data is added to a database location on the transaction device which reserved for independently storing all data owned by a particular data set owner. Alternatively, the data may be stored in a distinct location on the transaction device, which is a separate location than is used to store any other data set. Further still, the data set is stored in accordance with any storage protocol permitting the data to be stored and retrieved independently of other data.

The adding and updating of the data may be verified by the issuer, prior to making the modifications. If verified, all databases containing the data set to be updated or a mirror image of the data set to be updated, are modified in accordance with the user or issuer provided instructions, and/or the issuer defined data storage protocol or format.

In one exemplary embodiment, multiple account issuers may be enrolled in a multiple account management program using a financial transaction device in accordance with the invention (step 112). For example, permission for adding account issuer-owned data may be obtained from the data set owner. The data set owner may then be requested to provide account information to be stored on a transaction device. The data set owner may then provide account information relative to a distinct user account for loading onto the transaction device in accordance with the present invention. The issuers may be enrolled prior to issuance of the instrument or the issuers may be enrolled after issuance. By enrolling in the management program, the issuer may provide authorization for including the issuer-owned data on the financial transaction device. The issuer-owned data may be included (e.g., added, deleted, modified, augmented, etc.) on the transaction device using a stand alone interaction device, merchant system, or user personal computer interface upon presentment of the transaction device to the stand alone interaction device 290 (step 114). The stand alone interaction device may manipulate the issuer-owned data while preserving a format recognizable by an issuer account management system. For example, the stand alone device may identify the appropriate header or trailer associated with the data and add, delete or modify the data accordingly. The stand alone may manipulate the data using any manipulation instruction or protocol as provided by the data set owner so that the resulting manipulated data is in a format recognizable by the data set owner system. In this way, the stand alone device may manipulate the data while maintaining the data set owner's format. Alternatively, the interaction device may store the issuer-owned data on the transaction device in any format, provided that the issuer-owned data is provided to the issuer system (or to merchant system) in an issuer system (or merchant system) recognizable format.

It should be noted, that the financial transaction device may be issued with or without one or more data sets stored thereon. The financial transaction device may be issued using various techniques and practices now known or hereinafter developed wherein an instrument is prepared (e.g., embossed and/or loaded with data) and made available to a user for effecting transactions. Although the present invention may contemplate managing data sets (step 120) before issuing a financial transaction device (step 110), in various exemplary embodiments, by way of illustration, the data sets are described herein as being managed (step 120) after issuance (step 110).

At any time after issuance (step 110) of the financial transaction device, the financial transaction device may be used in a commercial transaction. In one exemplary embodiment of the present invention, a user communicates with a merchant, indicates a desire to participate in a issuer provided consumer program. The user may communicate with the merchant by, for example, presenting the transaction device to the merchant and indicting a desire to complete a transaction. The user may indicate his desire to complete a transaction using any conventional process used by the merchant. The user may further indicate that the user wished to complete the transaction using the financial transaction device.

During completion of the transaction, the user may present the financial transaction device to a merchant system. The financial transaction device is configured to communicate with the merchant, using any conventional method for facilitating a transaction over a network.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial transaction device. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set (e.g., LOADED, INITIALIZED, READY, BLOCKED, REMOVABLE, or DELETED). Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified merchants are permitted to access the data set for reading, and others are altogether excluded from accessing the data set. However, other access restriction parameters may also be used allowing various entities to access a data set with various permission levels as appropriate.

The data, including the header or trailer may be received from a data set owner via any communication method described herein. The header or trailer may be appended to a data set to be modified, added or deleted, to indicate the action to be taken relative to the data set. The data set owner may provide the to a stand alone interaction device configured to add, delete, modify, or augment the data in accordance with the header or trailer. As such, in one exemplary embodiment, the header or trailer is not stored on the transaction device along with the associated issuer-owned data but instead the appropriate action may be taken by providing to the transaction device user at the stand alone device, the appropriate option for the action to be taken. However, the present invention contemplates a data storage arrangement wherein the header or trailer, or header or trailer history, of the data is stored on the transaction device in relation to the appropriate data.

In various exemplary embodiments, the steps of adding, deleting, augmenting and/or modifying data sets may be repeated. For example, first, second, and additional data sets may be added (step 130) to the financial transaction device in any order. In one exemplary embodiment of the present invention, the first data set is owned by a first data set owner (i.e., first issuer) and the second data set is owned by a second data set owner (i.e., second issuer). Furthermore, the system may include replacing a first data set with a subsequent data set by deleting a data set (step 150), then adding a data set (step 130).

Figure 2:
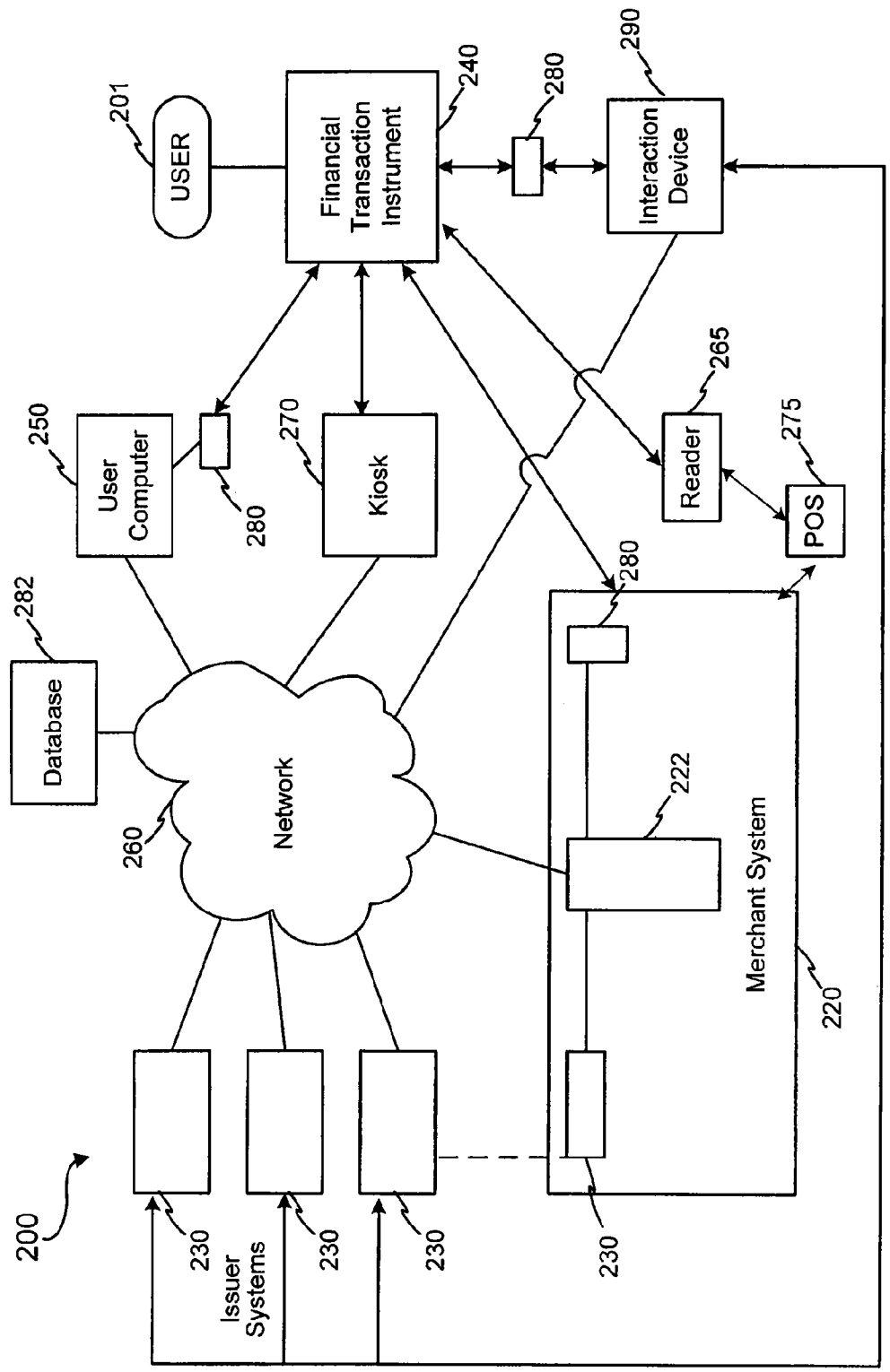
FIG. 2 illustrates a block diagram overview of an exemplary data set management system in accordance with an exemplary embodiment of the present invention.

With reference now to FIG. 2, in one exemplary embodiment of the present invention, a data set management system ("management system") 200 comprises a merchant system 220, various issuer systems 230, and a financial transaction device 240. Management system 200 may further be accessed by a user 201 on a self-service interaction device, such as, for example, user computer 250 or via a transaction device such as, for example, kiosk 270, stand alone interaction device 290, automated teller, or the like. In these examples, communications between user computer 250 or kiosk 270 and merchant system 220 or issuer systems 230 may take place via, for example, a network 260. In various embodiments, merchant system 220, user computer 250 and/or kiosk 270 are configured to communicate with financial transaction device 240. For example, communication with financial transaction device 240 may be facilitated by a point-of-read/write device 280, such as a merchant point of sale, merchant RFID reader, computer interface, or the like, configured to receive information provided by financial transaction device 240.

In general, merchant system 220 is configured to interact with a user 201 attempting to complete a transaction, and to communicate transaction data to one or more of issuer systems 230. Issuer systems 230 are configured to interact with financial transaction device 240 to receive and/or exchange data facilitating a transaction. Merchant system 220 may be operated, controlled and/or facilitated by any merchant that accepts payment via a transaction device.

Merchant system 220 is configured to facilitate interaction with user 201, which may be any person, entity, software and/or hardware. User 201 may communicate with the merchant in person (e.g., at the box office), or electronically (e.g., from a user computer 250 via network 260). During the interaction, the merchant may offer goods and/or services to user 201. The merchant may also offer user 201 the option of completing the transaction using a financial transaction device. The merchant system may provide the options to user

201 using interactive user interface, suitable website or other Internet-based graphical user interface that is accessible by users.

Each user 201 may be equipped with a computing system to facilitate online commerce transactions. For example, user 201 may have a computing unit in the form of a personal computer (e.g., user computer 250), although other types of computing units may be used including laptops, notebooks, hand held computers, set-top boxes, and/or the like. Merchant system 220 may have a computing unit 222 implemented in the form of a computer-server, although other implementations are possible. Issuer system 230 may have a computing center such as a main frame computer. However, the issuer computing center may be implemented in other forms, such as a mini-computer, a PC server, a network set of computers, or the like.

Issuer system 230 may be configured to manipulate a transaction account associated with the corresponding issuer-owned data stored on transaction device 240 (or database 282, discussed below) in accordance with a related transaction. For example, issuer system 230 may receive "transaction information" and manipulate an account status or balance in accordance with the information received. In accordance with the transaction amount, issuer system 230 may, for example, diminish a value available for completing a transaction associated with the account, or issuer system 230 may alter the information relative to the account user (e.g., demographics, personal information, etc.).

It should be noted that issuer systems 230 may also be configured to interact with financial transaction device 240, directly or indirectly via database 282 or stand alone interaction device 290, to individually manage data sets on financial transaction device 240. For example, issuer systems 230 may manage data sets on database 282. In some embodiments, the data sets on database 282 may then be stored on financial transaction device 240 when the transaction device is presented. In other embodiments, issuer systems 230 may store data set information within their own systems which may communicate with the financial transaction device via user computer 250, kiosk 270, or merchant system 220. In such embodiments, issuer system 230 may be configured to push the data set to financial transaction device 240 via the stand alone interaction device 290, or merchant system 220, kiosk 270, interaction device 290 or computer 250 which may be configured to pull such information from issuer system 230.

In addition, the data may be manipulated using, for example, a stand alone interaction device 290 configured to communicate with at least one of issuer systems 230 which may or may not be configured to communicate with a merchant system 220. Interaction device 290 may communicate with issuer systems 230 using any of the aforementioned communication protocols, techniques and data links. The communication between the stand alone interaction device 290 and issuer system 230 may be facilitated by a network 260. In an exemplary embodiment, network 260 may be secure against unauthorized eavesdropping.

Interaction device 290 may provide instructions to issuer systems 230 for requesting receipt of issuer-owned data, such as for example, account data, user member identification data, member demographic data, or the like, which the issuer wishes to store on financial transaction device 240. Interaction device 290 may communicate with issuer systems 230 using an issuer recognizable communications protocol, language, methods of communication and the like, for providing and receiving data. In one exemplary embodiment, issuer-owned data is received by interaction device 290 from issuer systems 230, and stored onto financial transaction device 240.

The data may be stored or manipulated in accordance with the issuer provided instructions, protocol, storage format, header or trailers received by the interaction device from issuer systems 230. The issuer-owned data may be stored on financial transaction device 240 in any format recognizable by a merchant system 220, and further recognizable by issuer system 230. In one exemplary embodiment, the issuer-owned data is stored using a issuer system 230 format which may be later formatted in merchant system 220 recognizable protocol when provided to merchant system 220. In one embodiment, the issuer-owned information is stored on financial transaction device 240 in the identical format with which it was provided by issuer system 230. In that regard, interaction device 290 may be any device configured to receive issuer-owned data from an issuer system 230, and write the data to a database, such as, for example, a database on transaction device 240 or database 282. Further, as described more fully below, the issuer-owned information may also be provided by issuer system 230 to a remote database 282 where the information is stored such that it mirrors the corresponding information stored on transaction device 240.

Interaction device 290 may be initialized prior to use. For example, interaction device 290 may be any system which may be initialized ("configured") to communicate with a merchant system 220. Where the interaction device is not initialized prior to attempting communications with merchant system 220 or transaction device 240, interaction device 290 may be initialized at merchant system 220 location. Interaction device 290 may be initialized using any conventional method for configuring device communication protocol.

As noted, in accordance with the invention a transaction device is provided which permits the storage and presentment of at least one of a plurality of data sets for completing a transaction. The data sets may be stored on the transaction device itself, or on a remote database, as described below. The data sets stored with regard to the transaction device may be modified, deleted, added or augmented, as required by the issuer or the user. For example, as owner of the data, an issuer may modify a data set at the issuer's discretion. The issuer may modify the data, data subsets, member identifier and/or applications or data sets associated with its transaction account program. Such modifications may be completed or substantially completed in substantially real-time or at a later date, for example, when the transaction device is next presented.

In a typical example of issuer modification of the data sets, one or more data sets may be modified by issuer system 230 directly via issuer systems 230, upon presentment of financial transaction device 240 to the system 230. That is, user 201 may present the card to issuer system 230, and issuer system 230 may modify the issuer data stored thereon, using any issuer defined protocol. Alternatively, the modifications, or instructions for modification, may be initiated at issuer system 230, and provided to network 260. The modifications and/or modification instructions may additionally be provided to a suitable device configured to communicate with transaction device 240, receive information regarding the data stored on transaction device 240, and to write or overwrite the information contained on transaction device 240. For example, as noted, interaction device 290 is a suitable interaction device which may be used to provide information to transaction device 240 to modify the information stored thereon. Interaction device 290 may be any device capable of receiving data management instructions from issuer systems 230 and for updating the data stored on transaction device 240, in accordance with the instructions received. In this regard, interaction device 290 may include any electronic components, databases, processors, servers and the like which may be used to modify the data stored on transaction device 240 using any suitable data modification protocol as is found in the art. In an exemplary embodiment, the interaction device is configured to modify the data on the transaction device in accordance with a data owner defined protocol.

In one exemplary embodiment, interaction device 290, may be configured to modify the transaction device's 240 issuer-owned data when transaction device 240 is initially configured, prior to providing transaction device 240 to user 201. Interaction device 290 may additionally be configured to modify the issuer data on transaction device 240 when transaction device 240 is next presented, for example, to the stand alone interaction device 290. In this regard, interaction device 290 may receive from multiple distinct issuer systems 230, via network 260, the issuer provided modifications/instructions and may update transaction device 240 in real-time or substantially real-time. The modifications may be provided to interaction device 290 for storage and later use when transaction device 240 is next presented. Alternatively, interaction device 290 may be configured to retrieve the instructions from issuer system 230 when transaction device 240 is next presented to device 290. Further, where other devices, such as, for example, a kiosk 270, merchant point-of-sale device, or the like, are likewise configured to modify the issuer data on transaction device 240, the invention contemplates that the real-time or substantially real-time modifications noted above may be made using those devices in similar manner as is described with interaction device 290.

Alternatively, the device to which transaction device 240 may be presented, may not be equipped for updating or modifying the data stored on transaction device 240. For example, merchant system 220 may be any conventional merchant system which communicates to an issuer system 230, and which permits a user 201 to complete a financial transaction, but which is not configured to modify the issuer data contained on transaction device 240. In general, conventional merchant systems are not configured to write or overwrite data included on the payment devices presented to the merchant system for processing. That is, merchant system 220 may include little or no additional software to participate in an online transaction supported by network 260. Management of the data sets on transaction device 240 may be performed independent of the operation of merchant system 220 (e.g., via issuer system 230 or interaction device 290). As such, the present invention may require no retrofitting of merchant system 220, to accommodate system 200 operation. Thus, where merchant system 220 is not configured to modify the data on transaction device 240, such modifications may be made as described above with respect to modifications being made at interaction device 290 or by the issuer at issuer system 230.

Merchant system 220, kiosk 270, interaction device 290, may include additional means for permitting the transaction device user 201 to self-manage the data stored on transaction device 240. In this case, the systems 220, 270, and 290 may include an additional user interface for use by user 201 to identify the modification action to be taken. Where the systems 220, 270, and 290 are configured to communicate with transaction device 240 and to modify the data thereon, the modifications may be completed or substantially completed in real-time or substantially real-time. For example, user 201 may present transaction device 240 to one of the systems 220, 270, or 290, provide instructions to the system 220, 270, or 290 for modifying the data on transaction device 240. The instructions may include, for example, "ADD," "DELETE," "MODIFY," and the system 220, 270, or 290 may modify the data stored on transaction device 240 in accordance therewith. The modifications may be made on the instrument in real-time or substantially real-time, for example, prior to permitting transaction device 240 to be used by user 201. Alternatively, the modifications or instructions for modification may be provided by user 201 to merchant system 220 or kiosk 270, and merchant system 220 or kiosk 270 may further provide the modifications/instructions to network 260 for use in later modifying the data. For example, the modifications/instructions may be provided by system 220 or 270 to issuer system 230 managed by the issuer owning the data to be modified. Issuer system 230 may provide the modifications to, for example, interaction device 290, for updating transaction device 240 when next presented. The modifications/instructions may additionally be provided from network 260 to a remote database, where the modifications/instructions corresponding to the transaction device and the issuer may be additionally stored (i.e., database 282, described below). In one exemplary embodiment, the modifications/instructions may be stored at issuer system 230, until such time as transaction device 240 is next presented to a device configured to modify the data on the instrument. Once presented, the modifications/instructions may be provided to the device (e.g., computer 250, interaction device 290, etc.) for modifying transaction device 240 data.

In another exemplary embodiment, user 201 may self-manage the data sets by, for example, modifying the data sets using a conventional computer system 250, which may be in communication with network 260. Computer system 250 may or may not be configured to interact with financial transaction device 240. Where computer system 250 is not configured to interact with transaction device 240, user 201 may provide modifications or instructions to issuer system 230 for later use in modifying the corresponding transaction device 240 data, for example, when transaction device 240 is next presented in similar manner as described above. Where computer 250 is configured to interact with financial transaction device 240 to modify the data stored thereon, user 201 may provide modifications/instructions to computer 250 for modifying the data on the financial instrument in real-time or substantially real-time. That is, computer 250 may be configured to interact with, read, add, delete, and/or modify the data sets on transaction device 240. Consequently, computer 250 may receive modifications/instructions from user 201 and perform the modifications accordingly, and may modify the data in real-time or substantially real-time. Computer 250 may additionally be configured to receive authorization of the modifications/instructions from issuer system 230 prior to making user 201 requested changes. In one exemplary arrangement, user 201 may provide the modifications/instructions via network 260 which may be additionally provided to issuer system 230. Issuer system 230 may receive user 201 modifications/instructions and verify whether the identified updates are available to user 201 or if the identified updates are valid. If the identified updates are authorized, issuer system 230 may update a data storage area associated with transaction device 240. For example, issuer system 230 may update an issuer database (not shown) containing data corresponding to the issuer-owned data associated with transaction device 240. Alternatively, issuer system 230 may provide modifications/instructions to a database positioned remotely to issuer system 230 for use in modifying the data stored thereon, which is associated to the transaction device 230. As such, in accordance with the present invention, user 201 may self-manage the data via, for example, user computer 250, a kiosk 270, a merchant system 220, and/or a stand alone interaction device 290.

In one exemplary method of self-management, user 201 logs onto a website via user computer 250, or onto a stand alone device, such as, for example, interaction device 290 or kiosk 270, and selects options for configuring data sets on a financial transaction device 240. The changes may be transmitted to transaction device 240 via a instrument reader/writer device 280 configured to communicate the data to transaction device 240. In this context, the reader/writer device 280 may be any conventional transaction device reader or writer.

As noted, modifications to the data stored on financial transaction device 240 may be made in real-time or substantially real-time when transaction device 240 is presented to interaction device 290, or to a reader/writer device 280. However, as noted, various embodiments of the invention include a remote database 282 in communication with an issuer system 230 via network 260. Remote database 282 may additionally be in communication with one of user computer 250, kiosk 270, merchant system 220 and/or interaction device 290, for variously receiving modifications or instructions for performing modifications to the data stored thereon. In addition, database 282 may contain a data storage area which "mirrors" the data stored on transaction device 240. In this context "mirrored" or "mirror" may mean that the data is stored on database 282 in substantially identical configuration and format as stored on transaction device 240. As such, the present invention may be configured to permit modifications made to transaction device 240 data to be mimicked on corresponding data locations on database 282. For example, user 201 may self-manage the data on database 282 via a user interface in communication with database 282 via network 260. In one exemplary embodiment, user 201 may communicate with a "website" which is used to manage database 282, wherein database 282 is a database including unique locations for storing the issuer provided data and data sets correlative to the data and data sets stored on transaction device 240. The website may include an account management application which permits user 201 to select which user accounts to add, delete, or modify with respect to transaction device 240. That is, user 201 may provide unique identifying information to user computer 250 which may be recognized by the system (e.g., issuer system 230 or remote system managing database 282) managing database 282, thereby permitting user 201 to access the data corresponding to the unique identifying information stored on database 282. Further, prior to permitting modifications to database 282, the issuer owning the data may require authorization that such modifications may be performed. Further still, the present invention contemplates that database 282 may be self-managed by user 201 in similar manner, where merchant system 220, kiosk 270 and/or interaction device 290 are configured to provide modifications/instructions to issuer systems 230 and database 282.

In another exemplary embodiment, database 282 serves as a temporary or redundant storage space for data sets. Thus, a "mirror image" of the data sets currently on financial transaction device 240 may be maintained and/or updated at appropriate intervals for facilitating replacement of, for example, a damaged financial transaction device 240. As such, database 282 may be used, for example, for verifying the validity or accuracy of the information stored on transaction device 240. Also, changes to one or more data sets may be stored to database 282 pending an opportunity to update financial transaction device 240. In various embodiments, such updating may take place in both directions similar to hot sync technology.

As noted, in some exemplary embodiments of the invention, authorization must be obtained from issuer systems 230 prior to making any modifications to the data contained on transaction device 240 or database 282. Authorization may be obtained by requesting the authorization during the modification process. Authorization may be given where user 201 provides the more appropriate security information, which is verified by issuer system 230. The security information may be, for example, a security code granting access to the issuer-owned data on transaction device 240 or database 282. For example, a point-of-sale (POS) machine may be configured to allow the input of a code, or an answer to a prompt which is provided to and verified by issuer system 230. Once verified the modification requested may be made to the data contained on financial transaction device 240.

It should be noted that the authorization code may be used to permit user 201 to select which issuer provided data to utilize for completion of a transaction. For example, a point-of-sale device (POI) device may be programmed to search financial transaction device 240 for a data set containing a particular club membership data set, or to locate all available data sets for providing to user 201 display available data sets to user 201, thereby permitting user 201 to select which data set to use to complete a transaction. If no data set is found, the POS device may alert user 201 or prompt the merchant to alert user 201 of the possibility of adding issuer-owned data to financial transaction device 240. A positive response to this alert may cause the POS device to add an issuer data set to transaction device 240.

It is noted that user 201 may already be a member of a membership program managed by an issuer system 230 in which case the associated user 201 membership data may be assigned to user 201 for inclusion on transaction device 240. As such, user 201 may be permitted to add the membership data set to transaction device 240. Alternatively, the user may become a member by selecting to add the membership information to financial transaction device 240, using the interactive device 290. In some embodiments, changes made to the data sets stored on transaction device 240 may be updated to financial transaction device 240 in real-time or substantially real-time, where the device 290 is in communication with transaction device 240. Or the changes may be made the next time user 201 presents financial transaction device 240 to stand alone interaction device 290 or to a kiosk 270, merchant system 220, or the like.

In another exemplary embodiment of the present invention, merchant system 220, kiosk 270, and/or user computer 250 may be configured to interact with financial transaction device 240 via a read/write device 280. Read/write device 280 may be any device configured to communicate with financial transaction 240. In one embodiment, read/write device 280 is configured to read and write to financial transaction device 240. For example, read/write device 280 may be a point-of-sale magnetic card reader/writer. In another example, where transaction device 240 includes a RF transmitter/receiver for communicating with system 200, read/write device 280 may include a mating transponder configured to receive and transmit issuer-owned data. Read/write device 280 may be configured to select data sets for use by a merchant using any suitable selection technique including but not limited to proprietary commands or command sequences or use of ISO/IEC 7816-4 application selection sequences (e.g., GET command).

In one exemplary embodiment, management of data sets is facilitated by annotating the data set with a status indicator (e.g., condition header); (e.g., LOADED, INITIALIZED, READY, BLOCKED, REMOVABLE or DELETED).

In this regard, a data set may have a LOADED status when the information related to that data set has been stored in association with financial transaction device 240, but remains dormant. For example, a credit card account may have been added to financial transaction device 240 that has not yet been activated. In some instances, the loaded data set needs to be further configured before it is ready to be used. For example, the data set may be modified to include a particular branch in a chain of franchise stores, the identification of a user's 201 primary care physician, or to reflect a user's 201 selection of a platinum membership status. In another example, a loyalty program may be added in association with a financial transaction device 240, and the data set marked LOADED. In another example, user 201 may interact with a kiosk 270 or the like to input personal information and configure the loyalty program data set. Once such a data set has been configured, it may be annotated with an INITIALIZED status.

The status of a data set may be set as READY when the data set is ready to be utilized. For example, user 201 may enter a secret code to indicate that user 201 is ready to use the data set. In one example, the data set may be marked as READY when that data set is first accessed to perform a transaction. It will be noted that in accordance with other embodiments of the present invention, the status of a data set may be set at READY the moment it is loaded to financial transaction device 240. Furthermore, it is possible to change the status between READY, LOADED, and INITIALIZED, under appropriate circumstances. Thus, the data sets may be managed through any one or more of these states and in various orders.

It may also be desirable to prevent use of a data set and/or the associated functionality for a period of time. Thus, the status indicator may be set to BLOCKED. The setting of the status indicator to BLOCKED may, for example, disable the use of the data set. In one exemplary embodiment, an appropriately configured financial transaction device reader is configured to recognize the BLOCKED status indicator when accessing the data set and to prevent use of that data set example.

In addition, for various reasons, user 201 may desire to remove a data set from a transaction card 240. User 201 may, for example, desire to use the available space on the transaction card 240 for other data sets, or may remove the data set for security reasons. Furthermore, circumstances may arise where the owner of the data set desires to remove the data set from one or more transaction devices 240, such as when a coupon expires. In these instances, the data set may be marked as REMOVABLE. Under these circumstances, the memory associated with the data set is available to receive information associated with future added data sets, but for the moment retains the old data set. A REMOVABLE data set may again be made READY under various configurations.

The REMOVABLE data set may subsequently be removed from financial transaction device 240 and marked DELETED. A DELETED status indicator may be used to indicate that a portion of financial transaction device 240 is available to store one or more data sets. It is noted that data sets may be directly deleted without going through the step of making the data set REMOVABLE. In one example, a data set may be removed from financial transaction device 240 if the security of the account associated with the data set is compromised (e.g., stolen password). Furthermore, as appropriate, the status of data sets may be changed to different states.

Under appropriate circumstances one or more of any of the six status indicators LOADED, INITIALIZED, READY, BLOCKED, REMOVABLE, or DELETED or other suitable status indicators may be used to annotate a BLOB or other similar data set.

Although the data sets described herein may be managed without status indicators, nevertheless, such status indicators facilitate management of data. For example, regardless of a first data set owner's ability to interpret the information stored in a data set owned by another party, the first owner may interpret the status indicator to determine whether the data set is LOADED, DELETED, or the like. The determination that a data set is DELETED facilitates the addition of new data sets by independent owners without overwriting other data sets on financial transaction device 240. In addition, the use of tags or status indicators may facilitate the use of global rules, which may simplify operations and/or commands. Status indicators may also enhance interoperability between data sets. Nevertheless, a data set owner may chose not to use a status indicator even if the opportunity is available.

Figure 3:
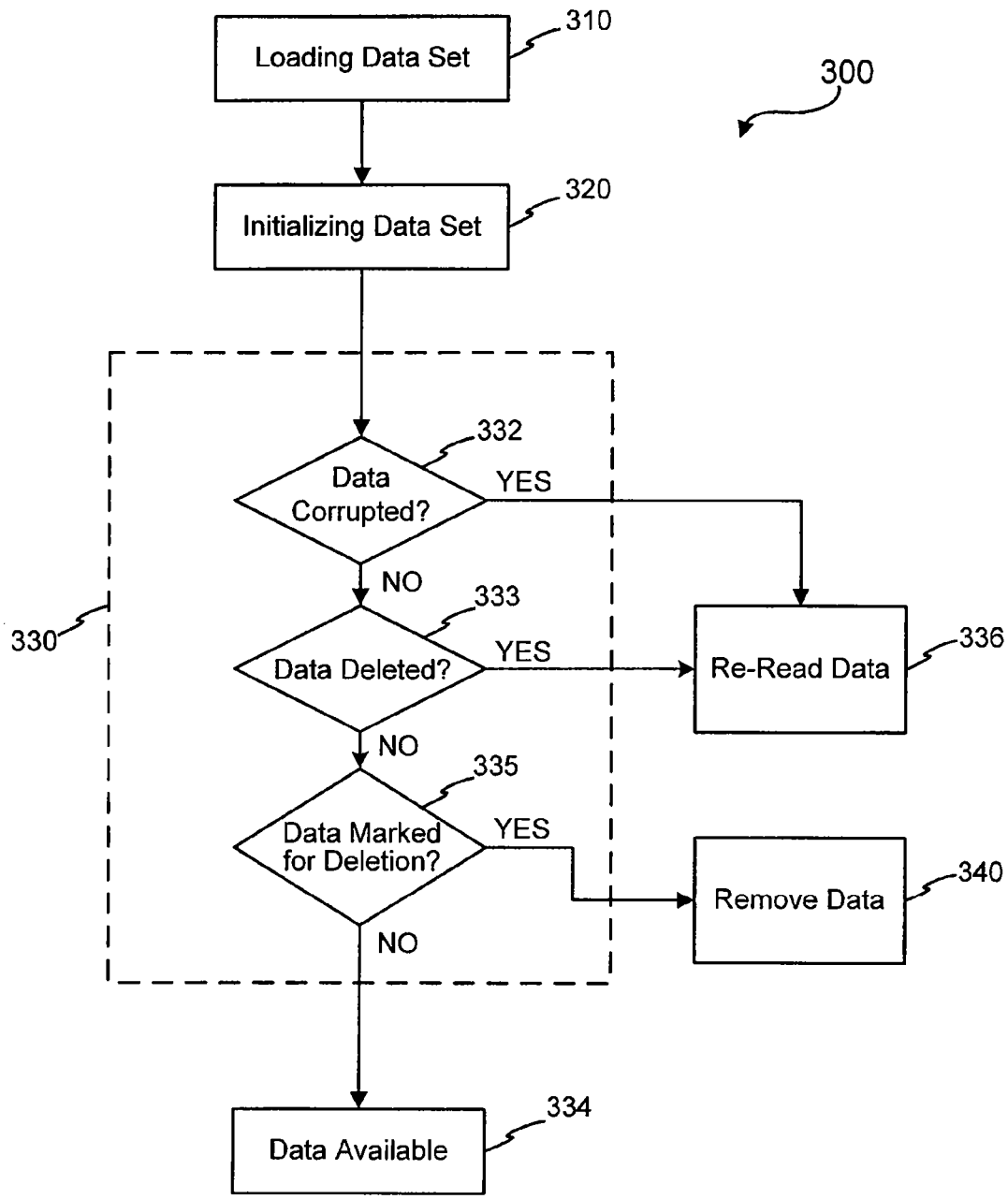
FIG. 3 illustrates a more detailed exemplary data set management method in accordance with an exemplary embodiment of the present invention.

Managing of the data sets (step 120) may include one or more of the following exemplary steps: add, update, modify, replace, verify, delete and/or the like. More particularly, FIG. 3 illustrates a general overview of an exemplary data set management method 300 comprising the steps of: loading a data set (step 310), initializing a data set (step 320), verifying availability of data set (step 330), and deleting a data set (step 340). In this manner, a data set may be added to a financial transaction device 240 and utilized until it is deleted. The adding and deleting steps are described in further detail with reference to FIGS. 4 and 5. Furthermore, the ability to update, modify, replace and/or delete a data set may be subject to security requirements.

In one embodiment, the various processes may include user 201 facilitating the input of information into a data management system to cause the data set to be loaded. The information may be inputted via keypad, magnetic stripe, smart card, electronic pointer, touchpad and/or the like, into a user computer 250, POS terminal, kiosk 270, ATM terminal and/or directly into merchant system 220 via a similar terminal or computer associated with merchant server 222. The information may be transmitted via any network 260 discussed herein to merchant system 220 or issuer systems 230. In another embodiment, the merchant may enter the information into an issuer system 230 on behalf to user 201. This may occur, for example, when user 201 and/or issuer system 230 authorizes the management of data sets on financial transaction device 240 over a telephone and the service representative inputs the information. In this embodiment, transaction device 240 may be updated at the next presentment opportunity such as when user 201 attempts to compete a transaction using transaction device 240.

Any suitable procedures may be utilized to determine whether a data set is currently ready for use and available (step 330). In one example, when a financial transaction device 240 is presented, the availability of the data set is verified by checking whether the data set has been corrupted or blocked (step 332), or deleted (step 333). For example, the data set may be checked to determine if the data set has been accessed or altered without permission ("corrupted") or if the data set exists or has been removed from transaction device 240 ("deleted"). The check may be performed using any suitable protocol or comparing data. If the answer to these questions is no, then the data set is available and ready for use (step 334). If the data is corrupted or blocked, subroutines may be used to attempt to retry reading the data (step 336). If the data set is marked deleted or removable, subroutines will prevent access to the data set (step 335) and remove the data set (step 340). For example, a suitable subroutine may place a DELETE "marker" on the data set which prevents the data from being transmitted during completion of a transaction. The data set may then be marked for deletion and deleted from transaction device 240 at the next presentment of the device. In similar manner, where the data set is corrupted, a CORRUPTED marker may be appended to the data set and the data set is prevented from being transmitted during completion of a transaction. The marker may be a header or trailer as discussed herein.

Figure 4:
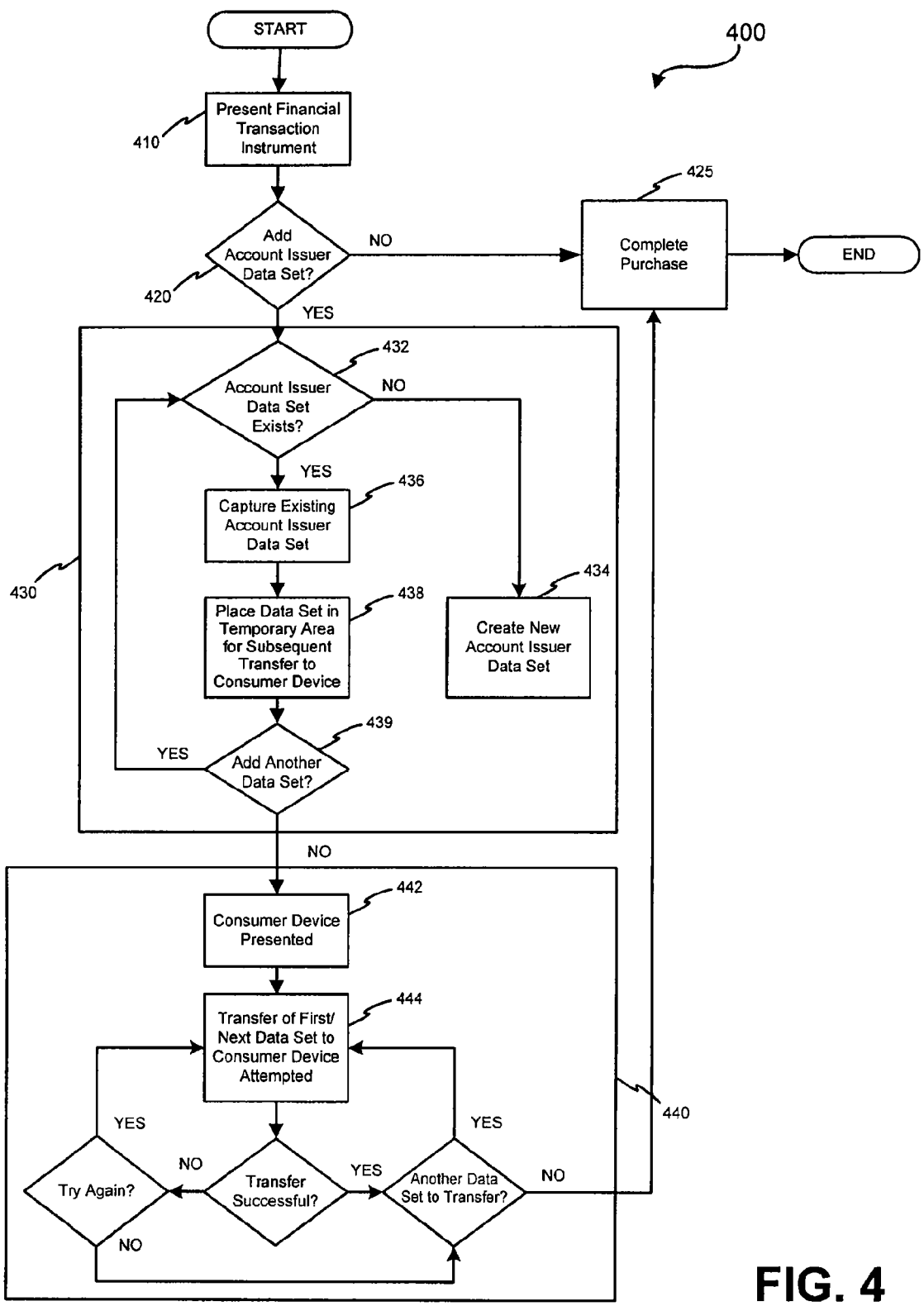
FIG. 4 illustrates an exemplary data set management method for adding data sets in accordance with an exemplary embodiment of the present invention.

Various methods may be used to add a data set to a financial transaction device 240 or to replace a data set on a financial transaction device 240. FIG. 4 illustrates an exemplary method of adding a data set to a financial transaction device 240, including the general steps of presenting financial transaction device 240 (step 410), verifying the addition of the data set to financial transaction device 240 (step 420), placing the data set in a temporary holding area (step 430), and adding the data set (step 440).

More particularly, user 201 presents financial transaction device 240 (step 410) to a interaction device 280 configured to communicate with transaction device 240. User 201 may present financial transaction device 240 at a point of purchase or to an interaction device 280 or kiosk 270. For example, user 201 may wave the RF transaction device 240 in front of a POS machine in a retail store, which is configured to receive data from the device 240. Alternatively, user 201 may present financial transaction device 240 at a self-service location such as a kiosk 270 in a mall. Moreover, user 201 may present financial transaction device 240 to a peripheral device associated with a personal computer, or the like.

User 201 is then given the opportunity to add a data set to transaction device 240. For example, interaction device 280 may detect the absence of a particular data set on transaction device 240 by searching transaction device 240 data base and comparing the existing data sets to the data set to be added. If the data set to be added is not found on the data base, user 201 may be prompted to confirm the addition of this data set to transaction device 240 (step 420). The user may be prompted via an interactive user interface displaying the option to add the data set. In one example, when user 201 presents a financial transaction device 240 to a merchant, the card reader detects the absence of a loyalty data set and provides a message on a display to user 201 or the store clerk indicating that the loyalty data set can be added if desired. User 201 may answer in the negative and complete the purchase using typical transaction methods (step 425). Alternatively, if user 201 provides an affirmative response, the algorithm may prepare a data set for communication with financial transaction device 240 (step 430). The process may determine whether the data set (or information that may be used to create the data set) exists in some form or on some device other than on financial transaction device 240 (step 432). Determining whether a data set exists may involve querying an issuer system 230, database 282, or the like. For example, issuer system 230 may compare the data set to other data sets issuer system 230 has assigned to a particular user 201. If the data set is not assigned to a particular user, then issuer system 230 may determine that the data set is available for adding to transaction device 240. Determining whether a data set exists may also take place when a store clerk verbally asks (or a screen prompts) user 201 to present another card containing the information. For example, the data set may exist on a movie rental card and stored in magnetic stripe form, bar code, and/or the like.

If the data set exists in an accessible form, the data set may be captured (step 436). In this example, user 201 may present the movie rental card and the data read from the movie rental card may then be stored in a data set associated with financial transaction device 240. For example, user 201 may desire to add a shopping loyalty card to the user's 201 financial transaction device 240. User 201 may swipe, scan or otherwise present the loyalty card such that the data set from the loyalty card is captured. The system may be further configured such that the merchant, kiosk 270, or computer system may access an issuer system 230 to obtain information for creating the data set. Thus, if user 201 does not have the movie rental card on the user's 201 person, the system 230 may prompt the clerk to request identifying/security information and to access the user's 201 account and therefore facilitate adding a movie rental data set associated with the user's 201 transaction device 240. Any other suitable methods of capturing data sets may also be used.

If the data set does not exist, a new data set may be created (step 434) for inclusion on transaction device 240. Creation of the data set may, for example, involve filling out an application, providing name and address, creating an account, and/or the like. In either event, the pre-existing or newly created data set is temporarily held in a storage area (e.g., database 282, local memory or the like) for transfer to transaction device 240 (step 438). Additional data sets may be prepared for transmittal to transaction device 240 (step 439).

In this exemplary embodiment, transaction device 240 is presented again to read/write device 280 (step 442). Read/write device 280 is configured to attempt to transfer the data set(s) to transaction device 240 (step 444). For example, existing read/write device 280 may be configured with software and/or hardware upgrades to transmit data to transaction device 240. In one exemplary embodiment, if the data sets were not transferred correctly, the process may try the transfer again. In another exemplary embodiment, data sets are added one at a time or all together. Thus, user 201 may pass a card through a card reader/writer one or more times during the addition process. The transaction may be completed (step 425) using the new data set or another selected method of payment. The same steps may be used in a self-service embodiment, however, in one embodiment, no financial transaction takes place along with the addition of data sets. It should also be noted that under appropriate circumstances, user 201 may add data sets at a point of purchase without actually completing a purchase.

In various exemplary embodiments, user 201 and/or the owner of the data set may manage the data set (i.e., steps 432-439) in advance of presenting transaction device 240. For example, user 201 on user computer 250 may choose to add or delete data sets via a website configured for management of data sets. In another example, an issuer system 230 may add functionality to an account and may desire to update the data set associated with that account. In either example, data sets that have been prepared in advance, may be ready for transmission upon presentment of transaction device 240. The transmission of the data sets may be transparent to user 201. For example, user 201 may present transaction device 240 (step 442) to complete a purchase and the waiting data sets may automatically be added to the user's 201 card (step 440).

Similar steps may be taken to replace or update data sets with new information. For example, user 201 at a point of sale may be informed of an upgrade in functionality associated with an account or other data set. Following similar steps as discussed with reference to FIG. 4, the existing data set on transaction device 240 is replaced with a new data set. Moreover, depending on permission rights and/or hierarchies in place, if any, an existing data set may be replaced with an unrelated data set. Other methods of adding and replacing data sets may also be used to manage data sets on a transaction device 240.

Figure 5:
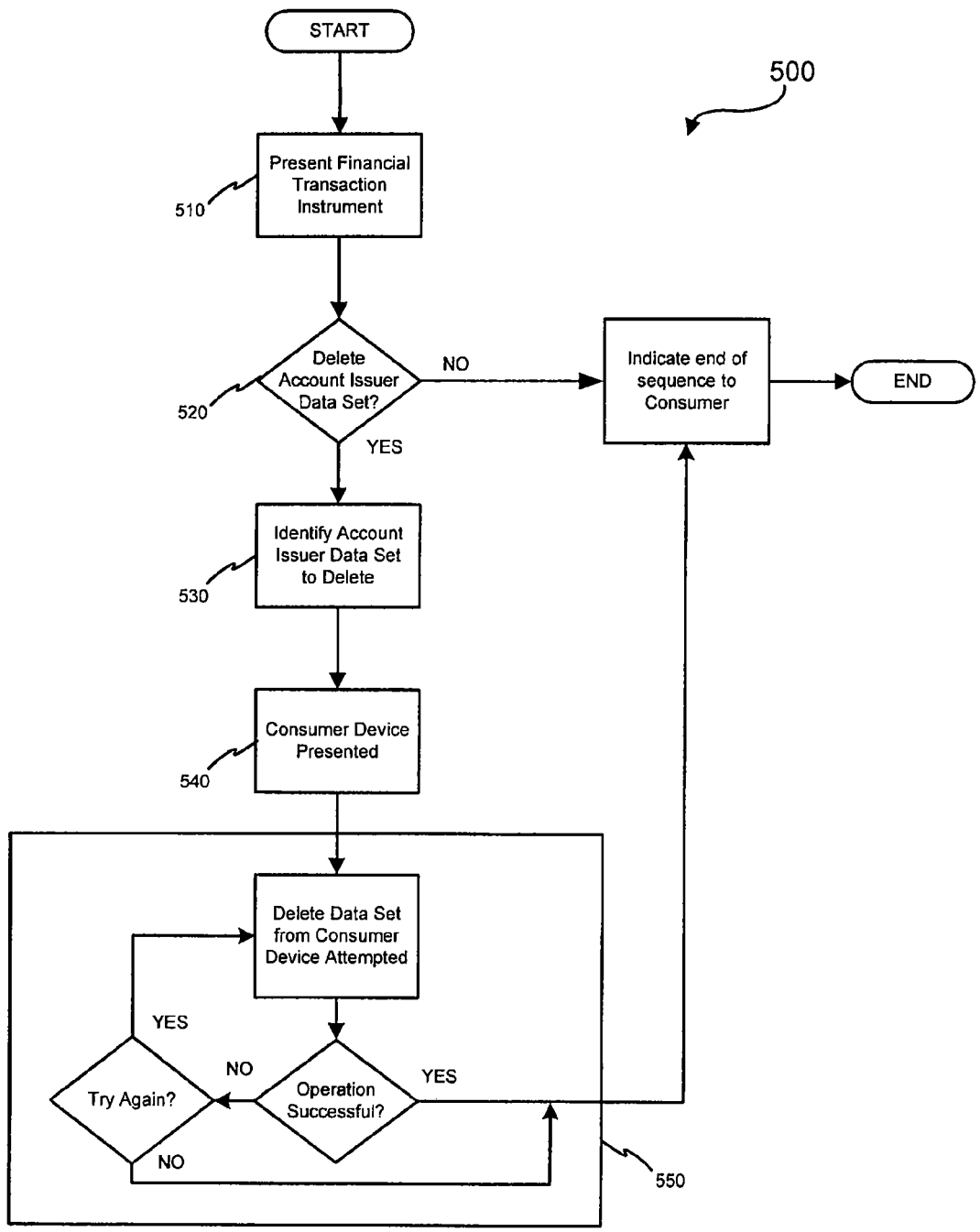
FIG. 5 illustrates an exemplary data set management method for deleting data sets in accordance with an exemplary embodiment of the present invention.

Furthermore, data sets may be deleted using any suitable techniques. For example, FIG. 5 illustrates an exemplary data set deletion method 500. User 201 presents transaction device 240 at a point of purchase, self-service location, or the like (step 510). The POS device may be configured to facilitate user 201 providing input regarding deletion of a data set (step 520). For example, the POS device may ask user 201, via a test screen, whether user 201 desires to manage the data sets on transaction device 240. Through a series of menus and/or questions, user 201 may identify data sets that user 201 desires to delete.

Furthermore, the POS device may be configured to interrogate a database 282 or specific issuer systems 230 to determine whether the deletion of a data set has been requested earlier. If user 201 requests deletion of one or more data sets, the data sets are then identified (step 530). It will be noted that step 530 may occur concurrently with step 520 or user 201 may request deletion of a specific account at this step. In other embodiments, accounts may be deleted per predefined rules or policies, and/or the like. Upon presenting transaction device 240 again, the identified data set(s) are removed from transaction device 240 (steps 540 and 550). Other methods of deleting data sets may also be used to manage data sets on a transaction device 240.

In an exemplary embodiment, management of the data sets may further include selecting preferences for use of the data sets. For example, user 201 may indicate a desire to use data set A, associated with a low interest rate credit card, as a first option, but to use data set B, associated with a higher interest rate credit card when data set A is not available. In another example, one data set may be used for purchases of gas while another data set may be used for purchasing travel tickets. The consumer data set preferences may be stored on transaction device 240 as a data set. In this example, when the card is presented, all available data sets are read and the card reader device determines which data sets are to be used based in part on the preferences stored on the card, which preferences may be updated from time to time.

In one exemplary embodiment of the present invention, transaction device 240 is a RF device configured to transmit and receive information via RF frequency. The RF transaction device 240 may be embodied in any form factor allowing presentment of transaction device 240 for payment. Typical form factors may include a watch, card, FOB, or the like. For ease in understanding, the RF transaction device may be referred to, herein, as a "FOB."

The FOB may be configured to communicate via a radio frequency transponder to the merchant systems or account systems. In yet another embodiment, the FOB may be configured to comprise two or more antennae that are both configured to send and receive information and the FOB may be responsive to different RF frequencies. In this exemplary embodiment, each antenna may be configured to communicate using a particular protocol and/or frequency. Thus, the FOB may be configured to communicate with two or more interaction devices 280 that each communicate with the FOB using different transmission frequencies. For more information on dual antenna fobs, see U.S. patent application Ser. No. 10/192,488, filed Jul. 9, 2002, by inventors Michael J. Berardi, et al., and entitled "SYSTEM AND METHOD FOR PAYMENT USING RADIO FREQUENCY IDENTIFICATION IN CONTACT AND CONTACTLESS TRANSACTIONS" and its progeny, which are hereby incorporated by reference.

Figure 6:
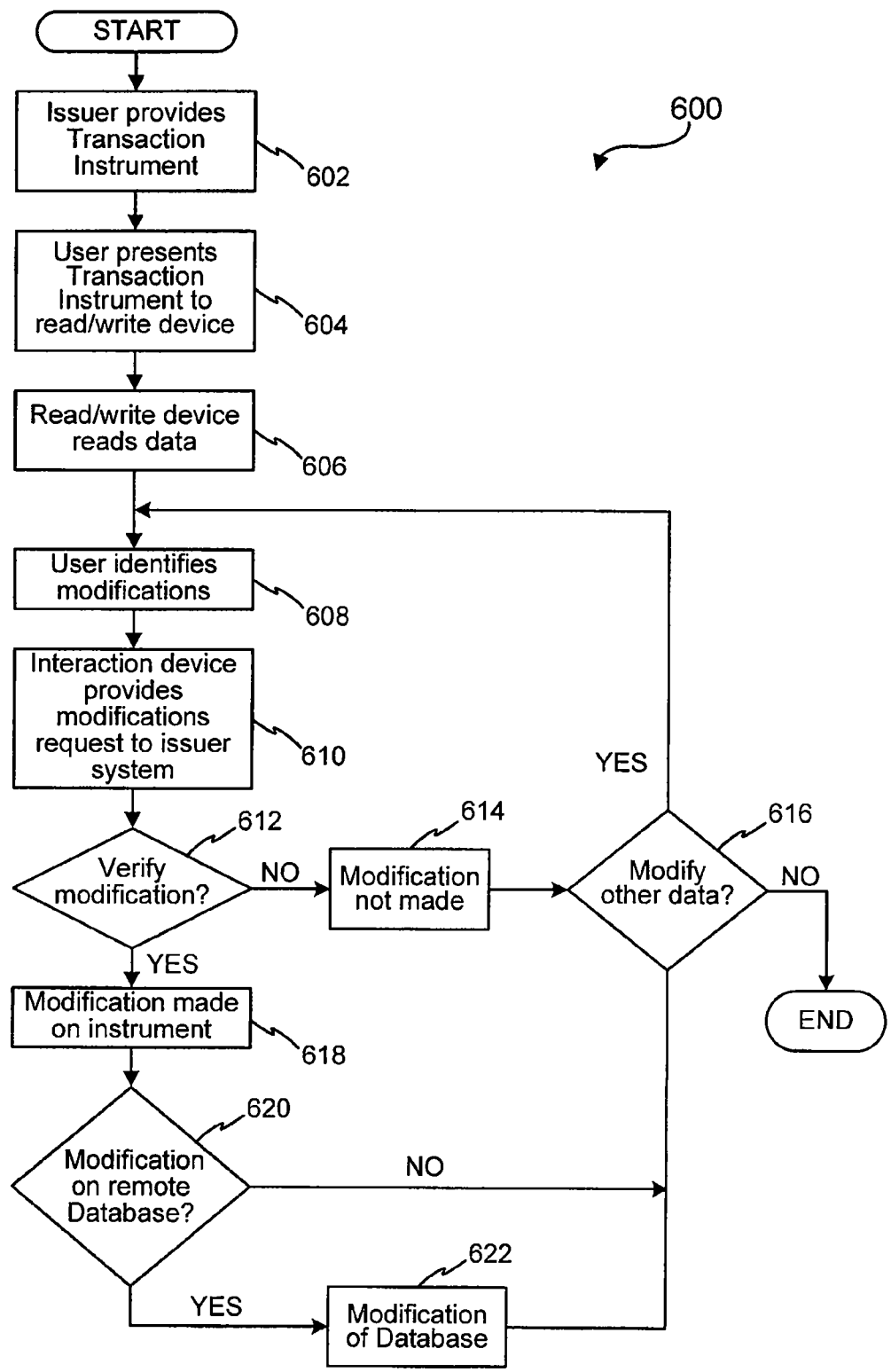
FIG. 6 illustrates an exemplary method for user-self-management of data sets in accordance with an exemplary embodiment of the present invention.
Figure 7:
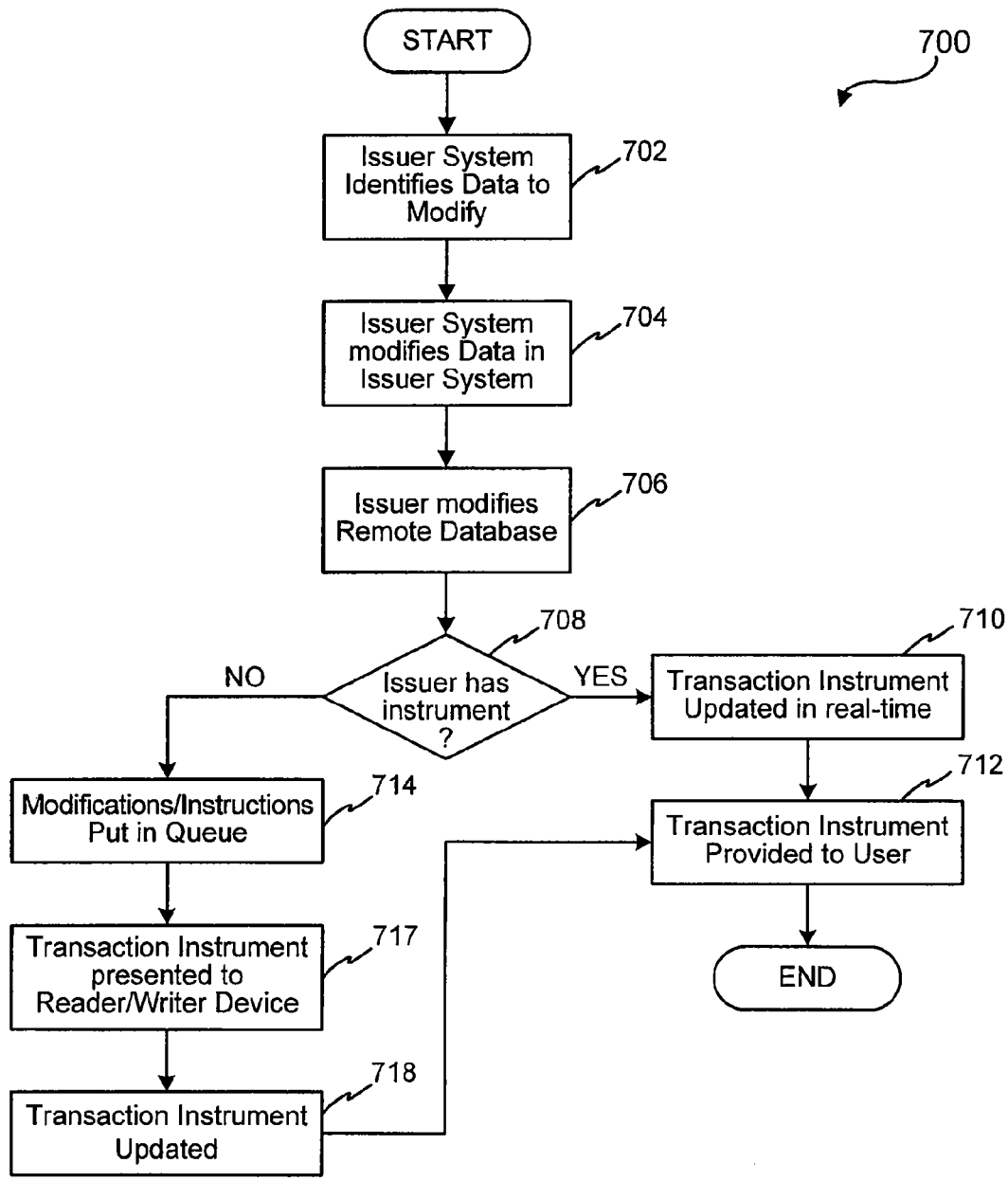
FIG. 7 illustrates an exemplary method for issuer management of data sets in accordance with the present invention.

As noted, the data associated with transaction device 240 may be modified by user 201 and/or by issuer system 230. FIGS. 6 and 7 respectively, depict exemplary methods for user 201 and issuer system 230 data management. For example, with respect to user 201 self-management, issuer system 230 may provide user 201 with a transaction device 240 (step 602). Transaction device 240 may be provided with pre-stored issuer-owned data, or transaction device 240 may be configured to permit user 201 to add the data at a later date. User 201 may the present transaction device 240 to read/write device 280 for initiating the self-management process (step 604). The read/write device 280 may then read the data on transaction device 240, and provide the data to an interaction device 290 for displaying to user 201 (step 606). Alternatively, interaction device 290 may provide user 201 a list of available data to be added to transaction device 240.

User 201 may then be permitted to identify which data-user 201 wishes to modify (step 608). Identification of the data may include providing the data with a trailer or header indicating the action to be taken (e.g., add, delete, augment, overwrite, etc.). The header and an indicator of the data to be modified may then be provided to issuer system 230 (step 610) for verification as to whether such desired modifications are available to user 201 (step 612). If the desired modifications are not available, the modifications will not be made and user 201 is notified accordingly (step 614). User 201 may then be permitted to identify whether other data is to be modified (step 616). If so (step 608), interaction device 290 may provide a request for modification to the issuer system 203 (step 610) and the verification process is repeated.

Alternatively, where issuer system 230 verifies that the modifications may be made (step 612), interaction device 290 may make the modifications to the appropriate data on transaction device 240 (step 618). Additionally, where the system 200 includes a remote database 282 for storing a mirror image of the data contained on transaction device 240 (step 620), interaction device 290, or issuer system 230, may facilitate modification of the remote database 282 (step 622). User 201 may then be permitted to select other data sets to modify (step 616), in similar manner as was described above.

In either case, where the modifications are complete, user 201 may then present transaction device 240 to a merchant for use in completing a transaction.

FIG. 7 depicts an exemplary method wherein issuer system 230 manages the data contained on transaction device 240. For example, the issuer may identify on issuer system 230 which data sets are to be modified (step 702). The modifications may then be made to the corresponding data set stored on issuer system 230 (step 704). Where the system 200 includes a remote database 282, issuer system 230 may provide the modifications/instructions to database 282 for updating database 282 accordingly (step 706).

In addition, issuer system 230 may query as to whether issuer system 230 is in possession of transaction device 240 for making the modifications to the data set on transaction device 240 in real-time or substantially real-time (step 708). If so, the modifications are made accordingly (step 710) and transaction device 240 may then be provided to user 201 for use in completing a transaction using the distinct data sets modified (step 712).

Where issuer system 230 is not in possession of transaction device 240 at the time the issuer determines that modifications to the data on transaction device 240 are to be made (step 708), the modifications may be made on issuer system 230 (step 704), and may be placed in queue, for uploading to transaction device 240 when it is next presented to issuer system 230 or to an appropriate read/write device 280 (step 714). When transaction device 240 is presented thusly (step 716), issuer system 230 may be notified that transaction device 240 is available for modifying, and issuer system 230 may then provide the instructions for modification (e.g., modified data including headers) to the appropriate read/write device 280 for modifying transaction device 240 (step 718). Transaction device 240 may then be provided to user 201 for use in completing a transaction (step 712).

Figure 8:
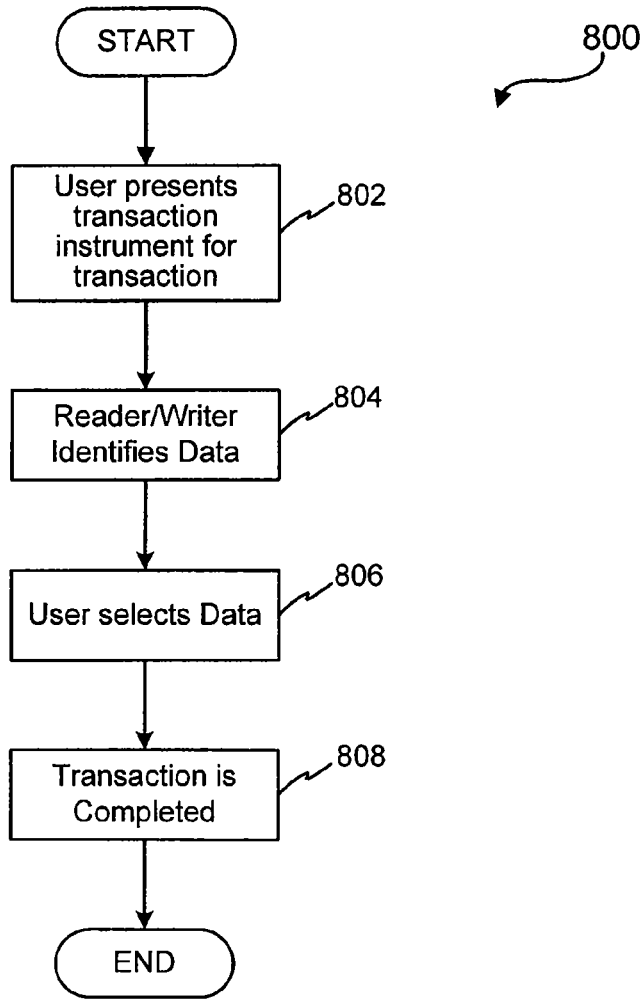
FIG. 8 illustrates an exemplary data set selection method for use in completing a transaction.

As noted, transaction device 240 may include multiple data sets which correspond to distinct issuer systems 230, and which may be used to complete a transaction. User 201 may be permitted to choose which data set to use for transaction completion. FIG. 8 illustrates an exemplary method by which user 201 may choose which of the data sets to use to complete a transaction. For example, user 201 may present transaction device 240 to a merchant system 220 for use in completing a transaction (step 802). Merchant system 220 may then read the data stored on transaction device 240 and report to user 201 all distinct data sets which may be used to complete a transaction (804). User 201 may then select the appropriate data set (step 806) and the transaction is completed accordingly (step 808).

It should be noted that completion of a transaction may be performed under any business as usual standard employed by the merchant and/or issuer system 230. For example, merchant server 222 may be configured to communicate transaction data to the appropriate issuer system 230, in real-time or substantially real-time, or by using batch processing at the end of each day. Any suitable means for delivering the transaction data to issuer systems 230 may be used. In one exemplary embodiment of the present invention, the transaction data may be delivered to issuer system 230 via a network 260. Issuer system 230 may receive the transaction information and process the transaction under issuer defined protocol independent of any other protocol used by other issuers to process a transaction. Issuer system 230 may receive the transaction data and provide the merchant with the appropriate satisfaction for the transaction.

In one embodiment, the invention permits the system user 201 to present transaction device 240 containing multiple distinct data sets, and to select a particular data set for transaction completion. User 201 may select a particular data set using any form of secondary identification, such as, for example, a personal identification number (PIN), biometric identifier, voice recognition technology, retinal recognition technology, or the like. The secondary identifier may be provided to the merchant point-of-sale device 275, kiosk 270, read/write device 280, or the like, for transaction completion. In yet another embodiment, the transponder, transponder-reader, and/or transponder-reader system are configured with a biometric security system that may be used for providing biometrics as a secondary form of identification. The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof. For an explanation of systems and methods for providing a secondary form of identification for transaction completion, please see U.S. patent application Ser. No. 10/708,822, titled "SYSTEM FOR BIOMETRIC SECURITY USING A FOB," filed Mar. 26, 2004; U.S. patent application Ser. No. 10/708,823, titled "METHOD FOR BIOMETRIC SECURITY USING A TRANSPONDER," filed Mar. 26, 2004; U.S. patent application Ser. No. 10/708,824, titled "METHOD FOR BIOMETRIC SECURITY USING A TRANSPONDER-READER," filed Mar. 26, 2004; all of which are herein incorporated by reference.

To facilitate understanding of the invention, the multiple data sets contained on transaction device 240 are discussed with reference to distinct transaction account numbers associated with corresponding transaction accounts maintained by distinct issuer systems 230. Each one of the multiple transaction account numbers, or a plurality of the transaction account numbers, may be correlated to a single issuer system 230. However, for ease in understanding, the invention is discussed with reference to a first data set correlating to a first issuer system 230, and a second data set correlated to a second issuer system 230.

In one typical example, the transaction numbers (e.g., data set) are added to transaction device 240 as discussed above. As previously noted, each transaction number is ordinarily stored on transaction device 240 distinct from the other transaction numbers stored thereon. The transaction account numbers may include a routing number, transit number, bank identification number (BIN), or the like, which is used to identify issuer system 230 that maintains the transaction account corresponding to the transaction account number. The transaction account number may additionally include a user account number, which is used by issuer system 230 to identify the transaction account to be used to complete the transaction. In one exemplary embodiment, issuer system 230 stores the user account number on the issuer system database correlative to the transaction account in such manner that issuer system 230 may retrieve the transaction account for transaction completion by, for example, referencing the user account number.

The transaction account may be maintained on issuer system 230 in an issuer system database (not shown). In conventional methods for transaction completion, when a system user 201 requests completion of a transaction, user 201 may present transaction device 240 to a merchant system POS 275. Transaction device 240 may provide the transaction account number to merchant system 220, and the merchant system may forward a request for transaction authorization (e.g., merchant transaction request) to issuer system 230. Merchant system 220 provides the merchant transaction request over a network (e.g., network 260) to issuer system 230 corresponding to the routing number included in the transaction account number. When issuer system 230 receives a transaction request from a merchant system 220, issuer system 230 ordinarily retrieves the transaction account corresponding to the user account number from the issuer system database, and processes the transaction request under the issuer system's business as usual standards.

In some conventional transaction processing methods, issuer system 230 may require user 201 to provide a secondary form of identification prior to authorizing a transaction. For example, issuer system 230 may receive a transaction request from a merchant system 220, and return instructions to merchant system 220 to prompt user 201 to provide a PIN. Merchant system POS 275 may require user 201 to provide the PIN prior to further processing the transaction request. User 201 may provide the PIN to merchant system 220 using, for example, a conventional keypad as is commonly used in the industry for such purposes. Once the PIN is provided to merchant system 220, merchant system 220 may provide the PIN and any other information used to identify user 201 to issuer system 230 for PIN verification.

The conventional PIN verification process performed by issuer system 230 may include comparing the PIN to a PIN stored in the issuer system database with reference to the user's account number. If the PIN provided by user 201 matches the PIN stored correlative to the user account number on issuer system 230, then issuer system 230 may authorize completion of the merchant's transaction request. Otherwise, issuer system 230 may deny transaction authorization.

Notably, issuer system 230 may use any issuer defined protocol to compare the provided PIN to the PIN stored in the issuer database. For example, the PIN may be manipulated by issuer system 230 using any suitable algorithm or any additional information obtained from merchant system 220, user 201, or the issuer system database, and the results of the manipulation may be analyzed, or verified against any other information stored on the issuer system database. As such, the method by which issuer system 230 verifies the PIN is not limited. Any issuer system 230 defined method may be suitably employed.

In other conventional transaction processing systems, the PIN may be verified by merchant system 220. Merchant system 220 may receive the transaction account number from transaction device 240 upon initiation of a transaction by user 201. Merchant system 220 may receive the transaction account number and recognize that user 201 may need to provide a PIN to merchant system 220 for verification prior to completion of the transaction. Merchant system 220 may provide user 201 with a request for the PIN, or with notification that a PIN is required to complete the transaction. User 201 may then provide the PIN to merchant system 220 using, for example, a conventional keypad. Merchant system 220 may receive the PIN from user 201 and provide the PIN to transaction device 240. According to this PIN verification method, the transaction device database includes a user PIN against which transaction device 240 may compare the PIN provided by user 201 via merchant system 220. If the PIN provided by user 201 matches the PIN stored in the transaction device database, the merchant system may then forward the merchant's transaction request to issuer system 230 for completion. Otherwise, merchant system 220 may deny the transaction.

Figure 9:
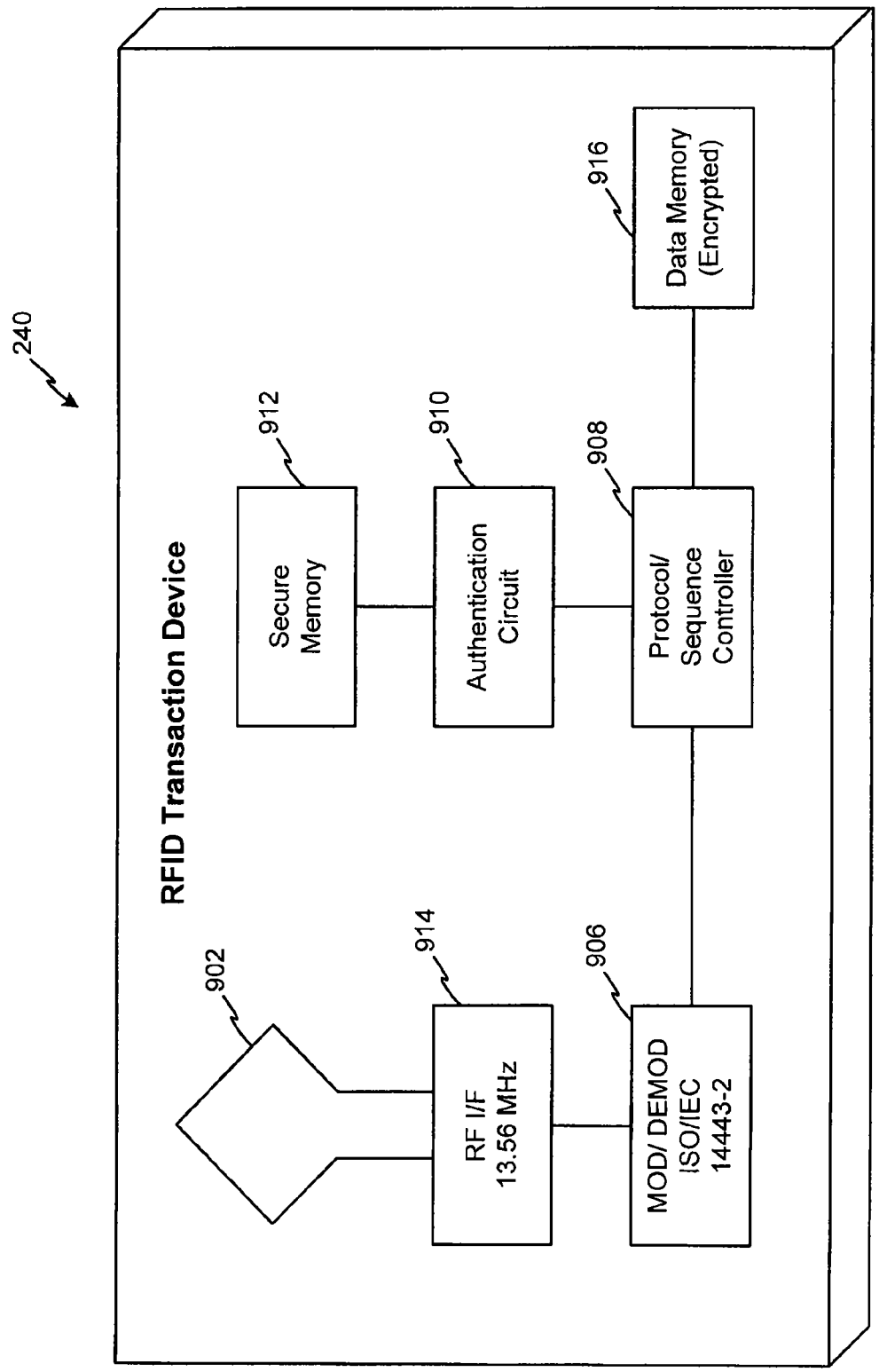
FIG. 9 illustrates a block diagram of an exemplary transaction device for use with the present invention.

FIG. 9 illustrates a block diagram of an exemplary transaction device 240 in accordance with the invention. Transaction device 240 may be a RFID transaction device 240 which may be presented by the user to facilitate an exchange of funds or points, etc., for receipt of goods or services. Transaction device 240 discussed herein may also be a "pervasive computing device," which may include a traditionally non-computerized device that is embedded with a computing unit. Examples can include watches, Internet enabled kitchen appliances, restaurant tables embedded with RF readers, wallets or purses with imbedded transponders, etc.

Transaction device 240 may include an antenna 902 for receiving an interrogation signal from RFID reader 265 via antenna 1002 (or alternatively, via external antenna 1026). Transaction device antenna 902 may be in communication with a transponder 914. In one exemplary embodiment, transponder 914 may be a 13.56 MHz transponder compliant with the ISO/IEC 14443 standard, and antenna 902 may be of the 13 MHz variety. The transponder 914 may be in communication with a transponder compatible modulator/demodulator 906 configured to receive the signal from transponder 914 and configured to modulate the signal into a format readable by any later connected circuitry. Further, modulator/demodulator 906 may be configured to format (e.g., demodulate) a signal received from the later connected circuitry in a format compatible with transponder 914 for transmitting to RFID reader 265 via antenna 902. For example, where transponder 914 is of the 13.56 MHz variety, modulator/demodulator 906 may be ISO/IEC 14443-2 compliant.

Modulator/demodulator 906 may be coupled to a protocol/sequence controller 908 for facilitating control of the authentication of the signal provided by RFID reader 265, and for facilitating control of the sending of transaction device 240 account number. In this regard, protocol/sequence controller 908 may be any suitable digital or logic driven circuitry capable of facilitating determination of the sequence of operation for transaction device 240 inner-circuitry. For example, protocol/sequence controller 908 may be configured to determine whether the signal provided by the RFID reader 265 is authenticated, and thereby providing to the RFID reader 265 the account number stored on transaction device 240.

Protocol/sequence controller 908 may be further in communication with authentication circuitry 910 for facilitating authentication of the signal provided by RFID reader 265. Authentication circuitry 910 may be further in communication with a non-volatile secure memory database 912. Secure memory database 912 may be any suitable elementary file system such as that defined by ISO/IEC 7816-4 or any other elementary file system allowing a lookup of data to be interpreted by the application on the chip. Database 912 may be any type of database or file system such as simple flat file or a hierarchical file structure such as defined by ISO/IEC 7816 standard. Database 912 may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is in an exemplary embodiment the same. However, data tables having similar, though not identical, data in the key fields may also be merged by using AGREP, for example.

The data may be used by protocol/sequence controller 908 for data analysis and used for management and control purposes, as well as security purposes. Authentication circuitry 910 may authenticate the signal provided by RFID reader 265 by association of the RFID signal to authentication keys stored on database 912. Encryption circuitry may use keys stored on database 912 to perform encryption and/or decryption of signals sent to or from the RFID reader 265.

In addition, protocol/sequence controller 908 may be in communication with a database 916 for storing at least transaction device 240 account data, and a unique transaction device 240 identification code. Protocol/sequence controller 908 may be configured to retrieve the account number from database 916 as desired. Database 916 may be of the same configuration as database 912 described above. The transaction device account data and/or unique transaction device identification code stored on database 916 may be encrypted prior to storage. Thus, where protocol/sequence controller 908 retrieves the account data, and or unique transaction device identification code from database 916, the account number may be encrypted when being provided to RFID reader 265. Further, the data stored on database 916 may include, for example, an unencrypted unique transaction device 240 identification code, a user identification, Track 1 and 2 data, as well as specific application applets.

Figure 10:
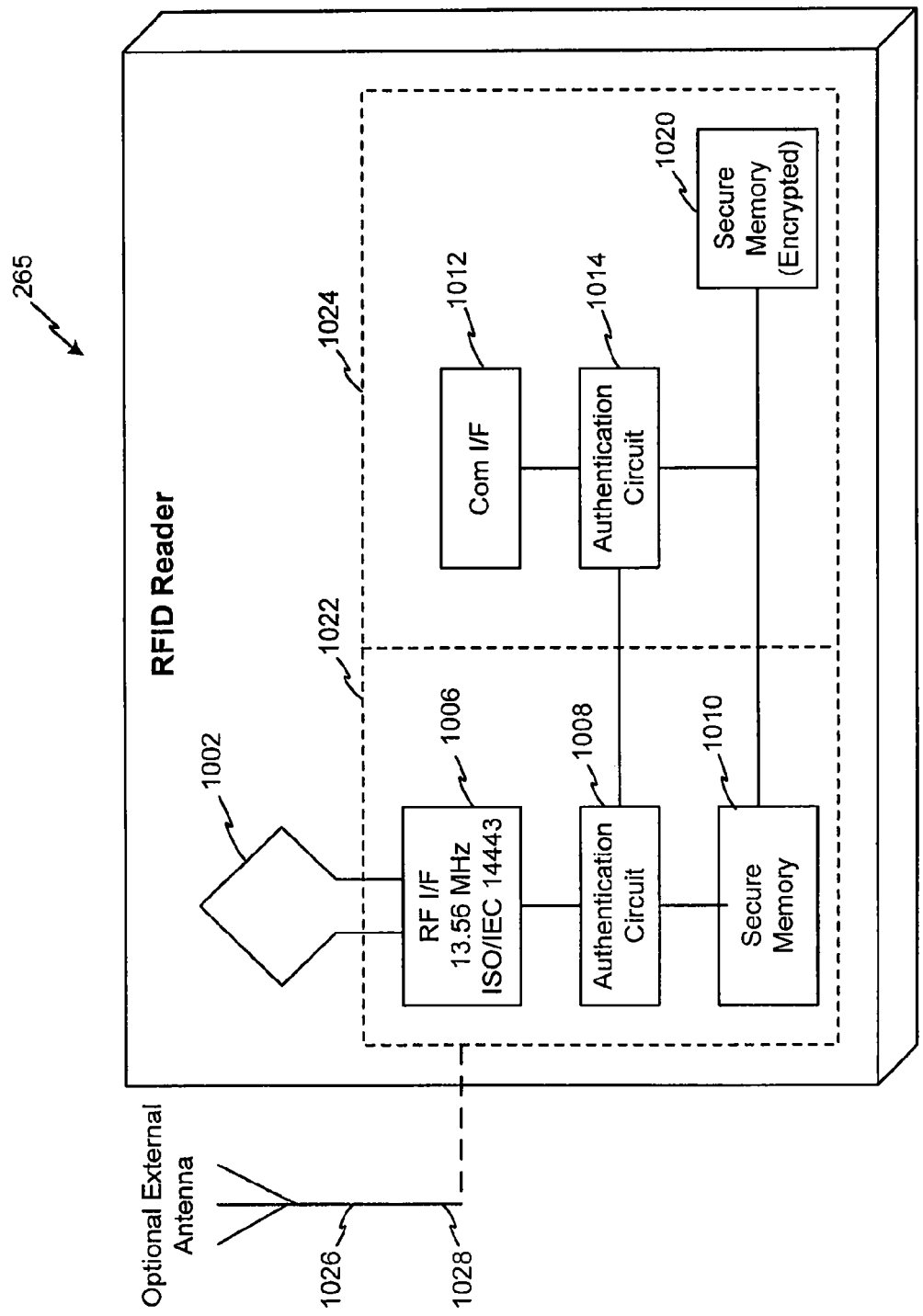
FIG. 10 illustrates a block diagram of an exemplary Radio Frequency Identification (RFID) reader for use with the present invention.

FIG. 10 illustrates an exemplary block diagram of a RFID reader 265 in accordance with an exemplary embodiment. RFID reader 265 includes, for example, an antenna 1002 coupled to a RF module 1022, which is further coupled to a control module 1024. In addition, RFID reader 265 may include an antenna 1026 positioned remotely from the RFID reader 265 and coupled to RFID reader 265 via a suitable cable 1028, or other wire or wireless connection.

RF module 1022 and antenna 1002 may be suitably configured to facilitate communication with transaction device 240. Where transaction device 240 is formatted to receive a signal at a particular RF frequency, RF module 1022 may be configured to provide an interrogation signal at that same frequency. For example, in one exemplary embodiment, transaction device 240 may be configured to respond to an interrogation signal of about 13.56 MHz. In this case, RFID antenna 1002 may be 13 MHz and may be configured to transmit an interrogation signal of about 13.56 MHz.

Further, protocol/sequence controller 1014 may include an optional feedback function for notifying the user of the status of a particular transaction. For example, the optional feedback may be in the form of an LED, LED screen and/or other visual display which is configured to light up or display a static, scrolling, flashing and/or other message and/or signal to inform transaction device 240 user or any other third party that the transaction is initiated (e.g., transaction device is being interrogated), the transaction device is valid (e.g., transaction device is authenticated), transaction is being processed, (e.g., transaction device account number is being read by RFID reader) and/or the transaction is accepted or denied (e.g., transaction approved or disapproved). Such an optional feedback may or may not be accompanied by an audible indicator (or may present the audible indicator singly) for informing transaction device 240 user of the transaction status. The audible feedback may be a simple tone, multiple tones, musical indicator, and/or voice indicator configured to signify when transaction device 240 is being interrogated, the transaction status, or the like.

RFID antenna 1002 may be in communication with a transponder 1006 for transmitting an interrogation signal and receiving at least one of an authentication request signal and/or an account data from transaction device 240. Transponder 1006 may be of similar description as transponder 914 of FIG. 9. In particular, transponder 1006 may be configured to send and/or receive RF signals in a format compatible with antenna 902 in similar manner as was described with respect to transaction device transponder 914. For example, where transponder 1006 is 13.56 MHz RF rated antenna 902 may be 13.56 MHz compatible. Similarly, where transponder 1006 is ISO/IEC 14443 rated, antenna 1002 may be ISO/IEC 14443 compatible.

RF module 1022 may include, for example, transponder 1006 in communication with authentication circuitry 1008 which may be in communication with a secure database 1010. Authentication circuitry 1008 and database 1010 may be of similar description and operation as described with respect to authentication circuitry 910 and secure memory database 912 of FIG. 9. For example, database 1010 may store data corresponding to transaction device 240 which are authorized to transact business over system 200. Database 1010 may additionally store RFID reader 265 identifying information for providing to transaction device 240 for use in authenticating whether RFID reader 265 is authorized to be provided the transaction device account number stored on transaction device database 916.

Authentication circuitry 1008 may be of similar description and operation as authentication circuitry 910. That is, authentication circuitry 1008 may be configured to authenticate the signal provided by transaction device 240 in similar manner that authentication circuitry 910 may be configured to authenticate the signal provided by RFID reader 265. In one exemplary embodiment, transaction device 240 and RFID reader 265 engage in mutual authentication. In this context, "mutual authentication" may mean that operation of the system 200 may not take place until transaction device 240 authenticates the signal from RFID reader 265, and RFID reader 265 authenticates the signal from transaction device 240. For a detailed explanation of a suitable transaction processing method and mutual authentication process for use with the invention, see, for example, U.S. patent application Ser. No. 10/192,488, titled "SYSTEM AND METHOD FOR PAYMENT USING RADIO FREQUENCY IDENTIFICATION IN CONTACT AND CONTACTLESS TRANSACTIONS," filed Jul. 9, 2002, and U.S. patent application Ser. No. 10/340,352, titled "SYSTEM AND METHOD FOR INCENTING PAYMENT USING RADIO FREQUENCY IDENTIFICATION IN CONTACT AND CONTACTLESS TRANSACTIONS," filed Jan. 10, 2003, both incorporated herein by reference.

Transaction device 240 may provide reader 265 with transaction device data for use in authenticating a transaction request at issuer system 230. For example, transaction device 240 may include a counter or random number generator (not shown) which may be provided to the issuer system for use in transaction device 240, reader 265, or transaction verification. The issuer system 240 may receive the counter or random number for use in determining whether to authorize the transaction. Suitable methods for using a counter or random number generator are disclosed in, for example, U.S. patent application Ser. No. 10/708,547, titled "SYSTEM AND METHOD FOR SECURING RF TRANSACTIONS USING A RADIO FREQUENCY IDENTIFICATION DEVICE INCLUDING A RANDOM NUMBER GENERATOR," filed Mar. 10, 2004, and U.S. patent application Ser. No. 10/708,545, titled "SYSTEM AND METHOD FOR SECURING RF TRANSACTIONS USING A RADIO FREQUENCY IDENTIFICATION DEVICE INCLUDING A TRANSACTIONS COUNTER," filed Mar. 10, 2004, both incorporated herein by reference.

In accordance with the present invention, transaction device 240 may include multiple transaction account numbers stored on RFID transaction device database 912 (or secure memory 916). Each transaction account numbers stored thereon may be associated with a distinct PIN for use by merchant system 220 or issuer system 230 in verifying or authorizing a transaction. For example, a first transaction account number (e.g., first data set) may be associated with a first PIN on issuer system 230 or on the transaction device database 912, 916, and a second transaction account number (e.g., second data set) may be associated with a second PIN on issuer system 230 or on the transaction device database 912, 916, where the first transaction account number is distinct and different from the second transaction account number and the first PIN is distinct and different from the second PIN.

Upon presentment of transaction device 240 to reader 265 for transaction completion, transaction device 240 may provide reader 265 with information relative to the multiple transaction account numbers contained in the transaction device database 912, 916. Reader 265 may then inform user 201 that multiple transaction accounts are available on the transaction device database 912, 916 for use in transaction completion. Reader 265 may notify user 201 audibly, for example, by reciting specific information relative to each transaction account number. For example, reader 265 may audibly notify user 201 that a particular transaction account number is one issued by a particular issuer system 230. Reader 265 may request that user 201 select at least one of the transaction accounts contained on the database 912, 916 for use in transaction completion.

Figure 11:
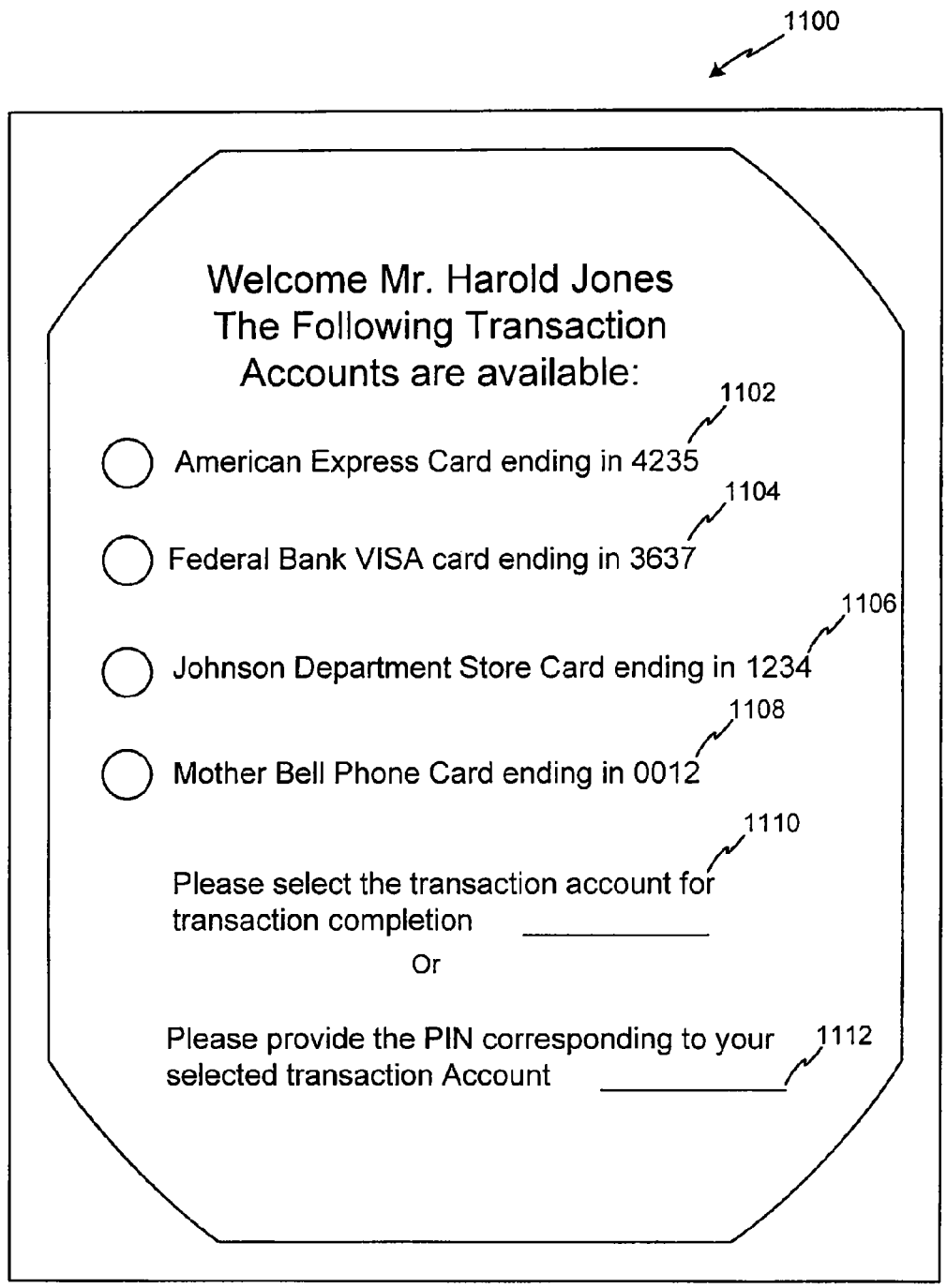
FIG. 11 depicts an exemplary screen shot providing a system user with a listing of transaction account numbers stored on an transaction device that is available for completing a transaction, in accordance with the present invention.

In another exemplary embodiment, reader 265 (or merchant system 220) may be configured to provide to user 201 a listing of the multiple transaction accounts contained on database 912. In this exemplary embodiment, reader 265 (or merchant system 220) may be equipped with a display screen (not shown) for displaying the multiple accounts to user 201. FIG. 11 depicts an exemplary screen shot 1100 of a display screen that may be presented to user 201 for transaction account selection. Screen shot 1100 may include a listing of transaction account numbers 1102-1108, which may correspond to the transaction account numbers (e.g., data sets) stored on the transaction device database 912, 916. For example, transaction account number 1102 corresponds to a first transaction account number (e.g., "American Express Card ending in 4235"); transaction account number 1104 corresponds to a second transaction account number (e.g., "Federal Bank VISA Card ending in 3637"); transaction account number 1106 corresponds to a third transaction account number (e.g., "Johnson Department Store Card ending in 1234"); and transaction account number 1108 corresponds to a fourth transaction account number (e.g., "Mother Bell Phone Card ending in 0012").

User 201 may then be permitted to select which one of the transaction account numbers to use in completing the transaction. For example, user 201 may be prompted by a message 1112 to provide a PIN corresponding to the transaction account number selected. The PIN may be provided to merchant system 220 via a keypad, touch screen, or the like. The PIN may then be verified in accordance with any method described above. If the PIN is verified, the transaction may be completed under business as usual standards. Otherwise, completion of the transaction is denied.

In another exemplary embodiment, user 201 may be permitted to select a transaction account number from the screen. User 201 may be permitted to select a particular transaction account number by providing transaction account identifying information to merchant system 220. For example, where the screen is a touch sensitive screen, user 201 may select a particular transaction account by touching the appropriate transaction account on the screen 1100, or by providing transaction account identifying information to the screen in accordance with the message 1110 provided by to user 201. In some instances, user 201 may select a particular transaction account by providing merchant system 220 with a PIN which correlates with the selected transaction account. As such, issuer system 230 or merchant system 220 may verify whether a PIN is required to complete the transaction using the transaction number selected. The PIN may be verified under any merchant system 220 or issuer system 230 defined protocols. If a PIN is required, then user 201 may be prompted to provide the required PIN to the keypad prior to completing the transaction. If the system user does not provide a PIN, or alternatively provides an incorrect PIN, merchant system 220 or issuer system 230 may terminate the transaction request.

Figure 12:
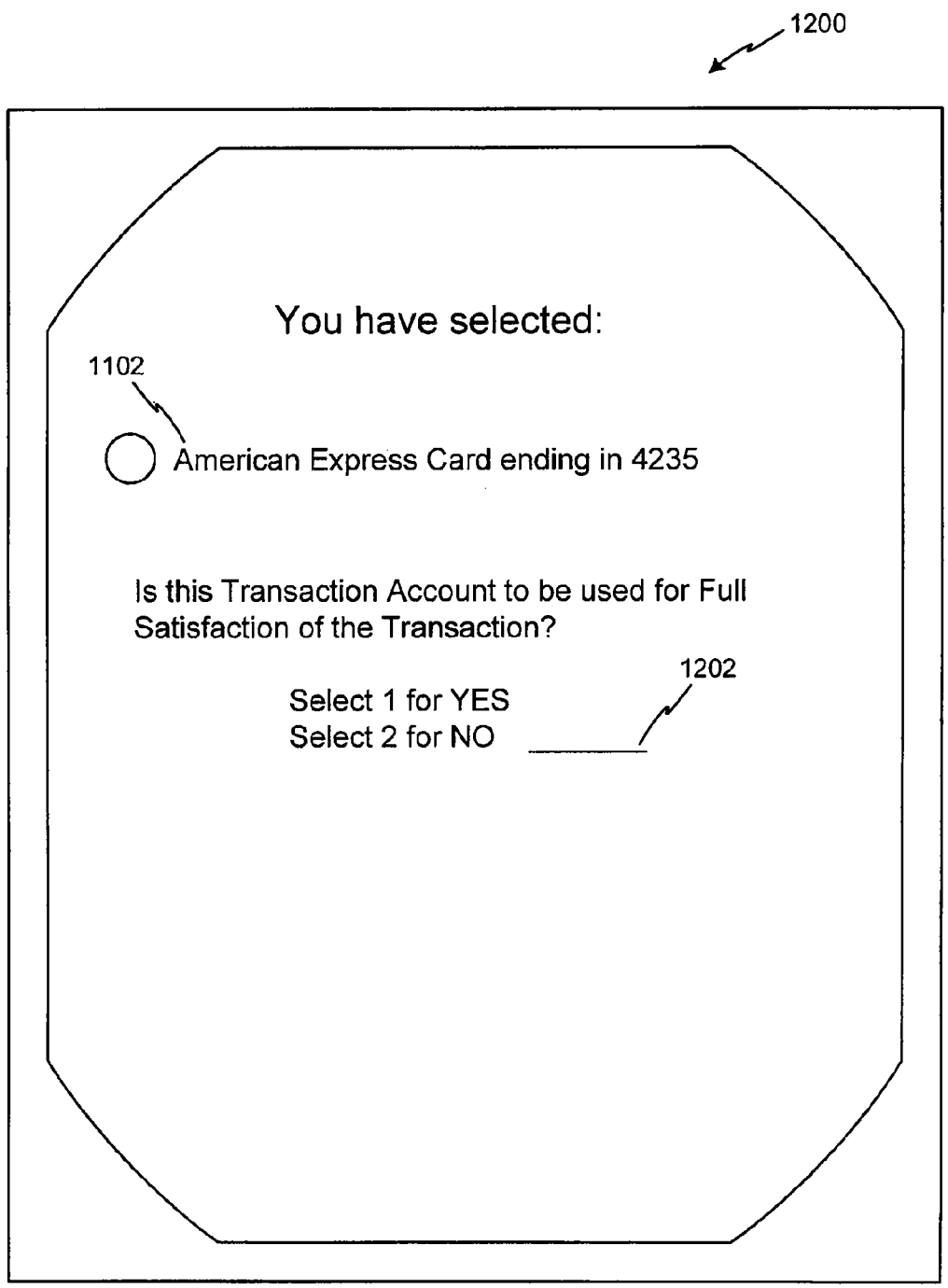
FIG. 12 depicts an exemplary screen shot providing a system user the opportunity to allocate a portion of the transaction to be satisfied to a user selected transaction account number, in accordance with the present invention.

In yet another embodiment of the invention, user 201 may be permitted to select more than one of the transaction account numbers contained on the transaction device database for transaction completion. User 201 may be permitted to allocate portions of the transaction request to multiple transaction account numbers for transaction satisfaction. For example, FIG. 12 depicts a second screen shot 1200 that reader 265 may provide to user 201 subsequent to the selection of a particular transaction account number. For example, user 201 may elect to use a first transaction account number 1102 for full satisfaction of the transaction request. The screen shot 1200 may provide a message 1202 prompting user 201 to identify whether the selected account is to be used for full satisfaction of the transaction request. If so, then merchant system 220 may process the transaction request under business as usual standards using the first transaction account number 1102. Merchant system 220 may provide the first transaction account number 1102 to issuer system 230 for verification and transaction authorization.

Figure 13:
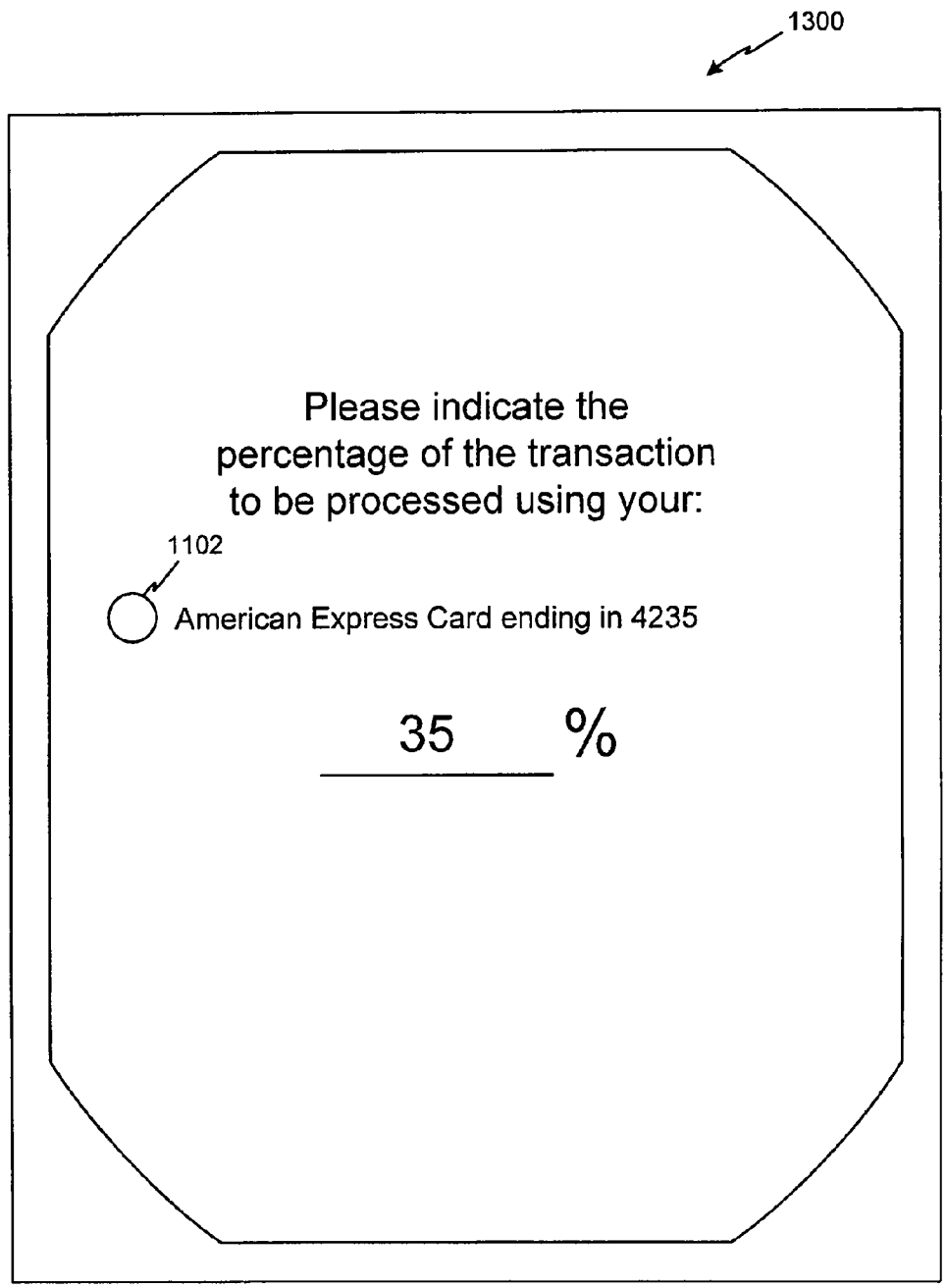
FIG. 13 depicts an exemplary screen shot providing a system user the opportunity to identify a portion of a transaction request to be satisfied by a user selected transaction account number, in accordance with the present invention.
Figure 14:
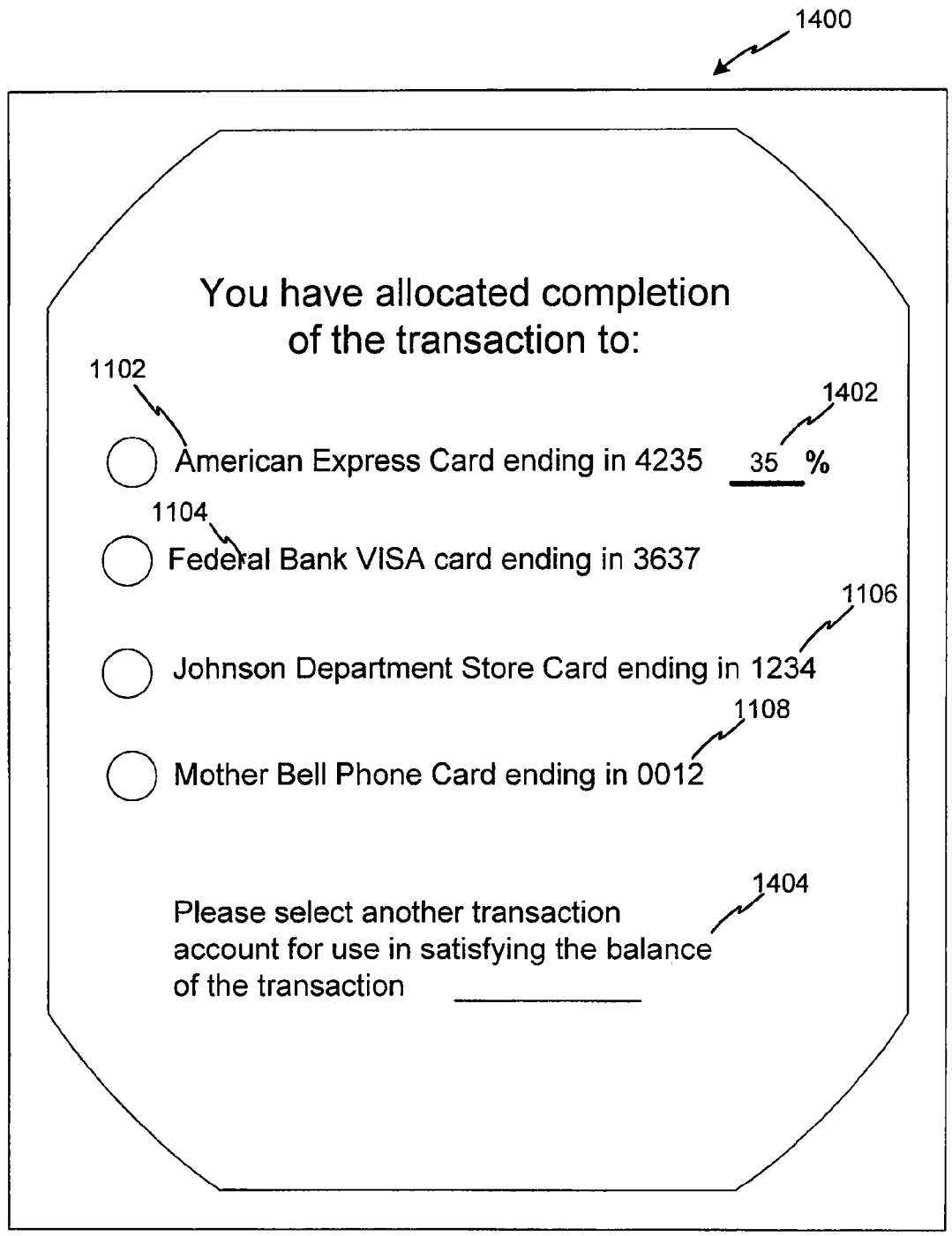
FIG. 14 depicts a subsequent listing of transaction accounts stored on the transaction device, which are available for transaction completion, in accordance with the present invention.

If user 201 elects to allocate portions of the transaction request to multiple transaction account numbers for transaction satisfaction, reader 265 or merchant system 220 may permit user 201 to identify the portion of the transaction request to allocate to a particular transaction account number. For example, user 201 may desire to allocate 35% of the transaction to a first transaction account number 1102 and 65% to a second transaction account number. In this instance, at the screen shot 1200, user 201 may select a first transaction account number, and indicate that the first transaction account number is not to be used for full satisfaction of the transaction request. Reader 265 or merchant system 220 may then provide user 201 with a screen shot permitting user 201 to indicate which portion of the transaction request to allocate to the first transaction number. User 201 may indicate which portion to allocate by, for example, providing the key pad with information identifying the allocated portion. In the example illustrated in FIG. 13, user 201 is prompted by message 1302 to provide what percentage of the transaction request is to be allocated to a first transaction account number 1102. As shown, screen shot 1300 indicates that 35% of the transaction is to be allocated to the first transaction account number 1102. Once user 201 indicates the portion, reader 265 or merchant system 220 may return user 201 to a subsequent listing of the available transaction account numbers for use in completing the transaction. The subsequent listing of available transaction account numbers may include all of the transaction account numbers contained on the transaction device database 912, 916, or only those transaction account numbers not yet selected by user 201. Alternatively, the subsequent listing may include notification of which transaction account number user 201 has previously selected. As shown in FIG. 14, a screen shot 1400 may include the subsequent listing which may additionally include the relevant information pertaining to the allocation made to the first transaction account number 1102 by user 201. For example, screen shot 1400 may include the selected first transaction account number 1102 and the corresponding amount 1402 allocated thereto. User 201 may be permitted to select additional transaction account numbers from the subsequent listing for allocation of portions of the transaction request, or for use in satisfying the balance of the transaction request. For example, user 201 may be provided a message 1404 requiring user 201 to select additional accounts for use in transaction completion. User 201 may be required to select additional transaction account numbers from the subsequent list until the totality of the transaction is satisfied.

User 201 may be provided screen shots shown in FIGS. 11-14 and the process repeated until the appropriate portions, or all portions, of the transaction request are fully satisfied.

Figure 15:
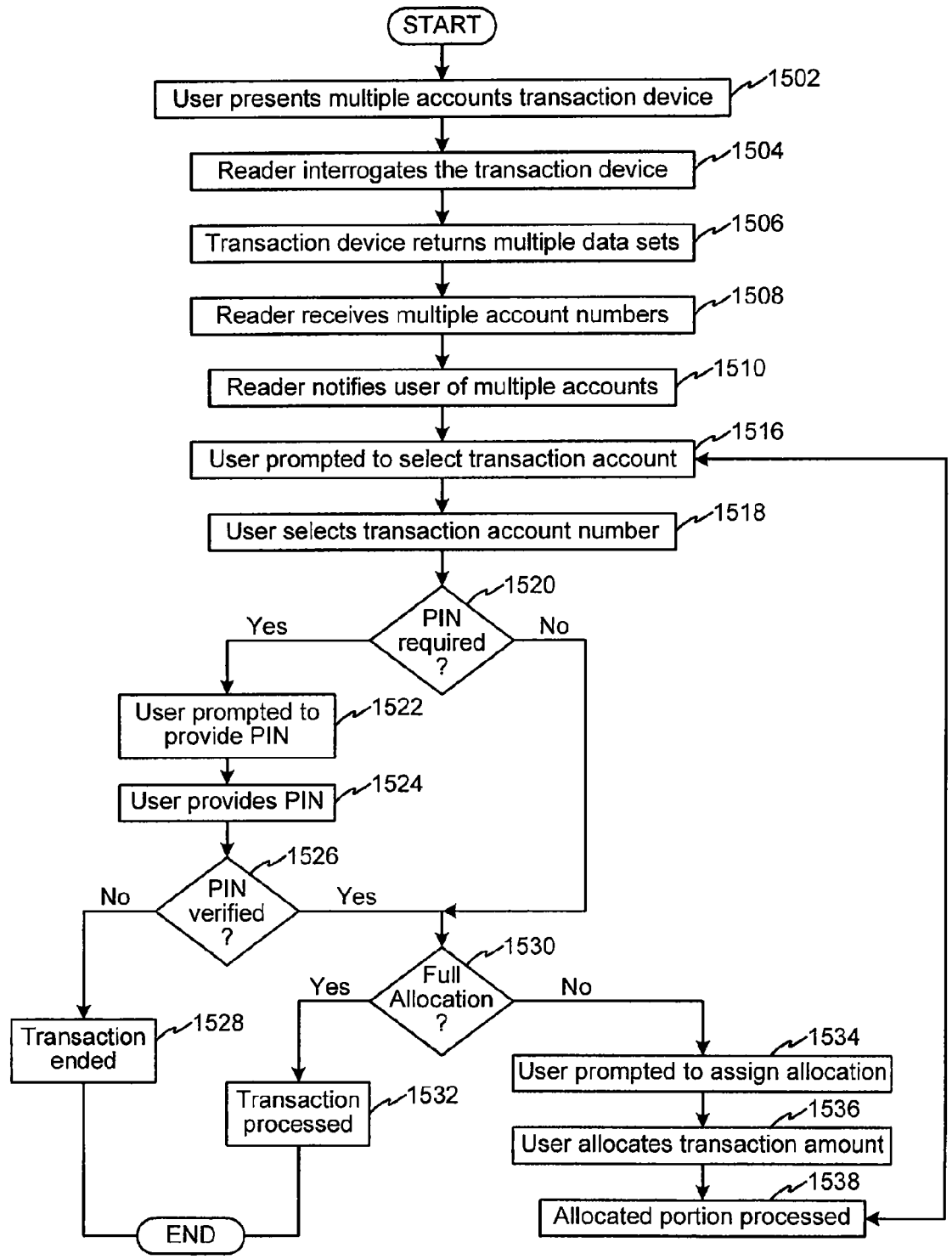
FIG. 15 depicts an exemplary method for selecting one of a multiple transaction accounts for transaction completion, in accordance with the present invention.

FIG. 15 illustrates an exemplary method for selecting from amongst the multiple transaction account numbers contained on the transaction device database 912, 916. The method begins with user 201 presenting the multiple accounts transaction device 240 for completion of a transaction (step 1502). In presenting transaction device 240, user 201 may place the transaction device within the interrogation zone of a RFID reader 265. Reader 265 interrogates the transaction device and transaction device 240 and reader 265 may engage in mutual authentication (step 1504). Once transaction device 240 and reader 265 successfully mutually authenticate, transaction device 240 is provides reader 265 with transaction account information contained in the transaction device database 912, 916. For detailed description of a suitable interrogation and mutual authentication process for use with the invention, please refer to U.S. patent application Ser. No. 10/192,488, incorporated by reference above.

Upon successful interrogation and authentication, transaction device 240 provides reader 265 with the multiple transaction account numbers stored on the transaction device database 912, 916 (step 1506). In one example, the transaction device protocol/sequence controller 908 sends a signal to database 912, 916 and the database 912, 916 provides the multiple transaction account numbers to the protocol/sequence controller 908. The protocol sequence controller 908 may receive the multiple transaction account numbers and provides the multiple transaction account numbers to modulator/demodulator 906, which in turn provides the multiple transaction account numbers to transaction device transponder 914. Transponder 914 may provide the multiple transaction account numbers to transaction device antenna 902, and antenna 902 may provide the multiple transaction account numbers to reader 265, via reader antenna 1002 (or optional external antenna 1026).

Reader 265 may receive the transaction account numbers (step 1508) and provide notice to user 201 that multiple transaction account numbers are present on transaction device 240 that are available for use in completing a transaction request (step 1510). Reader 265 may receive the transaction account numbers at reader transponder 1006 via reader antenna 1002. Transponder 1006 may additionally provide the multiple account numbers to a reader or merchant display screen (not shown) for use in displaying the transaction account numbers to user 201. For example, the reader protocol sequence controller 1014 may provide a signal to the reader communications interface 1012, which commands the interface 1012 to receive the multiple transaction account numbers and provide the multiple transaction account numbers to the display screen.

Reader 265 may then prompt user 201 to select at least one of the multiple transaction account numbers for use in transaction completion (step 1516). For example, the reader or merchant display screen may provide user 201 with a screen shot, such as, for example, screen shot 1100 shown in FIG. 11. The screen shot 1100 may include a listing of the multiple transaction account numbers contained on the transaction device database 912, 916, which are available for use in transaction completion. The screen shot 1100 may be configured to permit user 201 to select one of the transaction account numbers, and the screen may provide the transaction account number to reader 265 or merchant system 220 for processing (step 1518).

In some instances, the account issuer 230 that provides the transaction account number to user 201 may require user 201 to provide a PIN prior to permitting use of the transaction account number for transaction completion (step 1520). In this case, display screen may be configured to prompt user 201 to provide the appropriate PIN for verification by reader 265, merchant system 220, or issuer system 230, in any manner discussed above (step 1522). User 201 may provide the PIN (step 1524) and the PIN may be verified under merchant system 220 or issuer system 230 defined verification protocol (step 1526). If the PIN is not verified (step 1526), then merchant system 220 may terminate the transaction request (step 1528).

In some instances, issuer system 230 corresponding to the selected transaction account number may not require a PIN for a particular transaction account number to be used for transaction completion (step 1520). In which case, the transaction account number is processed and the transaction completed under the merchant system's business as usual protocol. For example, merchant system 220 may provide a request for satisfaction of a transaction request to issuer system 230, and issuer system 230 may evaluate the transaction request for transaction completion.

Alternatively, as illustrated in FIG. 12, the display screen may be configured to permit user 201 to select more than one of the multiple transaction account numbers contained on transaction device 240 for transaction completion. For example, where transaction device 240 includes multiple transaction account numbers, user 201 may allocate portions of the transaction request to the transaction account numbers for satisfaction in accordance with that portion. User 201 may elect to fully allocate the whole of the transaction request to a single transaction account number, or to separate the transaction request amongst multiple transaction account numbers (step 1530). If user 201 elects to allocate the transaction to only one of the transaction account numbers, the transaction request in process under the merchant system's business as usual standards (step 1532). For example, merchant system 220 receives the transaction account number and provides the transaction account number to the corresponding issuer system 230 by referencing issuer system 230 routing number included in the selected transaction account number. Typical methods of routing a transaction request to an issuer system 230 based on a routing number are well known and will not be discussed herein for brevity.

In another exemplary embodiment, user 201 may elect to allocate only a portion of the transaction request to a selected transaction account number (step 1530). In which case, the display screen may be configured to prompt user 201 to identify the portion of the transaction request to be allocated to the selected transaction account number. For example, display screen 1300, shown in FIG. 13, illustrates a typical prompt for use in identifying which portion of a transaction to allocate to a particular transaction account number. User 201 may identify a portion of the transaction request to be allocated (step 1536) and merchant system 220 may process the allocated portion of the transaction request in accordance with the transaction account number selected and the merchant system business as usual standards, as discussed above (step 1538). That is, the portion of the transaction request to be allocated to the transaction account number is forwarded to issuer system 230 corresponding to the routing number contained in the selected transaction account number.

User 201 may elect to satisfy the balance of the transaction request using one or more of the remaining transaction account numbers contained on the multiple transaction account device database 912, 916. In which case, reader 265 and the merchant system may provide user 201 with a subsequent list of transaction account numbers available for transaction completion and user 201 may select one or more of the transaction account numbers to satisfy the balance of the transaction request. In which case, steps 1516-1538 may be repeated until the transaction is wholly satisfied.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. It should be noted that many alternative or additional functional relationships or physical connections may be present in a practical data set management system.

As may be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus include steps for implementing the functions specified in the flowchart block or blocks.

It should be noted that although the present invention is discussed with respect to Internet Service Providers, and systems and networks which may communicate via a leased line (T1, D3, TCP/IP etc.), the invention is not so limited. The present invention contemplates conventional protocol, networks and systems which support a wide range of data transfer. For example, in accordance with this invention, a transaction may be completed using telephone lines connecting long distance carrier systems. In this instance, the issuer-owned data which may be included on transaction device 240 using any of the methods discussed herein, may be an account number which corresponds to long distance calling time such as may be done with a conventional calling card.

Where transaction device 240 is loaded with several distinct data sets, each corresponding to a distinct data set owner operating on distinct and non-compatible communications network, the user of transaction device 240 may use the instrument to complete long distance calls on each of the distinct communications network, independently of the other. This is especially useful for transaction device 240 user who may travel to different locations, where the different locations support different long distance communications network. In this exemplary embodiment, the present invention enables a user to anticipate which communications network is available in many different travel destinations, and include the corresponding mating data set on transaction device 240 prior to beginning travel. In this way, transaction device 240 user may be prepared to use transaction device 240 as a long distance calling card irrespective of his anticipated travel destination.

Figure 16:
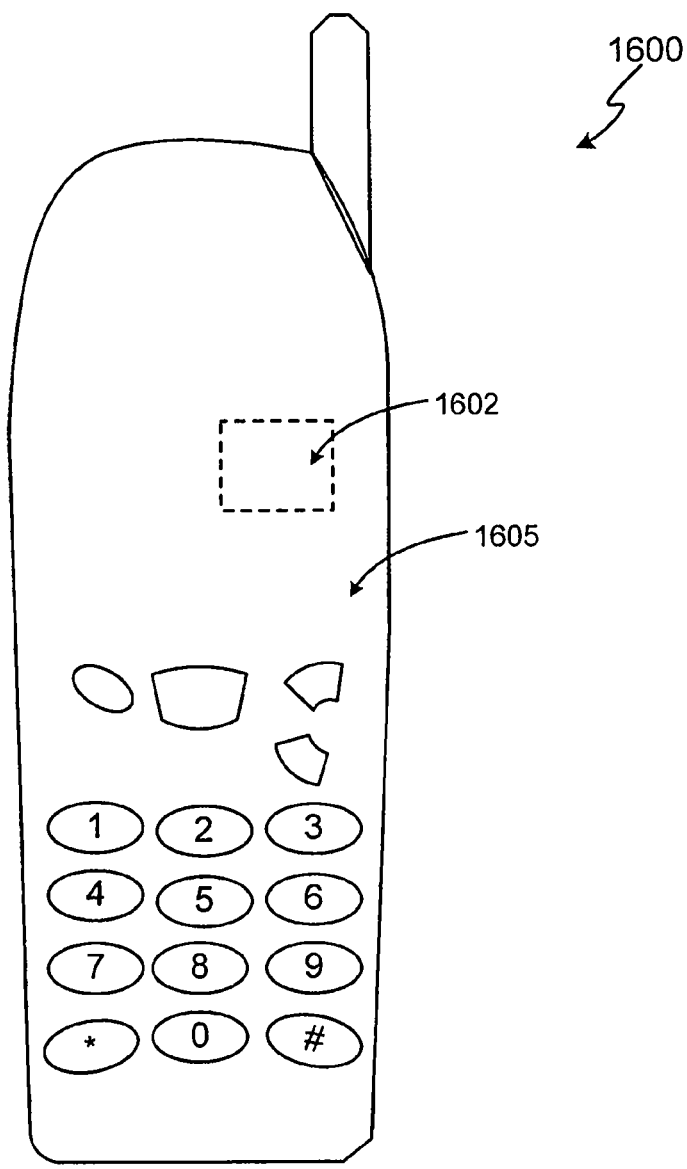
FIG. 16 illustrates an exemplary non-traditional payment processing device in accordance with the present invention.

Non-traditional payment processing devices 1600 may include, for example, cell phones, pervasive computing devices, palm pilots, Blackberry® handhelds, and other devices which may be enabled to participate in standard transactions with merchants, issuers, and/or any other third parties. With reference to FIG. 16, an exemplary non-traditional payment processing device 1600 is depicted. Non-traditional payment device 1600 may be configured, for example, as a cell-phone 1605 device. Cell phone 1605 may be configured with an RFID transponder 1602 in the phone casing or in any other part of the phone or phone accessories. In another embodiment, cell phone 1605 may be configured with one or more RFID-enabling protocols that allow cell phone 1605 to have RFID capabilities.

Device 1600 may have various transaction information encrypted in a payload on device 1600. For example, the encrypted payload may contain one or more routing numbers associated with device 1600 to facilitate locating an issuing bank. In addition, the encrypted payload may include a phone number and/or other identifier, financial information, account data, and the like.

In another embodiment, non-traditional device 1600 may be issued by a transaction account issuer (e.g., American Express®, banks, etc.) or a non-traditional issuer, such as, for example, a telephone company, wireless company, appliance manufacturer, or the like. Non-traditional device 1600 may be configured to participate in standard merchant-processing networks in a way similar to traditional transaction devices 240, described herein. Further, non-traditional device 1600 may be configured to use a safe wireless payment protocol and/or to be billed by the telephone company and/or other non-traditional issuer.

Figure 17:
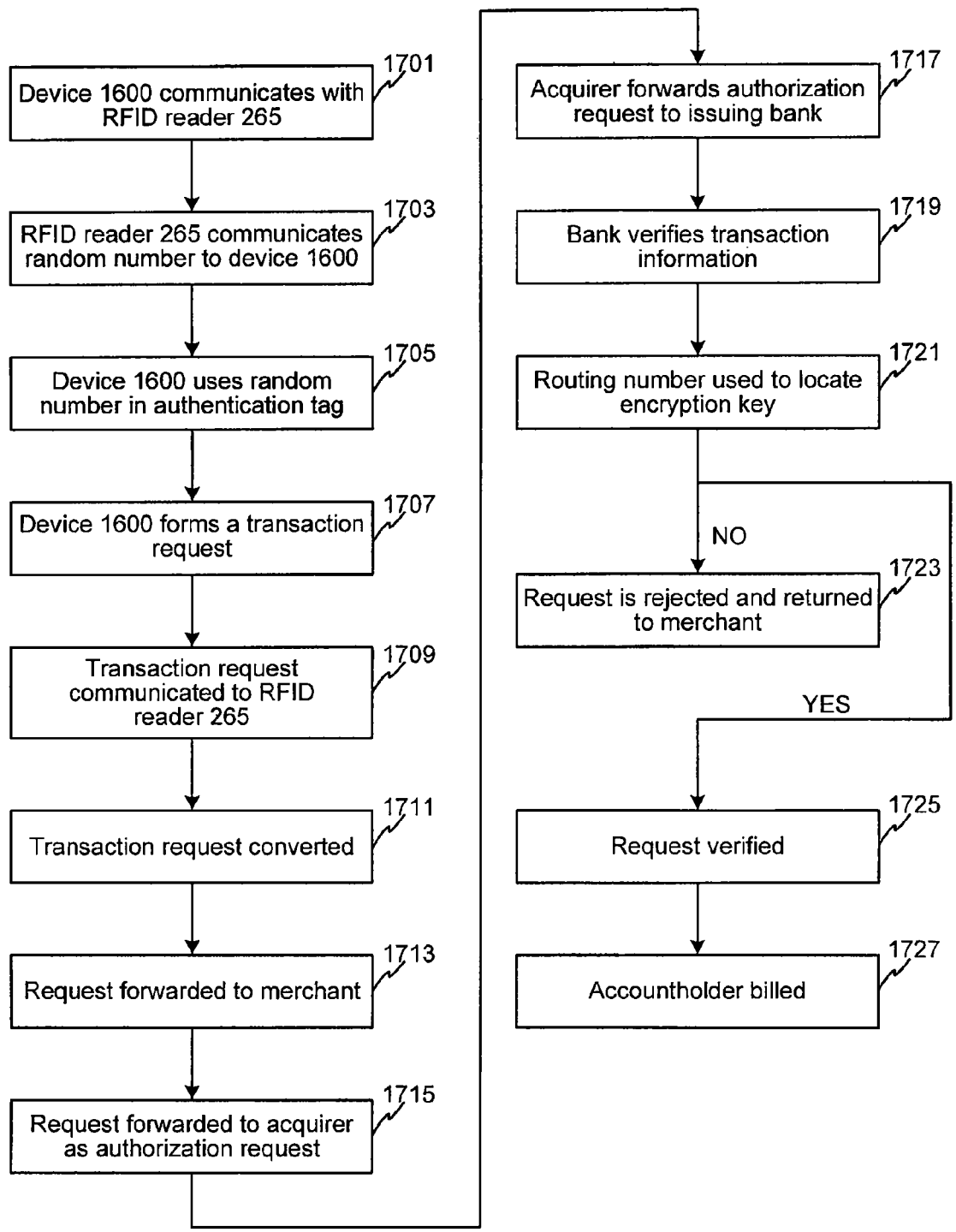
FIG. 17 illustrates an exemplary method for using non-traditional devices to facilitate RF transactions.

Non-traditional devices 1600 may be configured to communicate transaction information and/or may be used to facilitate RF transactions. For example, with reference to an exemplary method illustrated in FIG. 17, non-traditional device 1600 may be configured to communicate with RFID reader 265 via RF transponder 1602 (step 1701). RFID reader 265 may respond to non-traditional device 1600 by communicating to RF transponder 1602 a random number (step 1703). Device 1600 may be configured to use the random number to produce an authentication tag using RF transponder 1602 (step 1705). Device 1600 may then form a transaction request comprising the authentication tag, device 1600 identifier, and/or device 1600 counter, transaction information and the like (step 1707). Device 1600 may be configured to facilitate communicating the transaction request to RFID reader 265 (step 1709). RFID reader 265 may be configured to convert the transaction request into a form that may be read by merchant system POS 275 (step 1711). In one exemplary embodiment, RFID reader 265 may format the transaction request in the ISO 8583 format. However, RFID reader 265 may be configured to convert the transaction into any format known in the art.

Once RFID reader 265 converts the transaction request, RFID reader 265 may forward the request to merchant system POS 275 (step 1713). Merchant system POS 275 may be configured to communicate with RFID reader 265 via any network and/or data link described herein. Merchant system POS 275 may then be configured to forward the transaction request to the acquirer as an authorization request (step 1715).

POS 275 may be configured to forward the authorization request to the acquirer using any payment infrastructure and/or network. In one embodiment, merchant system POS 275 may be configured to forward the transaction request to the associated acquirer using an existing charge card payment infrastructure and network that are based on the routing number provided to device 1600. In another embodiment, the merchant and/or POS 275 may use the standard 8583 protocol to submit the transaction request to the issuer/acquirer. The merchant and/or POS 275 may also place the encrypted payload from device 1600 into the cryptogram field in the authorization request to forward to the acquirer.

The acquirer may forward the authorization request to the issuing bank (if different than the acquirer) (step 1717). If the acquirer is the same as the issuing bank and/or after the authorization has been sent to the issuing bank, the issuing bank may recognize the type of authorization request, and it may verify the authentication tag, the counter and/or any other transaction information that is part of the request (step 1719).

Since the routing number may be defined as the account number on the ISO 8583 authorization request, the issuing bank may use the routing number to locate the encryption key used to create the authentication tag for device 1600 (step 1721). That is, when the issuing bank receives the authorization request, it may use the account number/routing number in the Cryptogram field to facilitate decryption using the secret encryption key associated with the routing number. If the issuing bank cannot verify the authentication tag and/or the counter, the issuing bank may reject the request and return it to the merchant (step 1723). If the issuing bank can verify both the authentication tag and/or the counter, the authorization may be approved (step 1725). The accountholder may then be billed based on the decrypted account number ID (step 1727).

The transaction account number and phone number of non-traditional cell phone 1605 may typically be linked or associated. The transaction account number and phone number may also be provided and/or serviced by different organizations. In one embodiment, cell phone 1605 may be managed completely by the carrier, while the transaction account number may be supported completely by the account issuer. That is, even if the account issuer does not issue a physical transaction device, the issuer may issue the transaction account number that is imbedded in cell phone 1605. Because the accountholder may be the same as the phone holder, the account issuer may bill the accountholder directly and/or the issuing bank may bill the phone carrier for all payments made using cell phone 1605 device. The term "phone carrier," as used herein, may refer to any traditional and/or wireless phone carrier, such as, for example, AT&T, MCI, Sprint, Cingular, Nextel, Verizon, and the like.

It may then be the responsibility of the phone carrier to individually bill the different phone holders/accountholders for the payment. Since the phone carriers bill by using a customer identification number (which may be the phone number), the phone number associated with the account number used in the payment may be identifiable and usable by the phone carrier. In one embodiment, the phone carrier may use the phone number in the payment transaction so that the phone number may be explicitly defined as part of the transaction and in the transaction request. In another embodiment, the phone carrier may identify the account number associated with the phone number in order to complete a billing (if the carrier knows what account is included in the phone at any given time).

There may be multiple benefits to an exemplary embodiment in which the account issuer bills the phone carrier. For example, the benefit to the phone carrier may be that the phone carrier can provide a wireless payment process that integrates with the carrier's existing payment systems. Further, phone carrier billing and settlement may simplify the payment process involving the merchant, and it may limit the amount of payment changes at the merchant's location that result from reader upgrades. In another exemplary embodiment, the phone carrier may receive a portion of the fees (discount, interchange, network, etc.) that are assessed to the merchant for the transaction. This may provide increased revenue for the phone carriers. In one embodiment, the account issuer may bill the phone carrier periodically (e.g., daily, weekly, monthly) for all activity since the previous period. If the issuer bills the phone carrier, settlement may occur through a direct payment to the account issuer by the phone carrier. However, the account issuer and the phone carrier may also settle the transaction accounts at any other period of time and/or per any other requirements.

Figure 18:
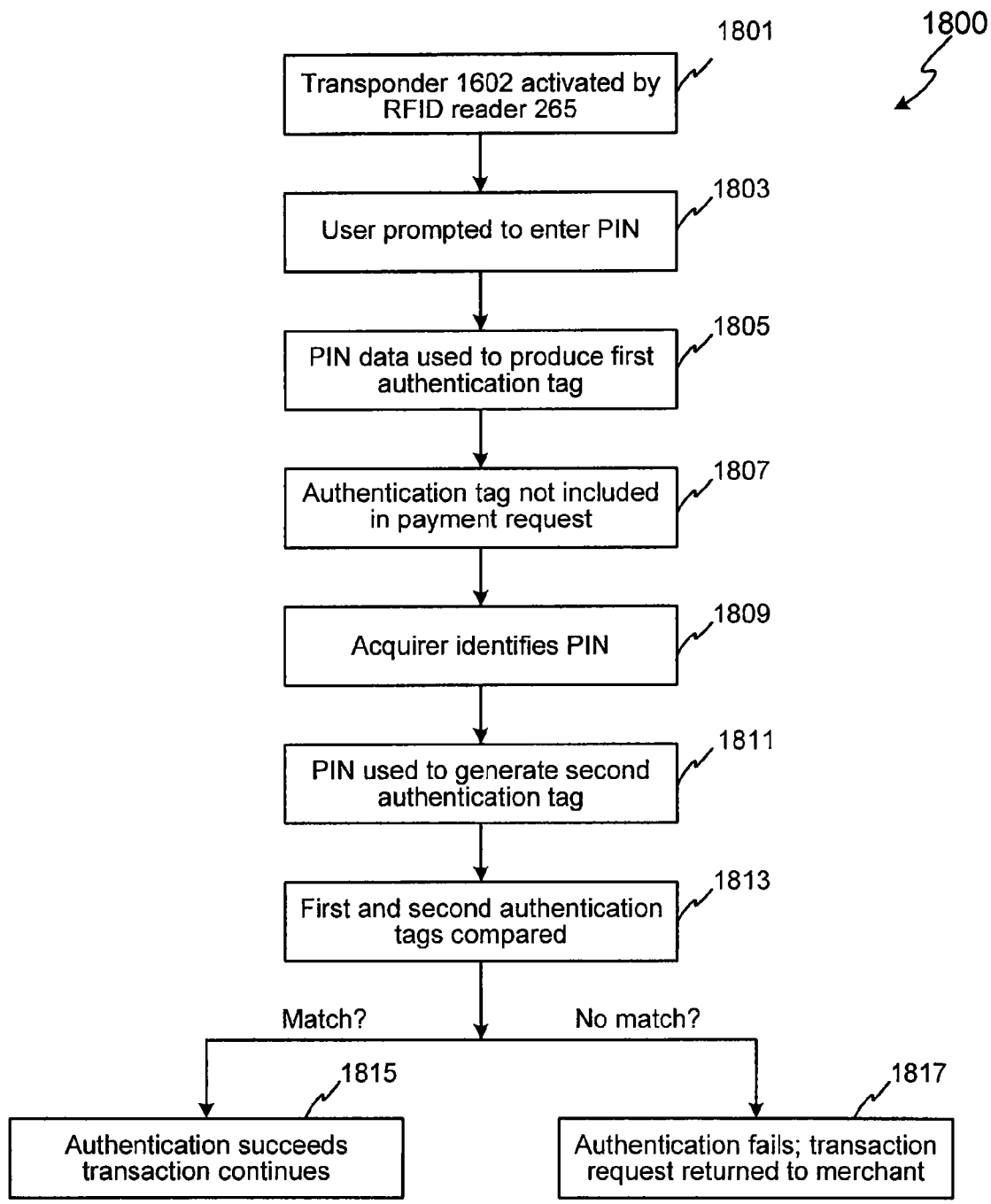
FIG. 18 depicts an exemplary method for using an additional authentication factor with a non-traditional device.

In yet another embodiment in accordance with the present invention, and with reference to an exemplary method depicted in FIG. 18, a method 1800 for using an additional authentication factor may be used by non-traditional device 1600 before the account data is actually provided to RFID reader 265. This additional authentication factor may be used because non-traditional devices 1600, such as cell phone device 1605, may be configured with greater processing capacity than traditional RF devices. Additional authentication factors may include secondary identifiers, such as, for example, PINs, biometrics, and other identifiers. For simplicity, the term "PIN" may be used herein to refer to any secondary identifiers identified herein.

For example, when cell phone's 1605 transponder 1602 is activated by RFID reader 265 (step 1801), transponder 1602 may be configured to facilitate prompting the user to enter a PIN for the account data (step 1803). For example, RFID reader 265 may prompt the user for a PIN, cell phone 1605 may prompt the user for a PIN, and/or any other interface communicating with the system may prompt the user for a PIN. Cell phone 1605 may then use this data to produce a first authentication tag (step 1805). However, cell phone 1605 may be configured to not include the authentication tag in the payment request to RFID reader 265 (step 1807). The acquirer may then identify the PIN for the transaction device (step 1809) and may use this PIN to generate a second authentication tag (step 1811). Acquirer and/or reader 265 may compare the first and second authentication tags (step 1813). If the tags do not match, the authentication fails and the request is returned to the merchant as rejected (step 1817). If the tags do match, the authentication succeeds and the transaction may continue (step 1815).

The invention contemplates additional and/or alternative uses of the authentication information. For example, in one embodiment the acquirer and/or reader 265 may store the PIN to be validated in the encrypted cryptogram, so that the PIN number is not broadcast to the rest of the payment system. In another embodiment, non-traditional device 1600 may be configured to include the cell phone 1605 number (or the unique identifier for non-cell phone devices) as a variable in the authentication tag. Since there is an explicit relationship between non-traditional device 1600 and the account number, an additional authentication step may include a device identifier itself (either the phone number or some other unique identifier). This may help to insure that the account is only being used in conjunction with the device.

The invention further contemplates the involvement of one or more additional parties in the transaction process, such as, for example, the parent device (cell phone 1605) carrier (i.e., the phone carrier). Although a transaction may not use the parent device carrier's infrastructure (because the transaction uses RF reader 265 attached to an existing POS device), the parent carrier may still be important to the use of non-traditional device 1600. For example, in one embodiment, the account, counter and encryption key are not manufactured into cell phone 1605, but instead may be loaded at any time by the parent device carrier (similarly to the way a phone number can be changed). Similarly, the phone carrier may associate the account number with a specific phone number. In another embodiment, the phone carrier may be the real owner of an account (and responsible party) and the phone holder may be considered an additional accountholder.

In another exemplary embodiment the invention may include a third party in the normal payment transaction/relationship. For example, in an exemplary embodiment using cell phone 1605 configured with an imbedded transponder 1602, the merchant may receive a transaction request from cell phone 1605 and may forward it to the acquirer for authorization. If approved, the request may then be submitted to the acquirer and the acquirer may pay the merchant. The acquirer may then provide (and settle) the request to the account issuer who may then bill the transaction to the accountholder.

In another embodiment, the phone carrier may be a distinct party that may involved in one or more aspects of the payment and/or settlement process. For example, the account issuer may route each transaction to the phone carrier for authorization as well as billing. In this embodiment, the account issuer may serve as an extended acquirer and may be reimbursed for the settlement with the acquirer where the payment originated. For each transaction, the phone carrier may pay the account issuer less whatever fees that it will receive for the transaction.

In yet another embodiment, the invention may utilize voice verification to facilitate purchase transactions using a transaction device. Voice verification, as used herein, refers to systems and processes that verify the vocal characteristics of a voice sample against those associated with an enrolled user. Voice verification systems use pattern-matching technologies to determine whether a sample voiceprint matches that of a stored voiceprint. Voice recognition, as used herein, also refers to systems and processes that translate the spoken word into a specific response. Voice recognition systems are configured to understand the spoken word, not to establish the identity of the user. An example of a voice recognition system is that of an automated call center, wherein a user is prompted to press a number on the phone keypad or speak a command to select a menu item.

Figure 19:
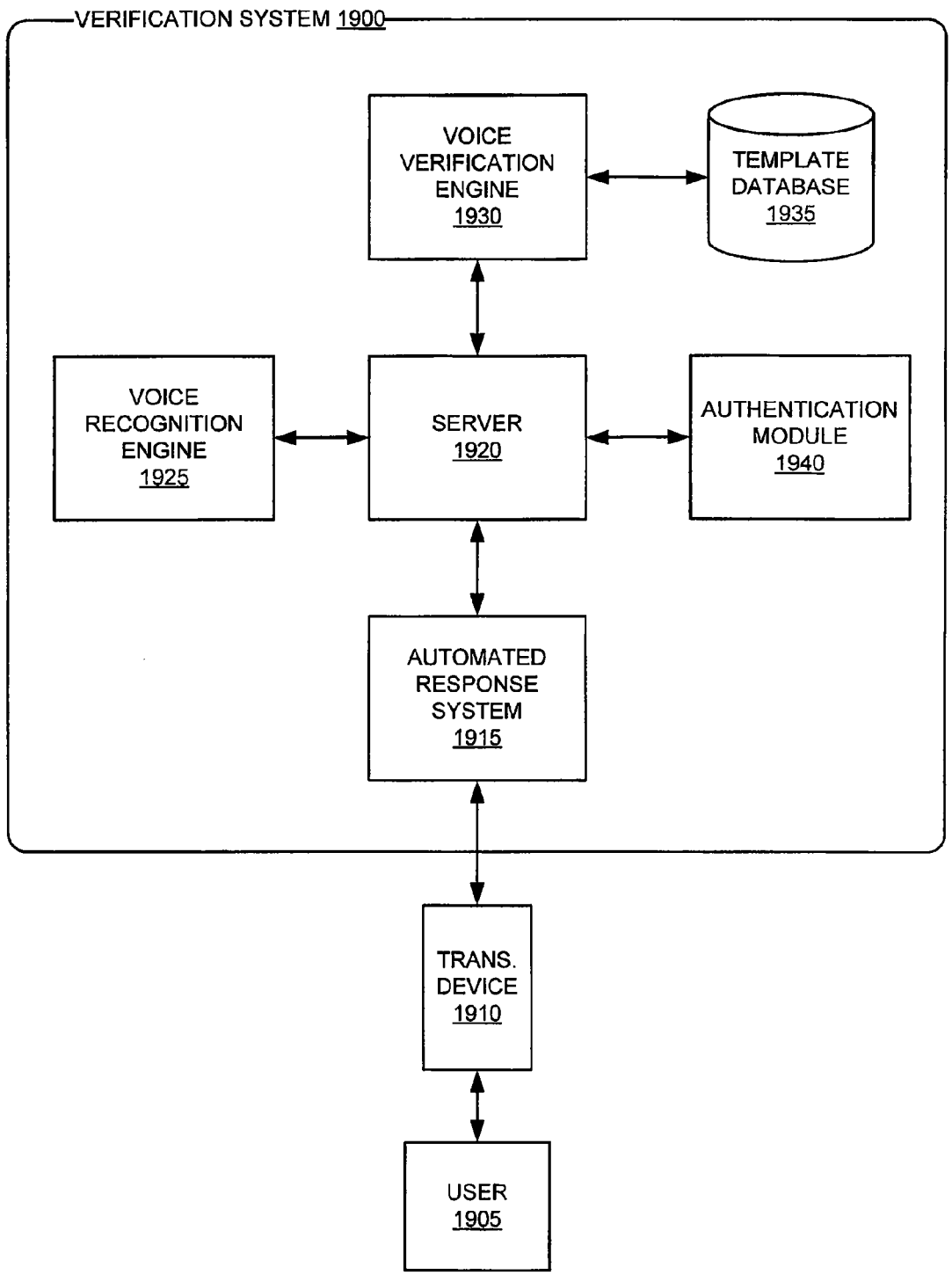
FIG. 19 illustrates a block diagram of an exemplary system for performing voice verification in response to a purchase request.

With reference to FIG. 19, in one embodiment, prior to using the voice verification embodiment, a user enrolls and sets-up an account with verification system 1900. An existing card holder may be provided with a set of credentials especially configured to access verification system 1900, or may enter existing credentials that are readily used to access general account information at the account issuer. User 1905 accesses verification system directly through a transaction device 1900 (e.g., cell phone). In another embodiment, user 1905 calls a number to access the account issuer's primary automated menu and select or speak an option that switches the user's call to verification system 1900. When a connection is established between transaction device 1910 and automated response system 1915, user 1905 is prompted to select or recite an option from a verification system options menu. For example, a voice prompt may instruct the user to press 1 or say "one" to setup a voice ID account, press 2 or say "two" to modify one or more stored voiceprint templates, or press 3 or say "three" to create a new stored voiceprint template.

Automated response system 1915, as used herein, may comprise any hardware and/or software suitably configured to provide verbal interaction between a connecting device and any number of hardware and software systems. Typically, automated response systems provide various functions such as, for example, accepting a telephone call from a caller, providing verbal instructions regarding available options, providing personalized information, accepting inputs from the caller in the form of keypad entry and/or voice commands, interacting with other hardware and software components, and directing the call according to caller needs. Automated response system may be integrated as a software component within server 1920, any other system components or may reside within another computing device or may take the form of a standalone hardware component.

To configure verification system 1900 for voice based verification, user 1905 interacts with verification system 1900 through transaction device 1910 to provide a voice sample. When prompted, user 1905 is directed to recite a pass phrase into transaction device 1915. The pass phrase may be a verbal phrase or the recitation of a series of alpha and/or numeric characters. User 1905 may be prompted to repeat the pass phrase any number of times to ensure that an accurate voiceprint is created from the sample. The voiceprint is digitized to produce a stored model voiceprint, or template. Voice verification engine 1930 then reduces each spoken word to segments composed of several dominant frequencies, or formants. Each segment has several formants that are captured in a digital format to collectively identify the user's unique voiceprint. The templates are then stored in template database 1935 where they are associated with one or more transaction accounts.

The invention includes exemplary systems and methods for creating a voiceprint based on digitizing a voice sample, digitizing the sample, segmenting it into formants, storing the formants as a template, and subsequently utilizing the template for comparison against a voice sample. However, practitioners will appreciate that there are a number of technologies that are routinely implemented for the purpose of voice verification. Furthermore, it should be appreciated that the disclosure herein of specific configurations of voice processing and verification is for the purpose of explanation only and does not limit the scope of the invention.

Most existing voice verification technologies require the user speak in the normal voice that was used when the template was created at enrollment. Thus, according to one embodiment, a number of templates are stored in template database 1935 to increase the accuracy of voice verification engine 1930. This may be especially desirable to users who frequently suffer from a condition such as sinus allergies, for example, which may occasionally alter the voice of user 1905. Therefore, user 1905 interacts with verification system 1900 to enter account verification information and selects a menu option to create a new template. The new template does not replace the original template, but is stored in addition to the original template. However, having multiple templates may reduce the security of the system, thus it may be desirable to limit the number of templates that may be stored with template database 1935 for any given user.

Background noise and the quality of transaction device 1910 may create additional challenges for voice verification system 1900. Therefore, when creating a template, the user's voice print sample may be processed through a filter configured to remove or reduce background noise. User 1905 may further be encouraged to submit the voice print sample in an environment most similar to that of where future verifications will most likely be sought. If voice verification engine 1930 comprises multiple configurations of filters (i.e., filters designed for various audio conditions), a filter identifier is also stored with each template within template database 1935. As such, when user 1905 subsequently connects to verification system 1900 by way of transaction device 1910, the provided voice sample can be processed through the same filter that was used during template creation.

In one embodiment, verification system 1900 combines the functionality of voice verification and voice recognition to reduce the possibility of replay attacks. Replay attacks can occur when a person acquires a recording of an authorized user's voice, and replays the recording in order to fraudulently facilitate transactions. Thus, in addition to speaking the pass phrase, which is compared to a stored template, user 1905 may be prompted to repeat a randomly generated phrase, enter a PIN, or recite the current date. Verification system 1900 includes a voice recognition engine 1925 to verify that the recitation is accurate by processing the recitation of the randomly generated phrase, PIN, or current date. Practitioners will appreciate that any number of additional processes may be implemented to ensure that the voice sample is live and not replicated. For example, a user may be prompted to enter a PIN on the cell phone keypad in addition to reciting the pass phrase.

When user 1905 recites the assigned pass phrase, certain words are extracted and compared with the stored template for that individual. When user 1905 connects to verification system 1900, his or her pass phrase is compared with the previously stored template from template database 1935. Other voice verification systems do not rely on a fixed set of enrolled pass phrases to verify a user's identity. Instead, these systems are trained to recognize similarities between the voice patterns of individuals when user 1905 speaks a phrase that is not consistent with that of the stored template.

After user 1905 enrolls at voice verification system 1900 and has produced one or more voice print templates, user 1905 may utilize the system to facilitate purchase transactions by way of transaction device 1910. In one embodiment, a voice verification account is used in combination with a multi-purpose transaction device such as, for example, a cellular telephone equipped with an RFID device. Accordingly, for the purposes of payment authorization, and in one embodiment, the transaction device is considered inactive prior to a purchase transaction and is activated only when a pass phrase is authenticated at system 1900.

Figure 20:
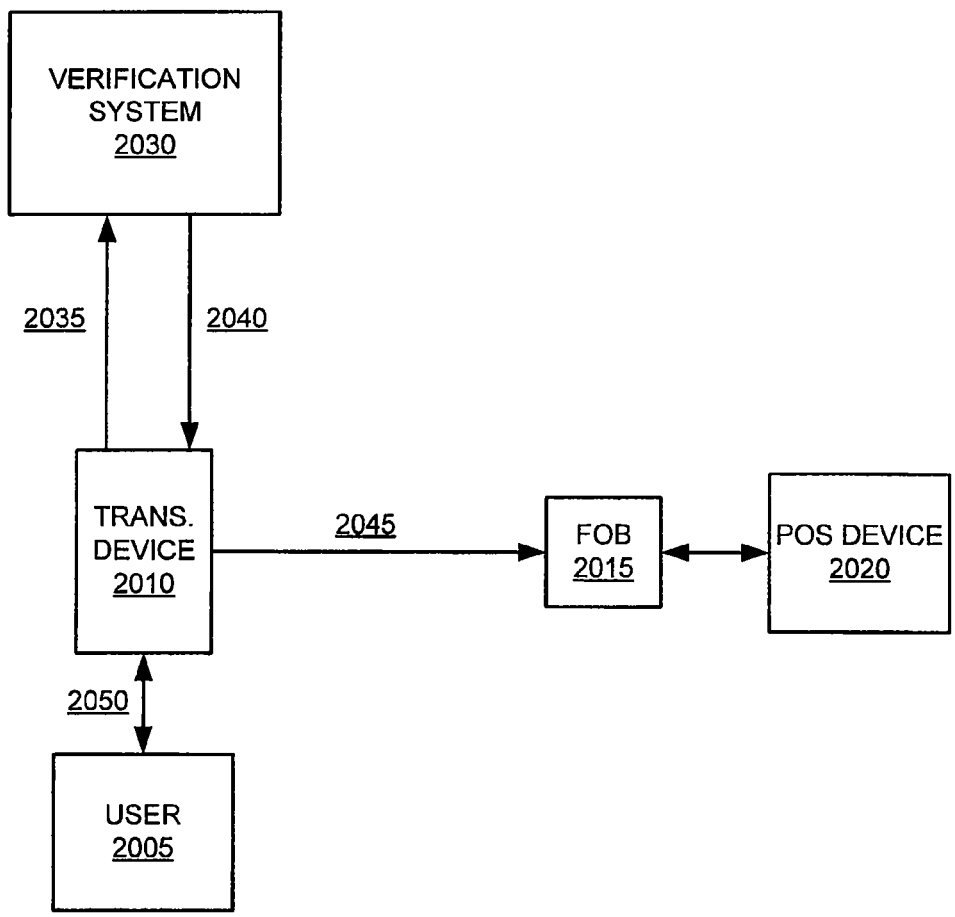
FIG. 20 is a combination block diagram and process flowchart illustrating exemplary systems and methods for purchase transactions implementing voice verification and an RFID equipped transaction device; and, FIG. 21 is a combination block diagram and process flowchart illustrating exemplary systems and methods for purchase transactions implementing voice verification and a standard transaction device.
Figure 21:
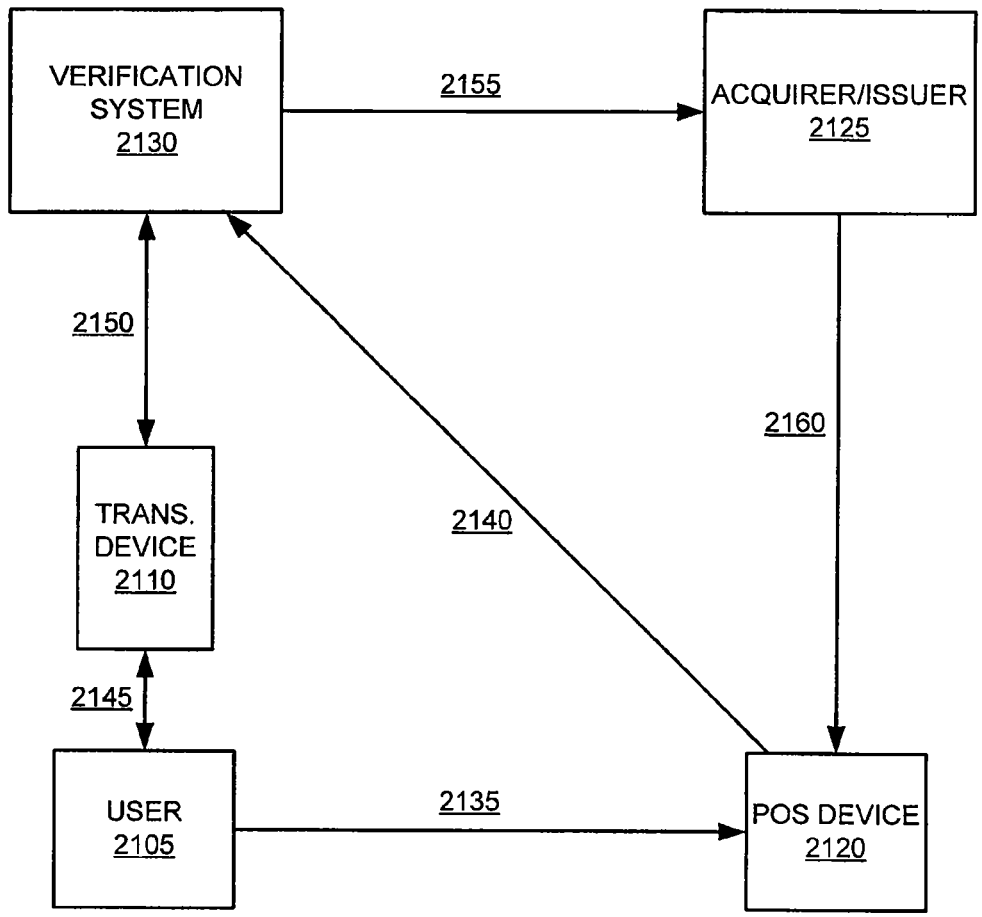

The process flows of FIG. 20 and FIG. 21 are merely embodiments of the verification system 1900 and are not intended to limit the scope of the invention as described herein. For example, the steps recited in any of the method or process descriptions may be executed in any order and are not limited to the order presented. It will be appreciated that the following description makes appropriate references not only to the steps depicted in FIG. 20 and FIG. 21, but also to the various system components as described above with reference to FIG. 19.

FIG. 20 is a combination system diagram and process flowchart illustrating exemplary systems and methods for purchase transactions implementing voice verification and an RFID equipped transaction device. To facilitate a purchase transaction, user 2005 interacts with transaction device 2010 to establish a connection to verification system 2030. Practitioners will appreciate that the interface with a merchant may occur in a variety of manners such as, for example, via merchant POS, Internet, Kiosk, and the like. When a connection is established between transaction device 2010 and verification system 2030, user 2005 is prompted via an automated response system to recite a randomly generated set of numbers or a phrase to verify that the voice is not a pre-recorded voice (step 2035). For example, automated response system 1915 may prompt user 2005 to "repeat the following number sequence: three, eight, four, one." Voice recognition engine 1925 at verification system 2030 verifies that the recited series or phrase is accurate. Automated response system 1915 may instruct user 2005 to repeat the series or phrase if voice recognition engine 1925 was unable to decipher the response.

Upon verifying user 2005 recitation of the randomly generated series or phrase, automated response system 1915, in one embodiment, prompts user 2005 to recite her assigned or selected PIN. The user is either assigned a PIN or selects a PIN during enrollment and it is stored with the user's voiceprint sample in template database 1935. Accordingly, verification system 2030 can quickly locate and retrieve the appropriate voiceprint template from template database 1935. In one embodiment, a PIN is not required and template database 1935 is searched for a match to user's recited pass phrase. However, this may be processor intensive, and thus, less efficient. In another embodiment, user 2005 may enter the PIN using the keypad of transaction device 2010. This may be desirable as to not be detectable by others. Verification system 2030 receives the recited or keypad entered PIN and queries template database 1935 for a record corresponding to the PIN. If a record corresponding to the PIN is not found in template database 1935, user 2005 may be prompted to again recite or enter their PIN. When user's 2005 voiceprint template record is located, automated response system 1915 prompts user 2005 to recite their pass phrase.

As described above, the pass phrase is a phrase or series of spoken alpha and/or numeric characters that are recited by user 2005 during enrollment to create a voiceprint sample. The voiceprint sample is saved to template database 1935 as a template. Verification system 2030 receives the pass phrase and server 1920 routes it to voice verification engine 1930. Voice verification engine 1930 processes the digitized pass phrase for comparison against a retrieved template. If voice verification engine 1930 is unable to conclusively determine that the pass phrase matches the template, automated response system 1915 may prompt user 2005 to again recite their pass phrase. When voice verification engine 1930 determines that the pass phrase conclusively matches the stored template, verification system 2030 transmits an authorization key to transaction device 2010. The authorization key is processed by transaction device 2010 to activate an RFID device.

When information relating to more than one transaction account is stored on transaction device 2010, user 2005 is prompted to select which transaction account to use to facilitate the purchase transaction. For example, if user 2005 has stored account information relating to his American Express card, Visa card, and MasterCard on transaction device 2010, a display area may prompt user 2005 to "Press 1 for American Express," "Press 2 for Visa," and "Press 3 for MasterCard." Practitioners will appreciate that user 2005 may also be prompted to select a transaction account via audio instructions through a transaction device speaker, or by any other means known in the art.

In another embodiment, account information relating to any number of transaction accounts is stored with the user's voiceprint template record within template database 1935. Thus, account information need not be stored at transaction device 2010 and may be retrieved from template database 1935 and transmitted to transaction device 2010 in lieu of an authentication code (step 2040). For example, after voice verification, user 2005 may be prompted by automated response system 1915 to select from a menu of stored transaction accounts. When user 2005 selects one of the transaction accounts, information relating to the selected transaction account (e.g., card number, expiration date, verification code) is transmitted to transaction device 2010. Practitioners will appreciate that account information may be encrypted using any known encryption methods and algorithms prior to being transmitted to transaction device 2010.

When account information has been retrieved from transaction device 2010 memory or from template database 1935, an RFID device transmits the account information to FOB 2015 in order to be processed by merchant POS device 2020. Interaction between transaction device 2010 RFID and FOB 2015 to secure the purchase transaction is described above in reference to steps 1713 to 1727 of FIG. 17.

FIG. 21 is a combination system diagram and process flowchart illustrating exemplary systems and methods for purchase transactions implementing voice verification and a standard transaction device. According to this embodiment, transaction device 2110 does not include an RFID device. In other words, the transaction device may comprise a standard cell phone, which may used to facilitate authorization of a payment transaction. Accordingly, transaction account information is not stored at transaction device 2110, nor is transaction account information transmitted to transaction device 2110. Furthermore, there is no direct linkage between transaction device 2110 and POS device 2120.

A user 2105 that desires to facilitate a purchase transaction interacts with a merchant POS device 2120 to enter a unique PIN (step 2135). The PIN may be either assigned by verification system 1900 or selected by the user during enrollment at verification system 2130. The PIN along with transaction data is transmitted (step 2140) from POS device 2120 to verification system 2130, wherein it is used to create a pending transaction record. Transaction data may include any information that is routinely transmitted from a POS device to acquirer/issuer 2125 for payment authorization. Such information may include, for example, a merchant account number and a transaction amount.

User 2105 interacts with transaction device (step 2145) to establish a connection with verification system (step 2150). In one embodiment, transaction device 2105 is a standard cell phone and user 2105 establishes the connection with verification system 2130 by dialing a telephone number. When a connection is established, user 2105 is prompted via automated response system 1915 to recite a randomly generated set of numbers or a phrase to verify that the voice is not a pre-recorded voice. Voice recognition engine 1925 at verification system 2130 verifies that the recited series or phrase is accurate.

Upon verifying user 2105 recitation of the randomly generated series or phrase, automated response system 1915, in one embodiment, prompts user 2105 to recite her assigned or selected PIN. The PIN is transmitted from transaction device 2110 to verification system 2130 where template database 1935 is queried to retrieve a template record corresponding to the PIN. Upon retrieving the user's template record, automated response system 1915 prompts user 2105 to recite her pass phrase. Verification system 2130 receives the pass phrase and server 1920 routes it to voice verification engine 1930. Voice verification engine 1930 processes the digitized pass phrase for comparison against a retrieved template. If voice verification engine 1930 is unable to conclusively determine that the pass phrase matches the template, automated response system 1915 may prompt user 2105 to again recite her pass phrase. When voice verification engine 1930 determines that the pass phrase conclusively matches the stored template, a pending transactions database (not shown) is searched for a pending transactions record corresponding to the PIN.

When a pending transaction record is located, automated response system 1915 transmits details regarding the pending purchase to transaction device 2110 for user 2105 verification. For example, if the user is executing a purchase for a golf club for $299.99 at Jim's Sport Shack, the automated response system may state, "You have a pending purchase totaling $299.99 at Jim's Sport Shack. To confirm this purchase, press or say one, to cancel this purchase, press or say two." If user chooses to cancel the transaction, the pending purchase transaction is removed from the pending transactions database and the transaction is cleared at POS device 2120.

Account information relating to any number of transaction accounts is stored with the user's voiceprint template record within template database 1935. Thus, account information is retrieved from template database 1935 and automated response system 1915 prompts user 2105 to select the transaction account to use for the purchase. For example, after voice verification, user 2105 may be prompted by automated response system 1915 to select from a menu of stored transaction accounts. When user 2105 selects one of the transaction accounts, information relating to the selected transaction account (e.g., card number, expiration date, verification code) is added to the pending purchase transaction record.

On verifying the pending purchase transaction, verification system 2130 compiles all or a subset of the pending purchase transaction record into a purchase request. The purchase request is transmitted to acquirer/issuer (step 2155) for authorization in the conventional manner. In other words, acquirer/issuer 2125 receives the purchase request from verification system 2130 as though it were a standard request received from POS device 2120. Thus, when acquirer/issuer 2125 verifies the transaction account and authorizes the purchase, the authorization is transmitted directly to POS device (step 2120) to consummate the purchase transaction. Verification system 2130 may delete the transaction information from the pending transactions database at regular intervals or when the purchase data is transmitted to acquirer/issuer (step 2155).

In the foregoing specification, the invention has been described with reference to specific embodiments. However, it may be appreciated that various modifications and changes can be made without departing from the scope of the present invention. For example, alternate authentication and verification methods are required by the account issuer system may be employed. The issuer system may require the transaction device to include random number generators, counters, authentication tags, or the like for transaction device, reader, or transaction verification. Additionally, the notifications to the user discussed herein may be visual, audible, or any other suitable notification method capable of conveying to the user that multiple transaction accounts are available for transaction completion. Further, the processing method described herein may be modified so as to permit the selection of a data set from the transaction device using a PIN, where each data set is assigned a PIN, and the user uses the PIN to identify which data set to select for transaction completion. Further still, the user may audibly or physically (e.g., touch screen, input data in touch pad or key pad) select which data set to use. As such, the specification and figures are to be regarded in an illustrative manner applicable irrespective of the data processing protocol used by a data set owner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented.

In an exemplary embodiment, a computer implemented method for facilitating a purchase transaction using biometric data includes: causing an activation request to be sent to a verification system, wherein said activation request includes an identifier of a user; receiving a prompt to recite a pass phrase; transmitting said pass phrase to said verification system; receiving an authorization when said pass phrase and voiceprint template match; activating a non-traditional device; and, communicating said transaction request from said non-traditional device to a reader to facilitate a purchase.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

What is claimed is:

1. A method including:
causing, by a transaction device for facilitating a purchase transaction, an activation request to be sent to a verification system, wherein said activation request includes an identifier of a user;
receiving, by said transaction device, a prompt to recite an audio pass phrase spoken by said user into said transaction device;
transmitting, by said transaction device, said audio pass phrase to said verification system;
receiving, by said transaction device and from said verification system, account information in response to said audio pass phrase and a voiceprint template matching, wherein said account information includes an account number;
wirelessly transmitting, by said transaction device, at least said account information to an RFID device in response to said account information being received; and
wirelessly communicating, by said RFID device, at least said account information to a reader to facilitate said purchase transaction.

2. The method of claim 1, wherein said wirelessly transmitting at least said account information to said RFID device comprises forming a transaction request comprising at least one of transaction information, a random number, an authentication tag, a counter, and an encrypted payload.

3. The method of claim 1, wherein said transaction device is at least one of: a cell phone, a PDA, or an electronic handheld device.

4. The method of claim 2, wherein said forming said transaction request further comprises communicating an authentication factor.

5. The method of claim 1, wherein said RFID device communicates using an RF protocol.

6. The method of claim 2, wherein said forming said transaction request comprises forming said transaction request in at least one of ISO 14443 format and Near Field Communication format.

7. The method of claim 2, wherein said transaction request is received at a merchant system from said RFID device, and wherein said merchant system forms a purchase authorization request comprising information from said transaction request and communicates said purchase authorization request to a third party.

8. The method of claim 7, wherein said merchant system places at least a subset of said transaction request into a cryptogram field in said purchase authorization request.

9. The method of claim 7, wherein said merchant system receives transaction authorization from said third party.

10. The method of claim 9, wherein said merchant system submits said transaction authorization to an issuer to facilitate processing said transaction request.

11. The method of claim 7, wherein said merchant system communicates billing information to at least one of an issuer, a processor, a parent carrier, a phone carrier, and said user.

12. The method of claim 1, wherein a phone number of a cellular phone is linked to the account number used to facilitate said purchase transaction.

13. The method of claim 1, wherein said transaction device is a cellular telephone in direct communication with at least one of an acquirer, issuer, and payment processor.

14. A plurality of computer readable storage media comprising:
a first non-transitory, tangible computer readable storage medium having instructions stored thereon that, in response to execution by a transaction device for facilitating a purchase transaction, cause said transaction device to perform operations comprising:
causing an activation request to be sent to a verification system, wherein said activation request includes an identifier of a user;
receiving a prompt to recite an audio pass phrase spoken by said user into said transaction device;
transmitting said audio pass phrase to said verification system;
receiving account information from said verification system in response to said audio pass phrase and a voiceprint template matching, wherein said account information includes an account number;
wirelessly transmitting at least said account information to an RFID device in response to said account information being received; and
a second non-transitory, tangible computer readable storage medium having instructions stored thereon that, in response to execution by said RFID device, cause said RFID device to perform operations comprising:
wirelessly communicating at least said account information to a reader to facilitate said purchase transaction.

15. A system comprising:
a transaction device in communication with a radio frequency identification (RFID) device, said transaction device programmed to:
receive an audio pass phrase;
cause an activation request to be sent to a verification system, wherein said activation request includes an identifier of a user;
receive a prompt for said user to recite said audio pass phrase;
transmit said audio pass phrase to said verification system;
receive account information from said verification system in response to said audio pass phrase and a voiceprint template matching, wherein said account information includes an account number;

wirelessly transmit at least said account information to said RFID device in response to said account information being received; and said RFID device programmed to:

wirelessly communicate at least said account information to a reader to facilitate a purchase transaction.

16. The method of claim 1, wherein said RFID device is disabled in response to said wirelessly communicating at least said account information.

* * * * *